(12) United States Patent
Gardner et al.

(10) Patent No.: US 7,627,640 B2
(45) Date of Patent: Dec. 1, 2009

(54) MESSAGING AND DOCUMENT MANAGEMENT SYSTEM AND METHOD

(75) Inventors: Jon S. Gardner, Stamford, CT (US);
Juin J. Wang, New York, NY (US);
Matthew V. Scott, Middletown, NJ (US)

(73) Assignee: ePostal Services, Inc., Stamford, CT (US)

( * ) Notice: Subject to any disclaimer, the term of this patent is extended or adjusted under 35 U.S.C. 154(b) by 658 days.

(21) Appl. No.: 11/353,763

(22) Filed: Feb. 13, 2006

(65) Prior Publication Data

US 2006/0168074 A1 Jul. 27, 2006

Related U.S. Application Data

(63) Continuation-in-part of application No. 10/803,601, filed on Mar. 17, 2004, now Pat. No. 7,502,828.

(60) Provisional application No. 60/455,132, filed on Mar. 17, 2003.

(51) Int. Cl.
*G06F 15/16* (2006.01)
(52) U.S. Cl. ...................... 709/206; 709/203
(58) Field of Classification Search .............. 709/206, 709/203; 379/88.22; 715/752
See application file for complete search history.

(56) References Cited

U.S. PATENT DOCUMENTS

| | | |
|---|---|---|
| 5,699,528 A | 12/1997 | Hogan |
| 5,826,241 A | 10/1998 | Stein et al. |
| 5,884,033 A | 3/1999 | Duvall et al. |
| 5,944,787 A | 8/1999 | Zoken |

(Continued)

FOREIGN PATENT DOCUMENTS

WO   WO-02/28127   4/2002

(Continued)

OTHER PUBLICATIONS

The Muppet: "On ProxyTunnel or How To Give Network Security Administrators a Tremendous Headache," Proxytunnel, [Online] Apr. 1, 2002, pp. 1-17, Retrieved from the Internet: URL:http://proxytunnel.sourceforge.net/paper.php.

(Continued)

*Primary Examiner*—Frantz B Jean
(74) *Attorney, Agent, or Firm*—Edwards Angell Palmer & Dodge LLP; Peter J. Manus

(57) ABSTRACT

A communication system and method transmits electronic mail among multiple users that are senders or recipients of the mail, or both. The system and method use and augment the Internet with a postal server and software linked to the Internet. The sender and recipient have terminals also linked to the Internet. The sender uses postal sender software to select transmission with certain premium services. The system and method include payment and accounting functions for use of the premium services. The system and method can operate with plural postal servers at one or more locations. Communications can utilize the postal server and software only for processing data about the message and/or its transmission. Communications among the Sender, Recipient, and postal server can create virtual intranet-like qualities. Transmitted electronic mail uses message data to identify the Sender, authenticate and verify the email, and direct its processing.

39 Claims, 32 Drawing Sheets

U.S. PATENT DOCUMENTS

| | | | |
|---|---|---|---|
| 5,970,469 | A | 10/1999 | Scroggie et al. |
| 5,987,606 | A | 11/1999 | Cirasole et al. |
| 6,014,634 | A | 1/2000 | Scroggie et al. |
| 6,073,119 | A | 6/2000 | Bornemisza-Wahr et al. |
| 6,101,485 | A | 8/2000 | Fortenberry et al. |
| 6,122,657 | A | 9/2000 | Hoffman, Jr. et al. |
| 6,128,298 | A | 10/2000 | Wootton et al. |
| 6,134,660 | A | 10/2000 | Boneh et al. |
| 6,141,695 | A | 10/2000 | Sekiguchi et al. |
| 6,163,772 | A | 12/2000 | Kramer et al. |
| 6,185,541 | B1 | 2/2001 | Scroggie et al. |
| 6,212,265 | B1 | 4/2001 | Duphorne |
| 6,223,168 | B1 | 4/2001 | McGurl et al. |
| 6,226,523 | B1 | 5/2001 | Karlsson et al. |
| 6,243,375 | B1 | 6/2001 | Speicher |
| 6,246,996 | B1 | 6/2001 | Stein et al. |
| 6,266,692 | B1 | 7/2001 | Greenstein |
| 6,282,522 | B1 | 8/2001 | Davis et al. |
| 6,285,985 | B1 | 9/2001 | Horstmann |
| 6,285,987 | B1 | 9/2001 | Roth et al. |
| 6,285,991 | B1 | 9/2001 | Powar |
| 6,289,318 | B1 | 9/2001 | Barber |
| 6,321,267 | B1 | 11/2001 | Donaldson |
| 6,339,761 | B1 | 1/2002 | Cottingham |
| 6,347,307 | B1 | 2/2002 | Sandhu et al. |
| 6,356,937 | B1 | 3/2002 | Montville et al. |
| 6,360,206 | B1 | 3/2002 | Yamashita |
| 6,385,592 | B1 | 5/2002 | Angles et al. |
| 6,401,075 | B1 | 6/2002 | Mason et al. |
| 6,424,828 | B1 | 7/2002 | Collins et al. |
| 6,434,621 | B1 | 8/2002 | Pezzilo et al. |
| 6,438,583 | B1 | 8/2002 | McDowell et al. |
| 6,442,529 | B1 | 8/2002 | Krishan et al. |
| 6,446,115 | B2 * | 9/2002 | Powers .................. 709/206 |
| 6,449,634 | B1 | 9/2002 | Capiel |
| 6,470,079 | B1 | 10/2002 | Benson |
| 6,477,647 | B1 | 11/2002 | Venkatraman et al. |
| 6,480,582 | B1 | 11/2002 | Ungruh et al. |
| 6,486,891 | B1 | 11/2002 | Rice |
| 6,487,538 | B1 | 11/2002 | Gupta et al. |
| 6,490,354 | B2 | 12/2002 | Venkatesan et al. |
| 6,499,055 | B1 | 12/2002 | Yamaguchi |
| 6,513,052 | B1 | 1/2003 | Binder |
| 6,516,338 | B1 | 2/2003 | Landsman et al. |
| 6,742,016 | B1 | 5/2004 | Bhoj et al. |
| 6,785,367 | B2 | 8/2004 | Horvath et al. |
| 6,799,197 | B1 | 9/2004 | Shetty et al. |
| 6,804,704 | B1 | 10/2004 | Bates et al. |
| 6,996,520 | B2 | 2/2006 | Levin |
| 2001/0027487 | A1 | 10/2001 | Ruping et al. |
| 2003/0180138 | A1 | 9/2003 | Scheltes et al. |

FOREIGN PATENT DOCUMENTS

| | | |
|---|---|---|
| WO | WO-2005/025177 | 3/2005 |

OTHER PUBLICATIONS

Hoffman Internet Mail Consortium P: "SMTP Service Extension for Secure SMTP over Transport Layer Security: rfc3207.txt" IETF Standard, Internet Engineering Task Force, IETF, CH, Feb. 1, 2002 (Feb. 2, 2002).

* cited by examiner

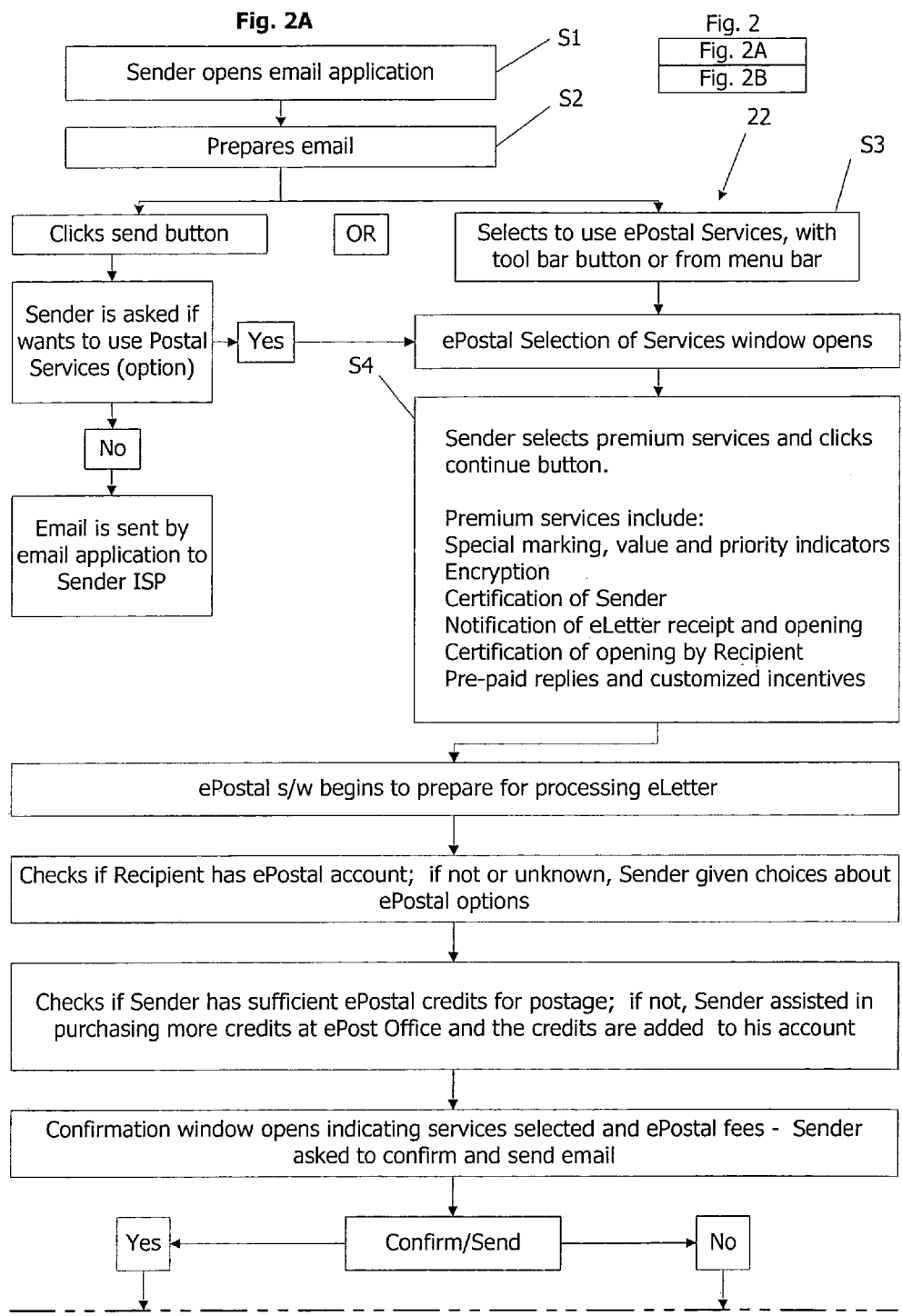

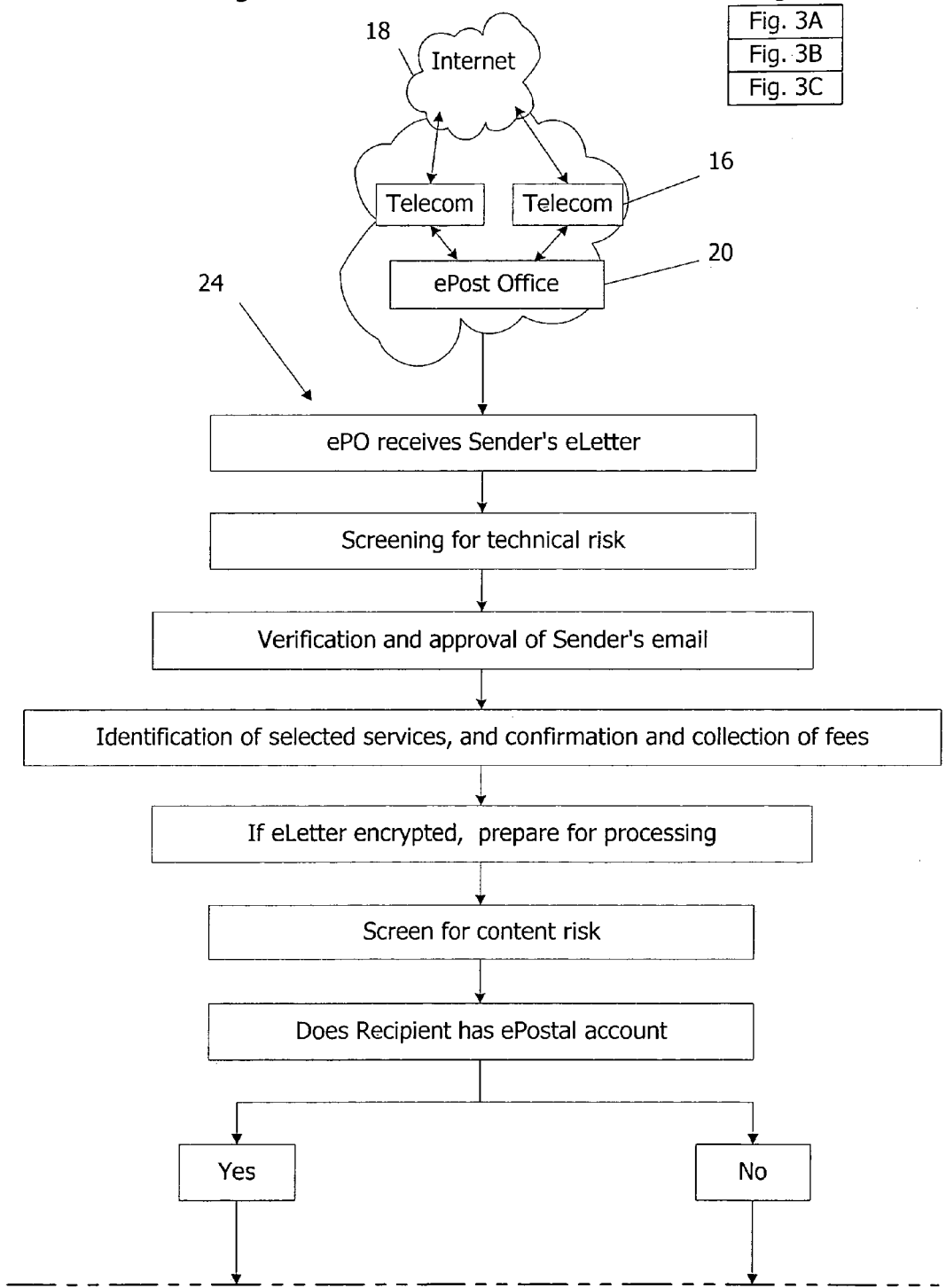

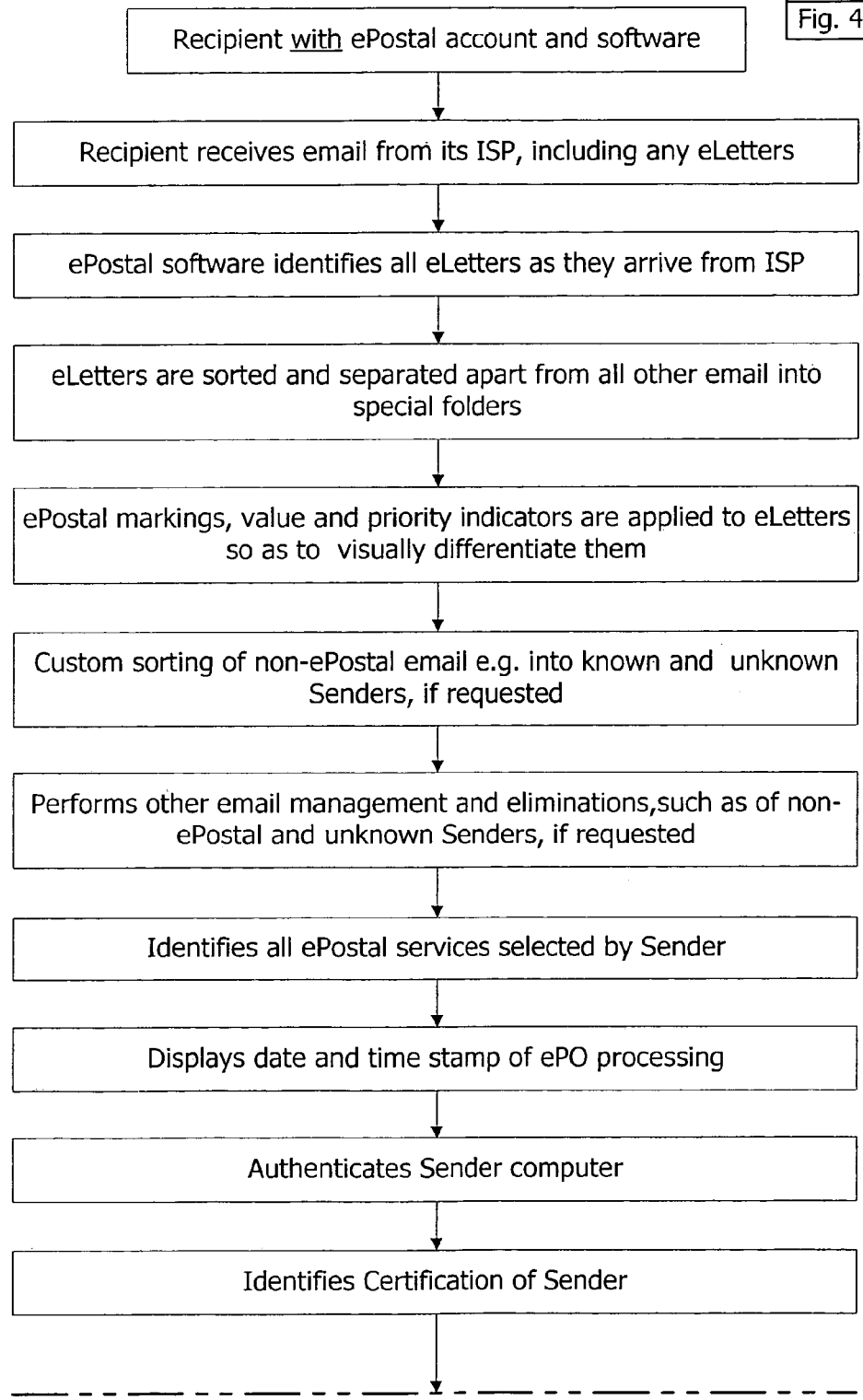

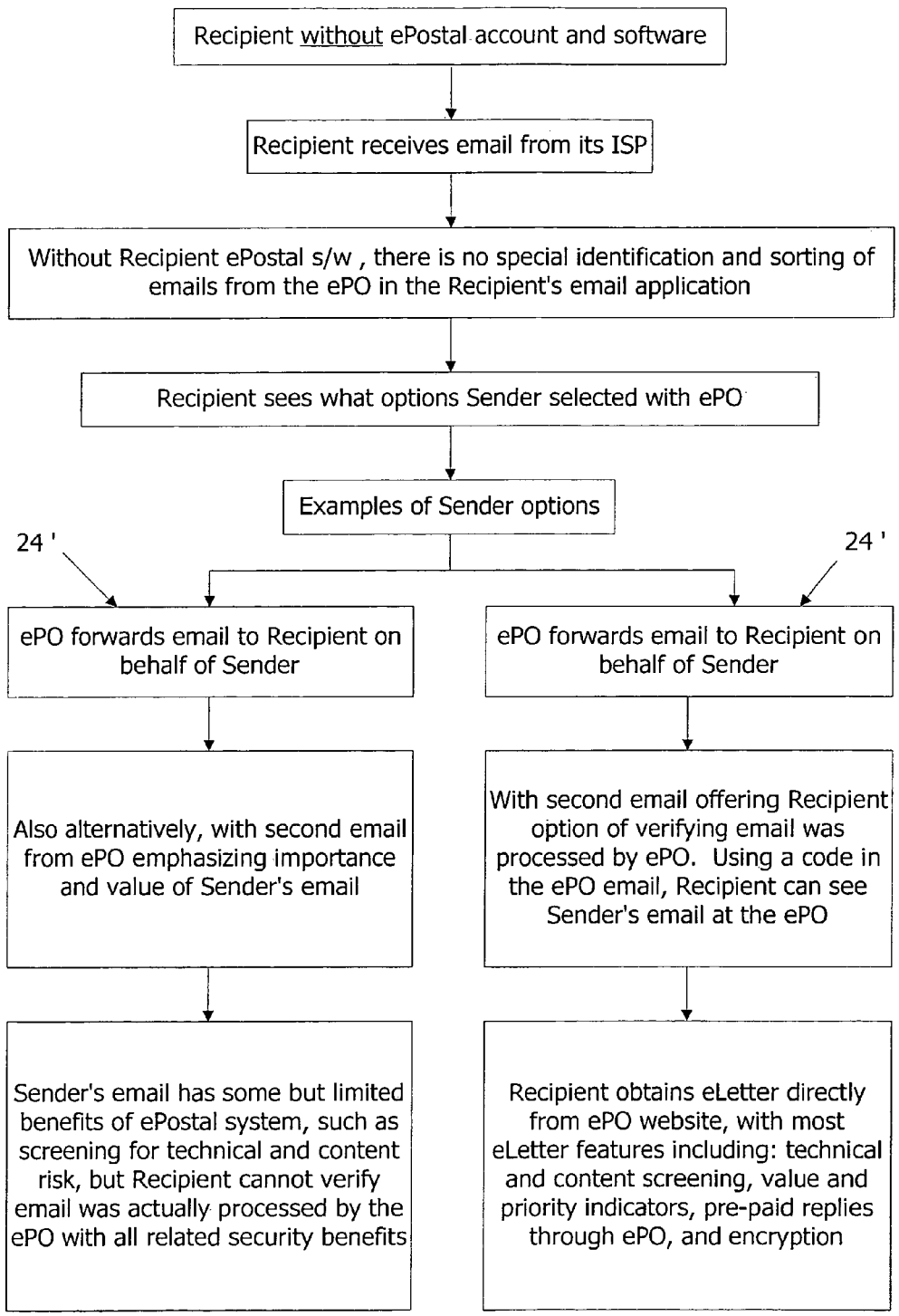

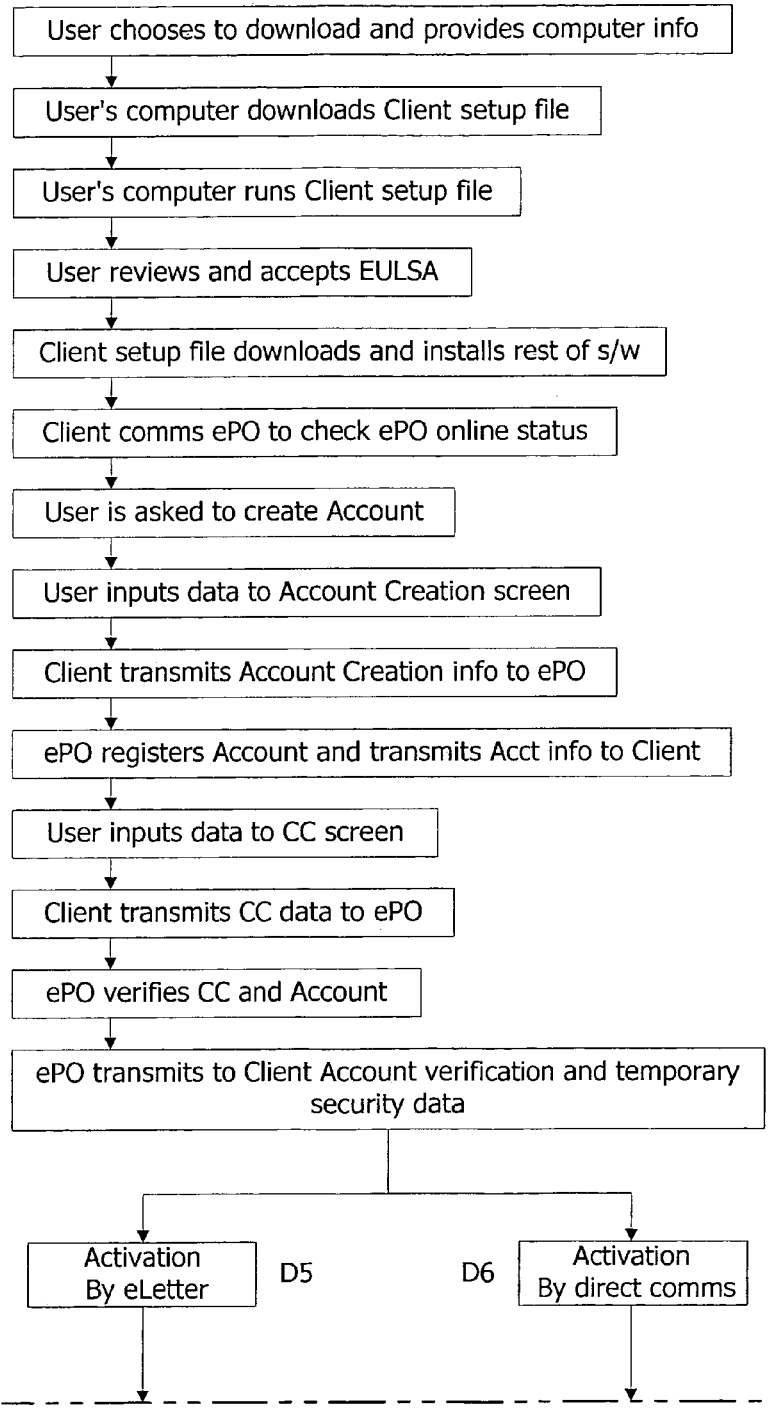

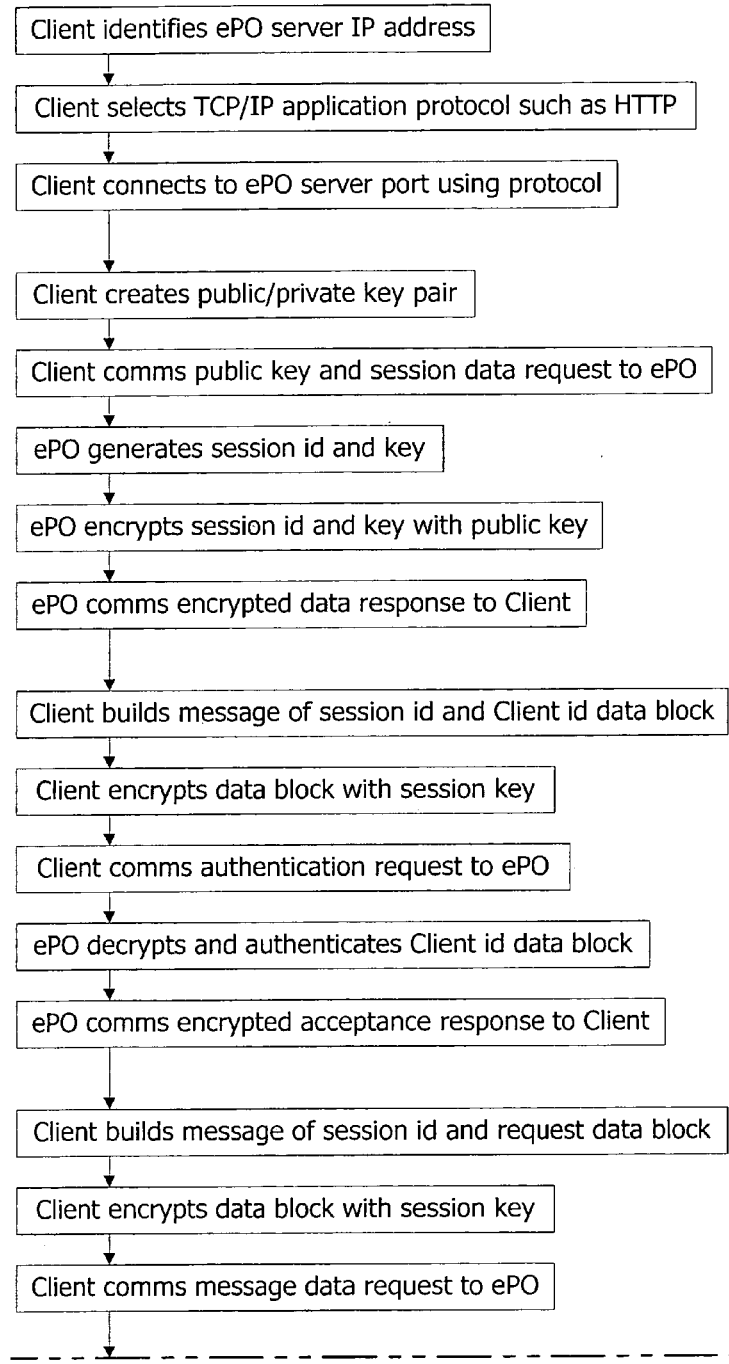

| Fig. 18A |
| Fig. 18B |

Fig. 19

Part 1 -- Identify

Sender 12 identification numbers

Part 2 -- Authenticate and verify

Value of MDC Hash

Symmetric key for Part 3

Part 3 -- Process eLetter identification numbers

Other Sender and Recipient data

Selected services data

Other data hashes

Symmetric key for message body

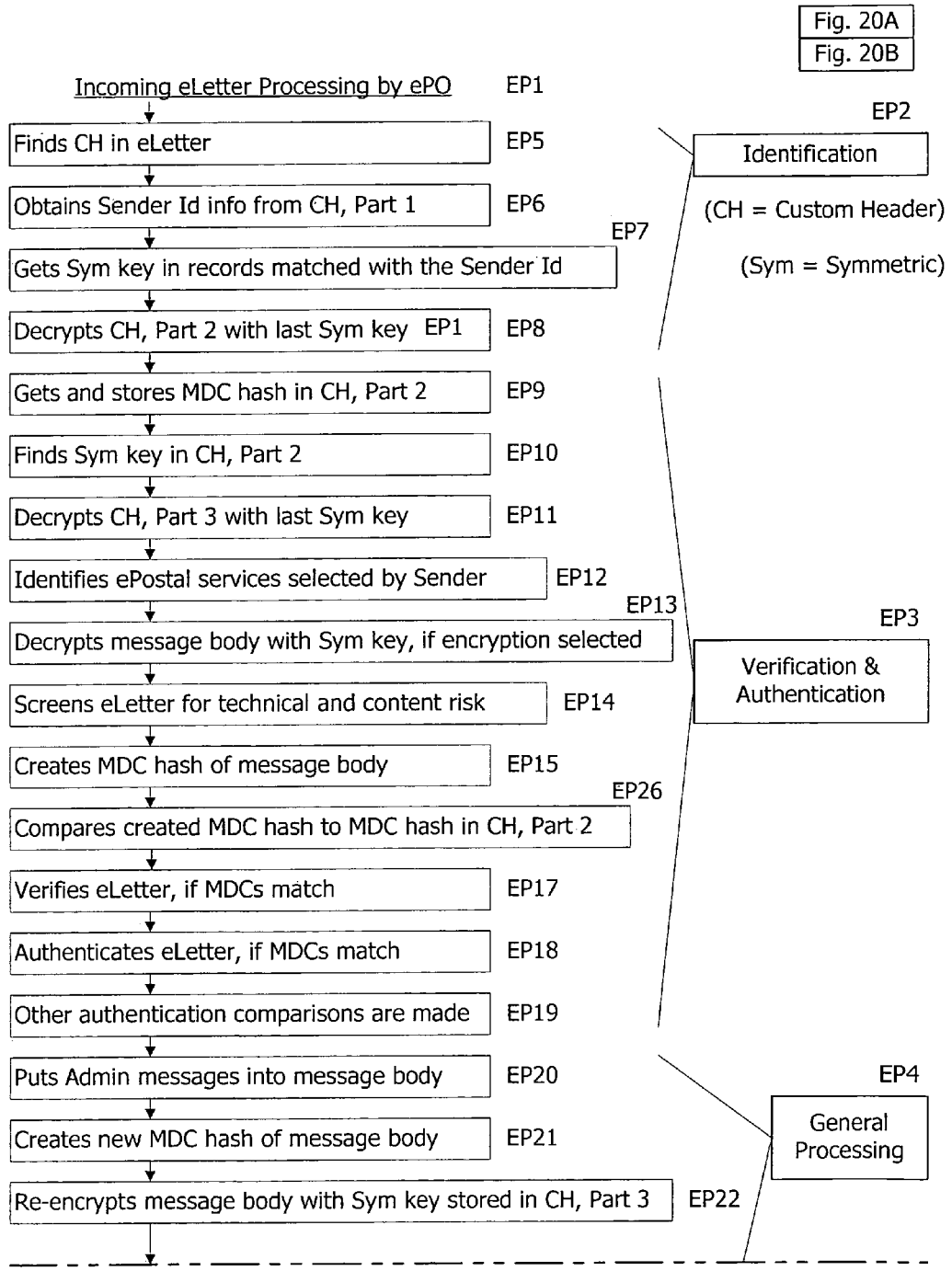

Fig. 21

Custom Header 1 -- Identify

Multiple pairs of:
  [ Recipient 14 identification number; Symmetric key for Header 2 ]

Custom Header 2 -- Authenticate, verify and process eLetter identification numbers Value of MDC Hash Other Sender, ePO and Recipient data Selected services data Other data hashes Symmetric key for message body

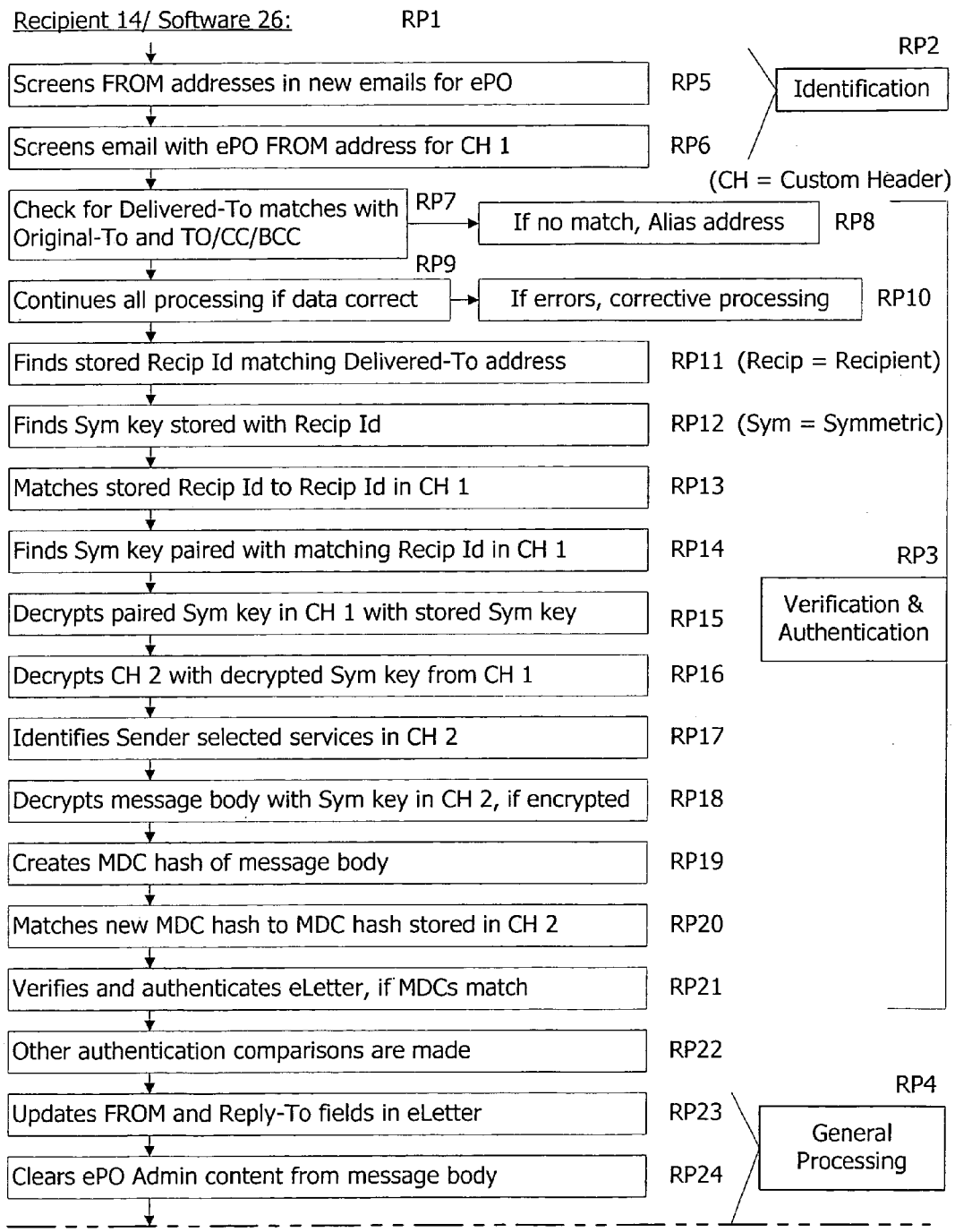

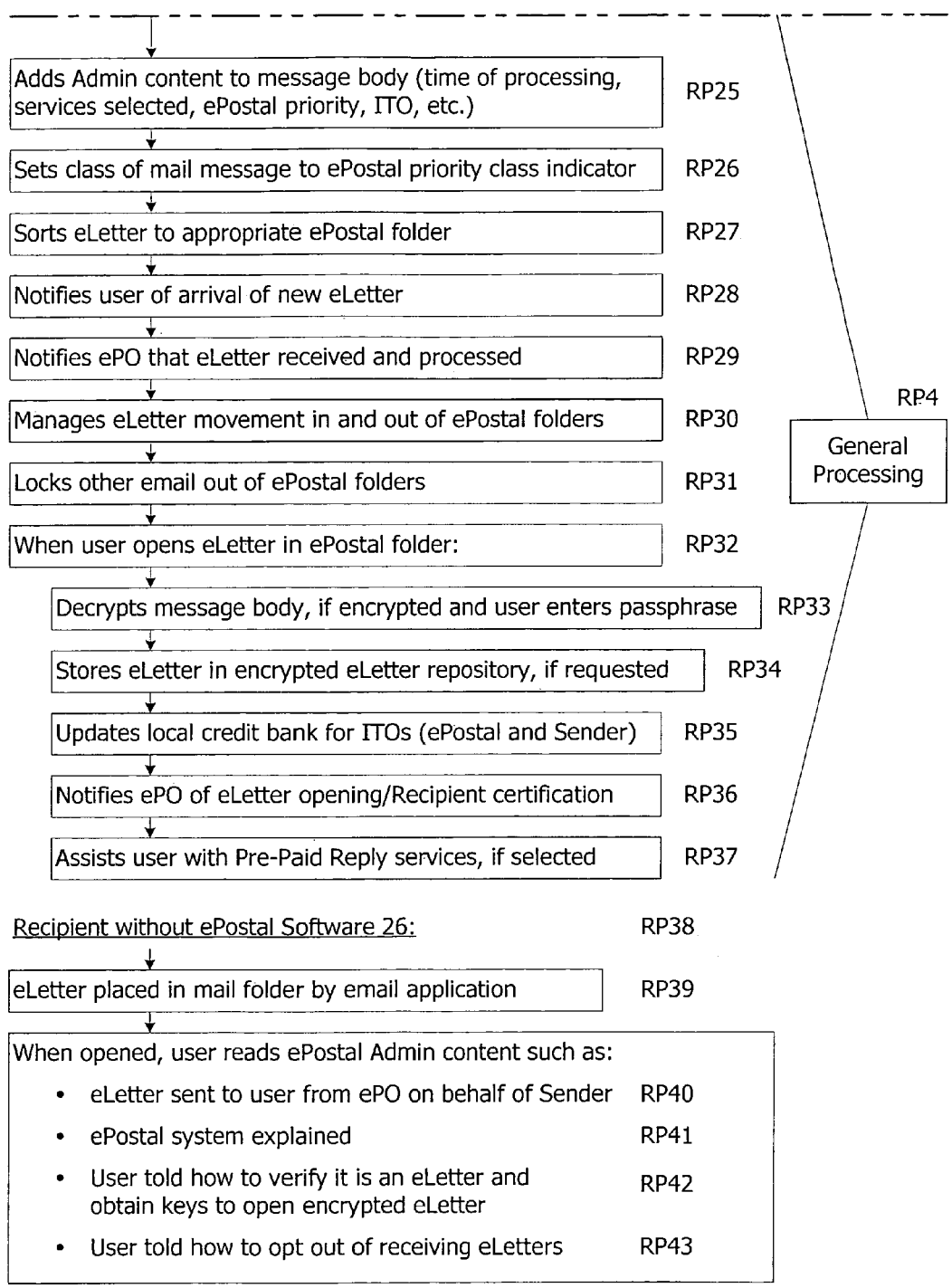

MESSAGING AND DOCUMENT MANAGEMENT SYSTEM AND METHOD

CROSS-REFERENCE TO RELATED APPLICATION

This application is a continuation-in-part of U.S. patent application Ser. No. 10/803,601, filed Mar. 17, 2004, U.S. Pat. No. 7,502,828 to issue Mar. 10, 2009, which claims priority under 35 U.S.C. 119(e) of U.S. Provisional Application No. 60/455,132, filed Mar. 17, 2003, the disclosures of which are incorporated by reference.

BACKGROUND OF THE INVENTION

The present invention relates in general to communications systems and methods. More specifically, it relates to a system and method that enables the public to send and receive electronic mail and messages over the Internet with greater assurances of delivery, security, privacy, priority and manageability than conventional email.

The Internet has produced a revolutionary change in the sharing of information. The growth in electronic, or "e" mail, over the Internet has been spectacularly robust, with similarly strong future expansion forecasted. Email use is exploding because of the proliferation of computing devices of various types, and because of the greater availability of, and access to, telecommunications bandwidth. An estimated 31 billion email messages were sent daily during 2002, and that number, increasing by more than 20% per year, is expected to exceed 60 billion per day in 2006.

However, this rapid increase in email has produced significant, and largely unanticipated, problems. While email is an easy and inexpensive way to send someone else a message or document, those same attributes have led to recipients receiving unexpectedly large, and increasing, quantities of email, both wanted and unwanted.

The explosion in wanted email is, by itself, causing an ever-increasing overload problem. Of the 31 billion total daily email messages in 2002, an estimated 21 billion per day were wanted emails, i.e., those recipients deem of value, whether solicited or unsolicited in nature. And, that volume of wanted email is expected to reach 36 billion per day in 2006.

Compounding this overload situation is the growing quantity of email that is both unwanted and unsolicited (and sometimes offensive). This increasing volume of nuisance email not only frustrates email recipients but also restricts and constrains the optimal development of the Internet email system. Other negative aspects of this nuisance email—such as reduced business efficiency, increased costs and expanded security risks—are well known. See, for example, the discussion of the negative effects of nuisance email in U.S. Pat. No. 6,321,261 to Donaldson.

As total email volume grows, the recipient's (and sender's) problem becomes analogous to a regular postal mail box that receives far more mail than it can hold. Without such meaningful priority differentiation, a recipient needs to perform a time-consuming review of all daily emails in order to find and review the most important. Often, the magnitude of this repetitive and wasteful task drives recipients to just delete all emails, thereby risking the loss of information which is important and thus has value to recipients and senders alike. This massive message problem of both overload and nuisance email has become so onerous that a better system and method of email document management is urgently required. And, until such a system and method is available, the commercial utility of the Internet will remain constrained for many current or potential users.

For example, one currently constrained area is that of legitimate email marketing—the electronic equivalent of conventional direct mail marketing. Direct mail marketing has been an accepted and effective way of advertising and promoting goods and services for many years, both to consumers and to businesses. Its electronic counterpart has the potential—as yet unrealized—to grow and develop similar levels of acceptability and commercial effectiveness.

Today, the largest share of online advertising is in the form of banner ads, not emails. Of the $2.8 billion spent in the U.S. in 1999 for online advertising, banner advertising accounted for 50%, with email accounting for only 3%. Online ad spending has continued to grow rapidly reaching $12 billion in 2004 and is estimated to be $14.7 billion in 2005, an increase of 23% over 2004. However, banner advertising is notoriously inefficient and plagued by low click-thru rates. Therefore, there is a need for more effective Internet marketing methods—like direct email marketing—to gain audience attention, convey messages, and increase rates of response.

Email not only has a larger base than the Worldwide Web, but email also has the capability to give audiences personalized, media-rich, interactive communication where, and when, they are most receptive—a capability which will elicit a much greater response than banner advertising. But, email marketing cannot reach its full potential unless there is a better way to manage the growing email volume and clutter. At present, the email highways have so much "noise" that it distracts recipients from giving sufficient attention to legitimate online email advertising. Today, it is difficult for a recipient to understand the importance, value and priority of a particular email until it is opened and reviewed. And, this opening and reviewing process is time consuming, and exposes the recipient to technical risks (such as viruses and worms) as well as content risk (such as offensive words and pictures). A constraint on email marketing now is the concern that the communicated messages will be confused with, or associated with, valueless nuisance email.

A corollary problem with the Internet mail system—in addition to both overload and nuisance email—is security. The email security process that now exists is inadequate and impedes expanded usage of the Internet for many potential commercial purposes. Many email applications have encryption procedures, but their procedures are too complex for many email users, or not reasonably and/or generally available in needed situations. As such, email security represents another problem looking for an effective solution.

A good example of the security issue is provided by the email security requirements of the U.S. Federal Health Insurance Portability and Accountability Act (HIPAA). HIPAA has declared that emails (and faxes) which are not secured by encryption are unacceptable for communicating personal health care information (such as diagnosis codes, test results and certificates of medical necessity) among doctors, other health care providers, and insurance organizations. When this law went into effect in the United States in October 2003, many health care service firms still had no email systems which met the HIPAA requirements for communicating protected health care information. Technology is not readily available, or is not acceptably cost-effective for many health care providers. This situation continues today, unresolved.

For wanted email, there is currently no known solution to the email overload and priority differentiation problems described above.

For the unwanted, unsolicited, nuisance email portion of the problem, some vendors supply software filters that block and exclude emails using various rules applied to email subject lines, sender addresses, and some content of the email. This software can reside on a service provider's server or the user's computer system. These nuisance email blockers allow the customer varying capabilities to adjust the filter rules. The aforementioned '267 patent to Donaldson also discusses the various categories of known nuisance email control solutions as of 1999. The '267 patent itself describes an active probe filter with multiple layers of defense located in a conventional firewall configuration between a remote host and a local message transfer agent.

One recent example of such a software filter service is an Internet Service Provider (ISP) that uses a filter sold under the trade designation "Brightmail" within its email system. The filtering rules and software are controlled by the ISP, and the existence of this filter was even unknown to at least some of its customers when the filter was initially activated. Some, but not all, unsolicited email is blocked. Unfortunately, some unsolicited-and-wanted email is blocked, and some unsolicited-and-unwanted email still comes through. Even worse, some wanted (and solicited and expected emails) are also blocked, and a recipient does not know at the time that they have been blocked. To see if and what emails are being blocked, a customer must leave his email application, go to the ISP's website, enter a particular area of that website, log in with user identification (I.D.) and password, and scroll through days and lines of emails. To unblock specific senders, a customer must email the sender's email address to the ISP, which is the only entity that can correct the filtering rules.

Included among the many drawbacks of these nuisance email filtering services and software are that they:

Block many wanted emails from reaching recipients. One information technology market research firm has estimated that this problem cost businesses $3.5 billion in 2003.

Allow many economically valueless, unwanted, unsolicited and offensive emails to reach recipients. And, these cost businesses an estimated $10 billion in 2003.

Do not filter or screen email for content risk by any general, public standard.

Do not universally screen email for technical risk.

Do not provide any publicly accepted priority or value indicators on emails so recipients can quickly see and automatically sort such higher priority emails from other lower priority email.

Do not provide any means to give incentives to recipients to open priority-designated email.

Do not provide for any integrated email tracking service for senders or recipients.

Do not offer any officially recognized notification of receipt or opening.

Do not offer any comprehensive security measures other than anti-virus screening. There are known email encryption services, but these services also are not part of a complete service package that addresses the above described email overload and nuisance email problems as well. In addition, most current email encryption and digital signature methods are complex for common email users, including those procedures that are part of current generally-available email applications.

Do not work in many cases easily and seamlessly from within the user's email application.

One example of an organization that has sought to address these defects is the U.S. Postal Service (U.S.P.S.) itself. But, the U.S.P.S. process requires a sender to leave his own email application, go to the U.S.P.S. website, and compose a letter there. The U.S.P.S. then prints the document out, puts it in an envelope, applies postage and physically delivers it. In 2003, a one-page letter produced in this fashion cost the sender 50 cents. While some may find this service attractive, it suffers in that the sender cannot use the convenience of his own mail box (i.e., his own email application) to mail the document. Second, this system is still mostly a physical, non-electronic process with all the limitations inherent in physical mail delivery. Third, the recipient cannot make use of his electronic mailbox (that is, his email application) to receive the document.

Today, the need for better email security—like the overload and nuisance email problems—is only met with partial solutions. Providers of secure email services focus only on secure email services. In addition, these partial services often involve cumbersome procedures including, for example, requiring senders to leave their email applications and log into the service provider's website.

It is therefore an object of this invention to provide a complete and commercially viable solution to all these email problems without impeding the nature of the Internet.

The invention manages an internet-based communication system that unlocks the commercial value of email for large and small businesses and individuals.

Another object of the invention is to empowers all senders of email using the system to differentiate and prioritize, safeguard and secure, special-deliver and track, and sort and manage the email more effectively.

It is a further object of the invention to create a restricted-access, yet generally and publicly available, special communication channel that gives businesses and individuals alike the capability to obtain intranet-like security benefits, without the usual expense.

It is a further object of the invention to solve the major problems which presently constrain the use of email for commercial purposes, so that commercial users can expand their customer service and revenue opportunities, while reducing their email risk and expense.

BRIEF DESCRIPTION OF THE DRAWINGS

FIGS. 2A and 2B are an operational block diagram for Sender ePostal operations including Sender ePostal software according to the current invention used in the system shown in FIG. 1;

FIGS. 3A-3C are an operational block diagram for ePostal server software according to the present invention operating as an ePost Office communicating over the Internet between the Sender and Recipient as shown in FIG. 1;

FIGS. 4A-1, 4A-2, and 4B are operational block diagrams for Recipient ePostal operations with and without, respectively, Recipient ePostal software according to the present invention used in the system shown in FIG. 1;

Figure 1:
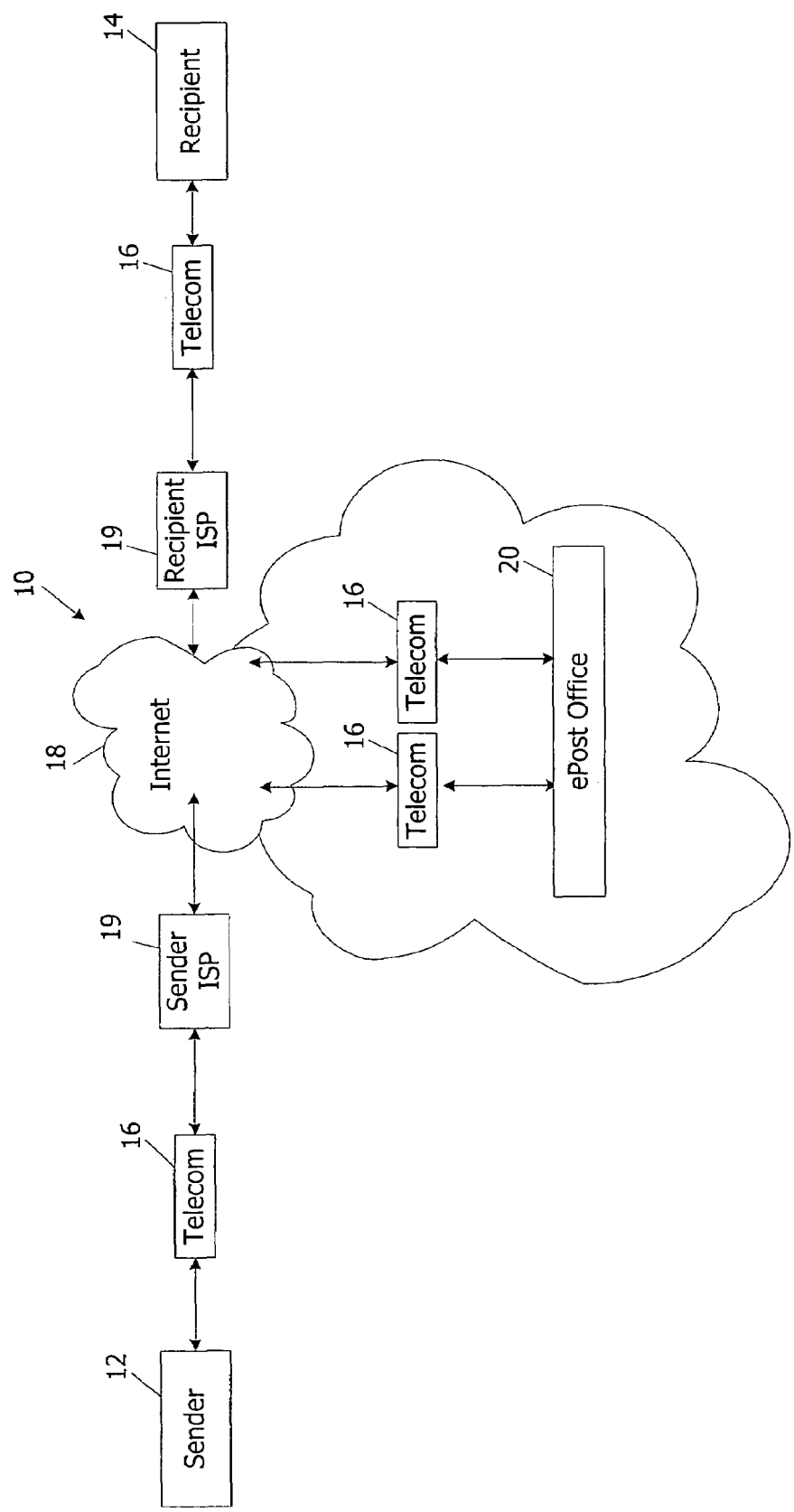
FIG. 1 is a block diagram of an ePost Office and ePostal Internet communication system constructed and operated according to the current invention.
Figure 5:
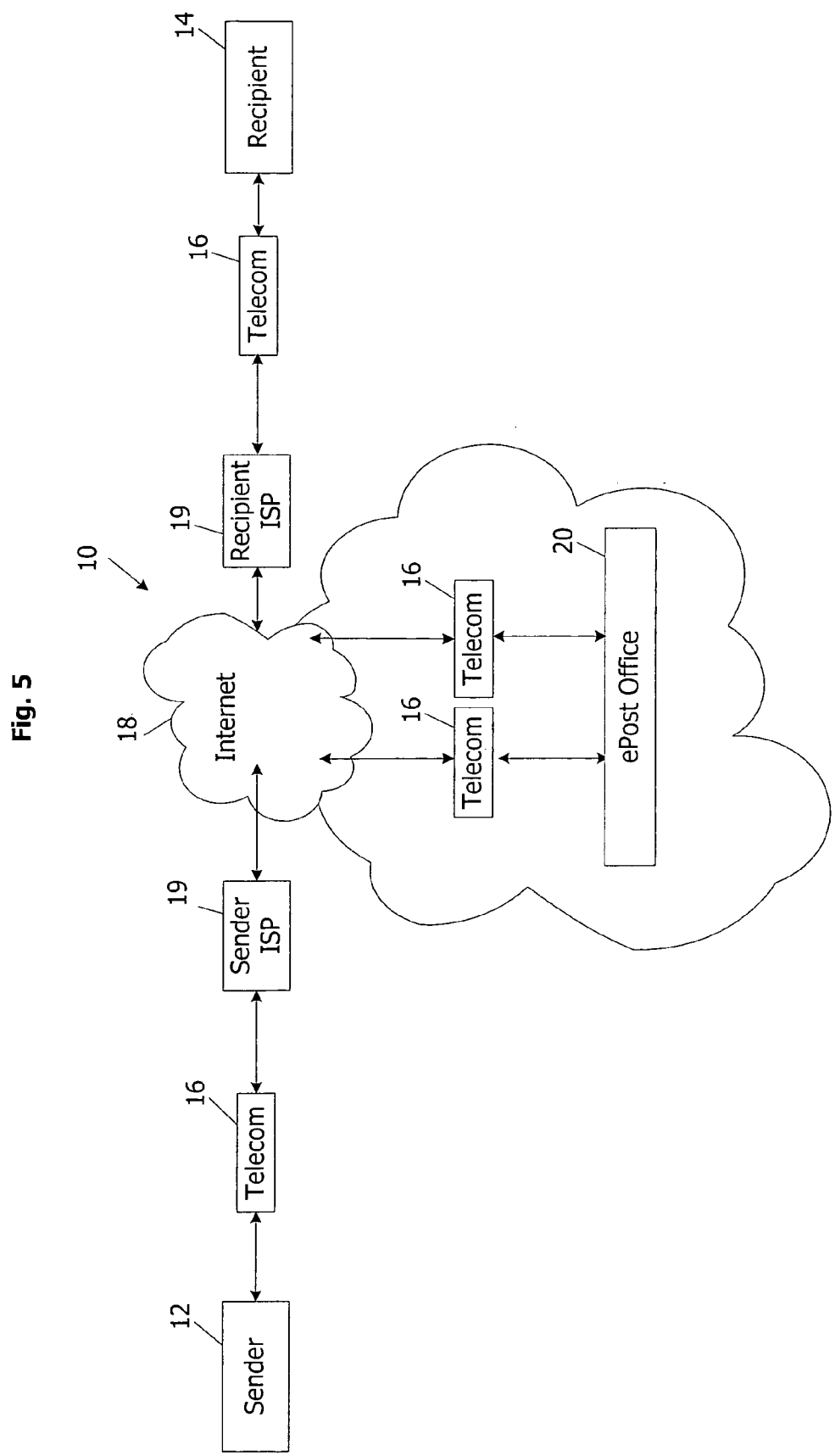
FIG. 5 is a view corresponding to FIG. 1 of alternative embodiments of this invention where Sender and Recipient do not have the ePostal software shown in FIGS. 2A, 2B, 4A-1, and 4A-2 on the computer they are presently using, but have ePostal accounts, and can send and receive eLetters through the ePostal system at the ePost Office window, or ePostal website.
Figure 7:
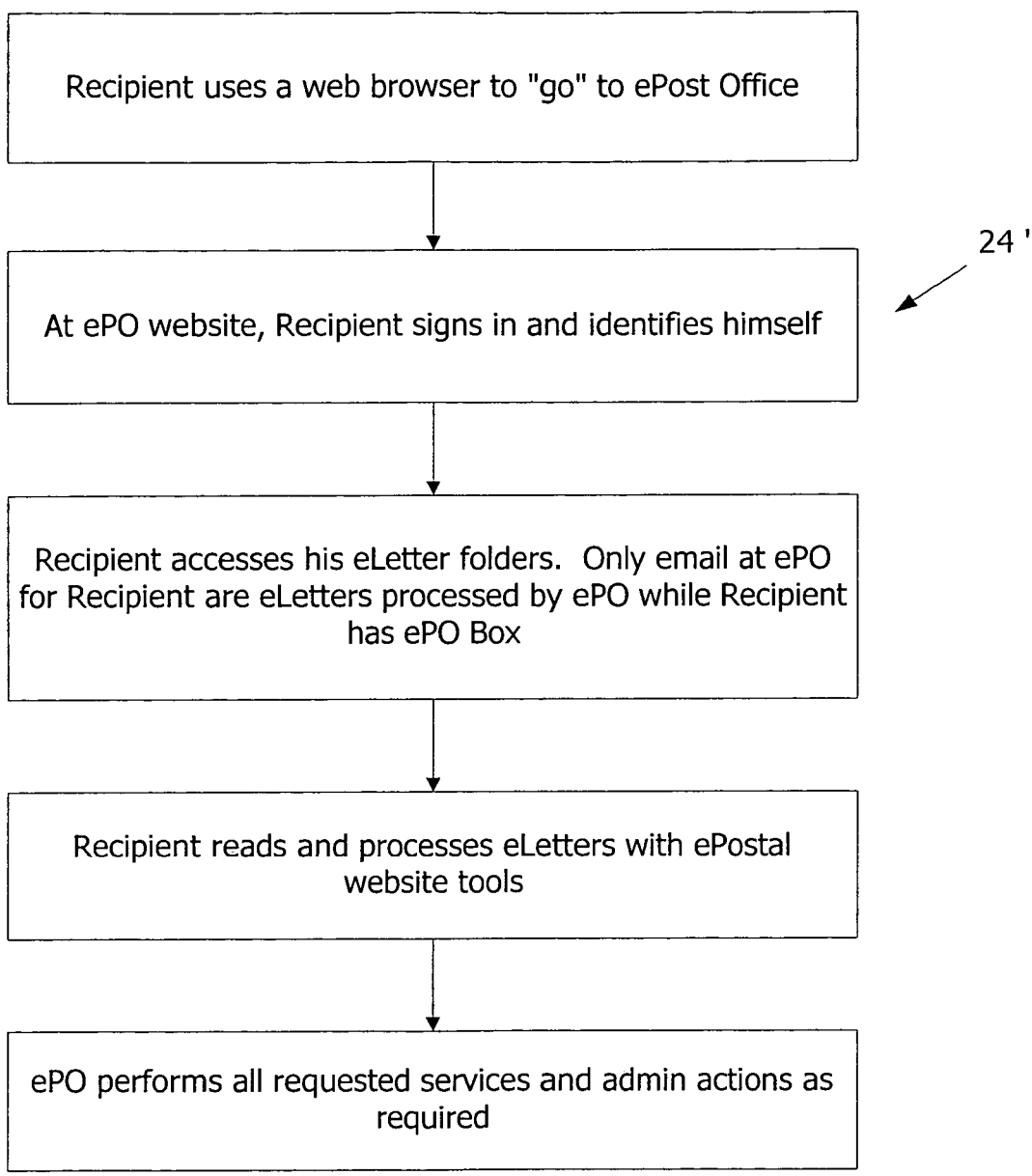
Figure 8:
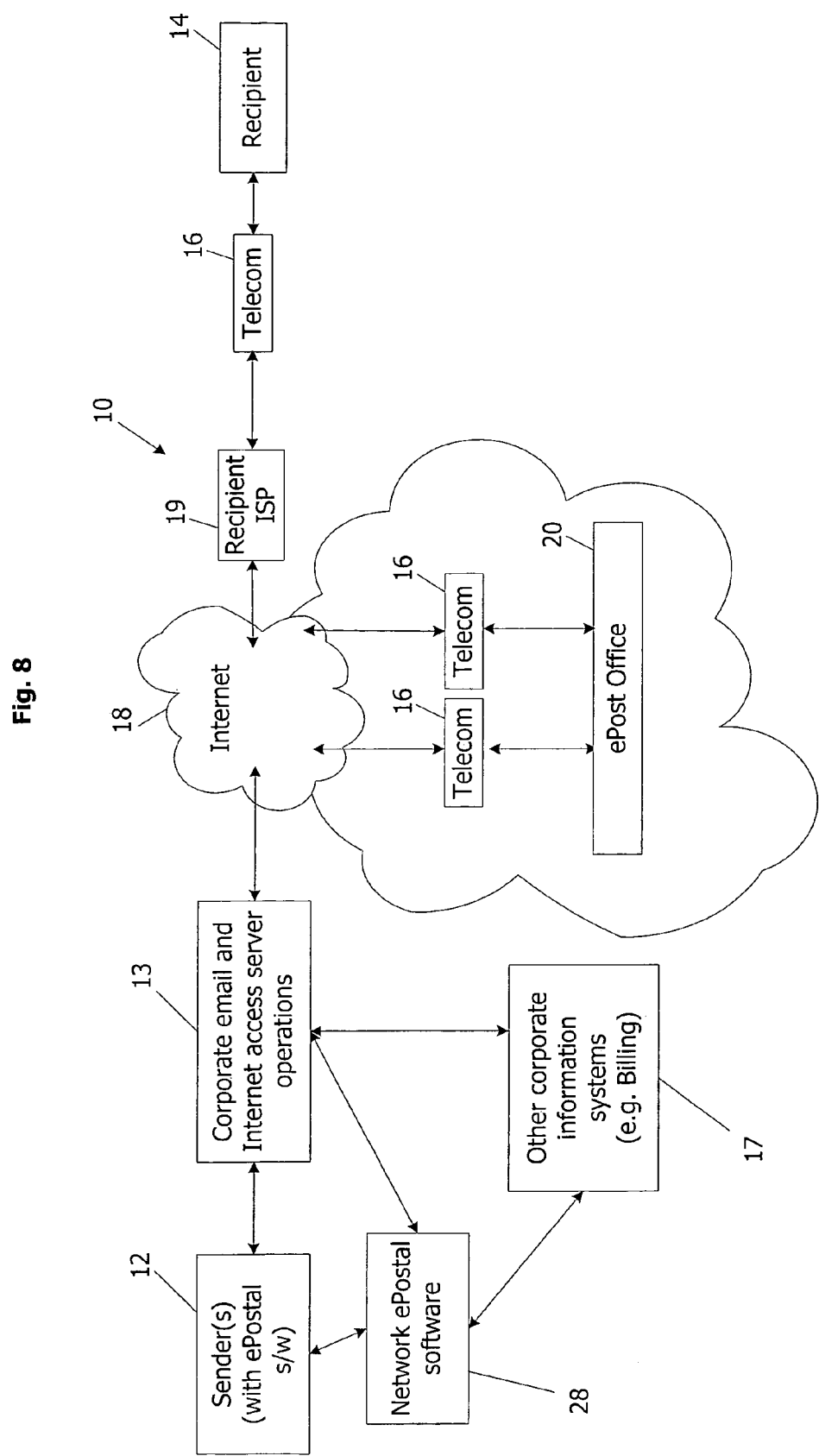
Figure 9:
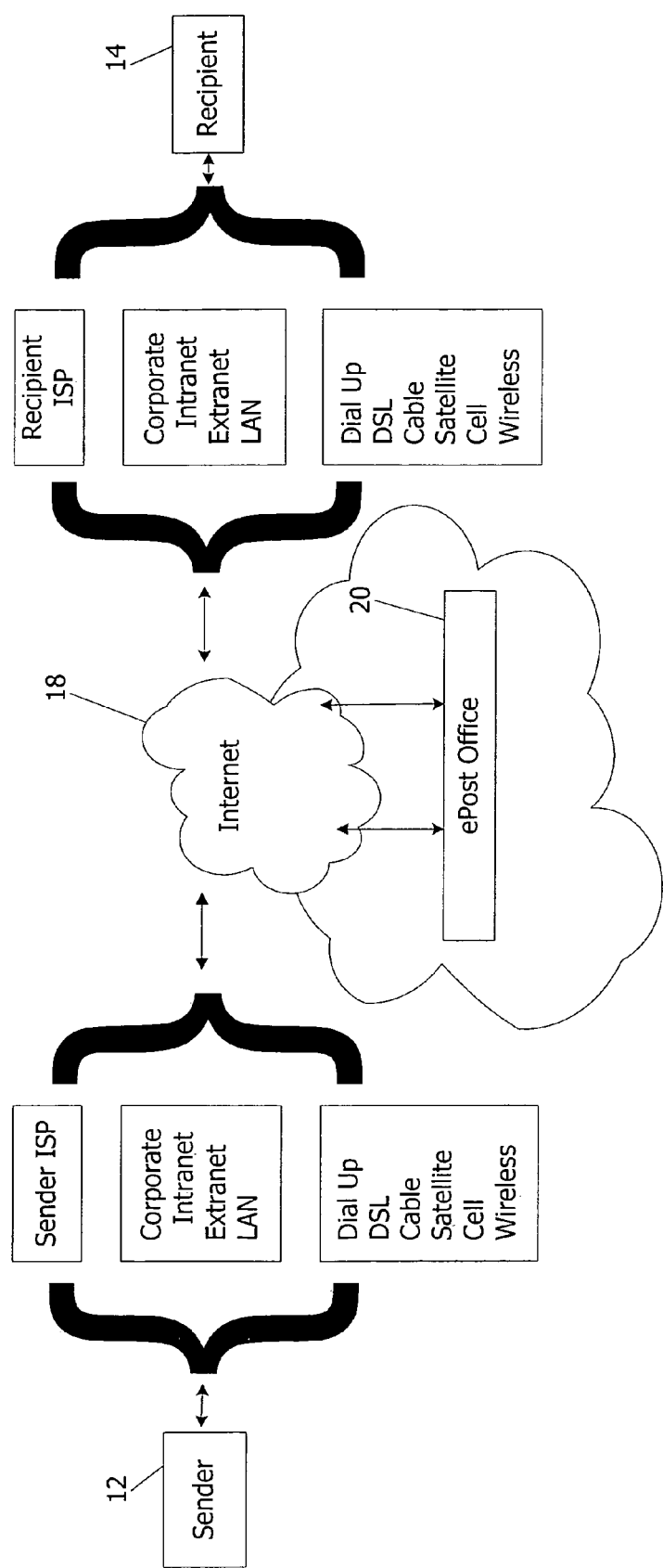
Figure 10:
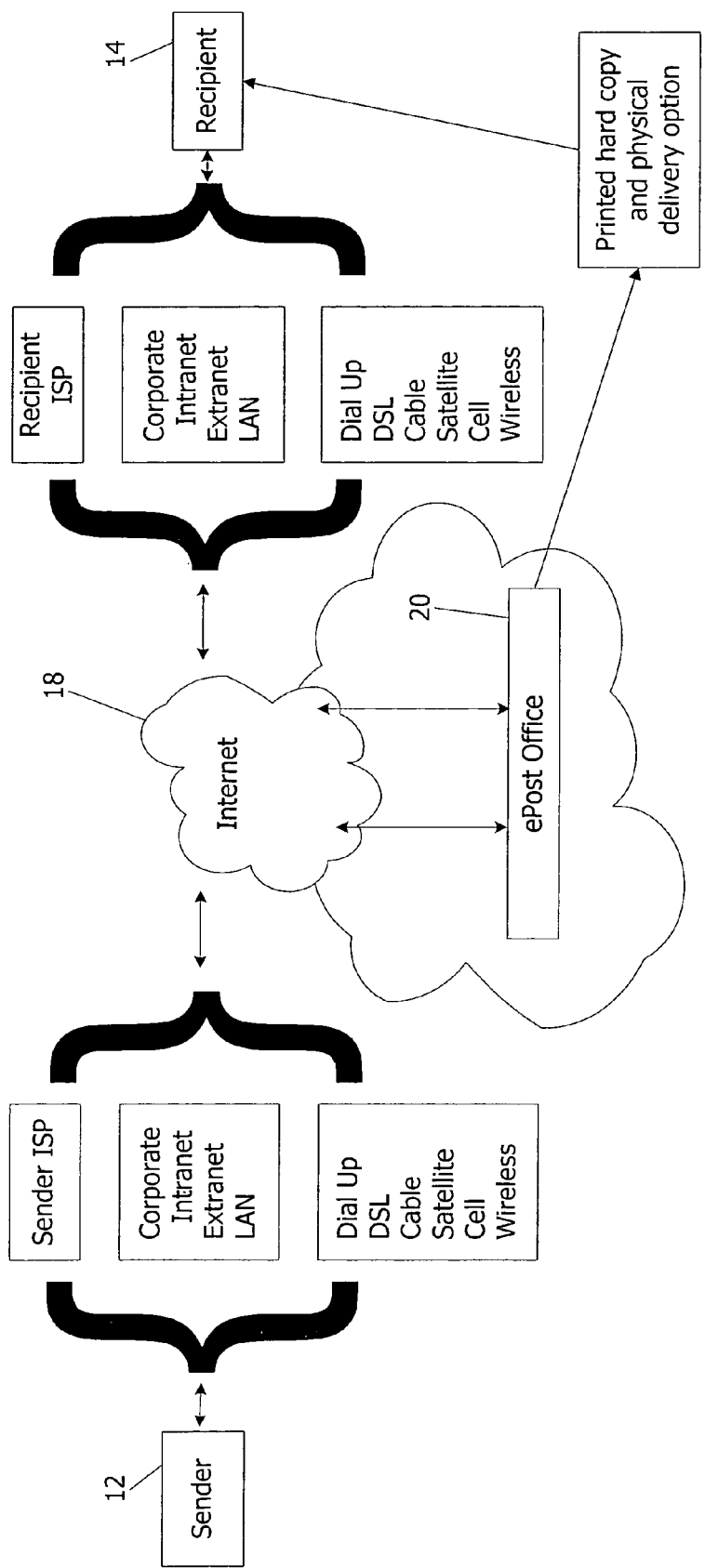
Figure 11:
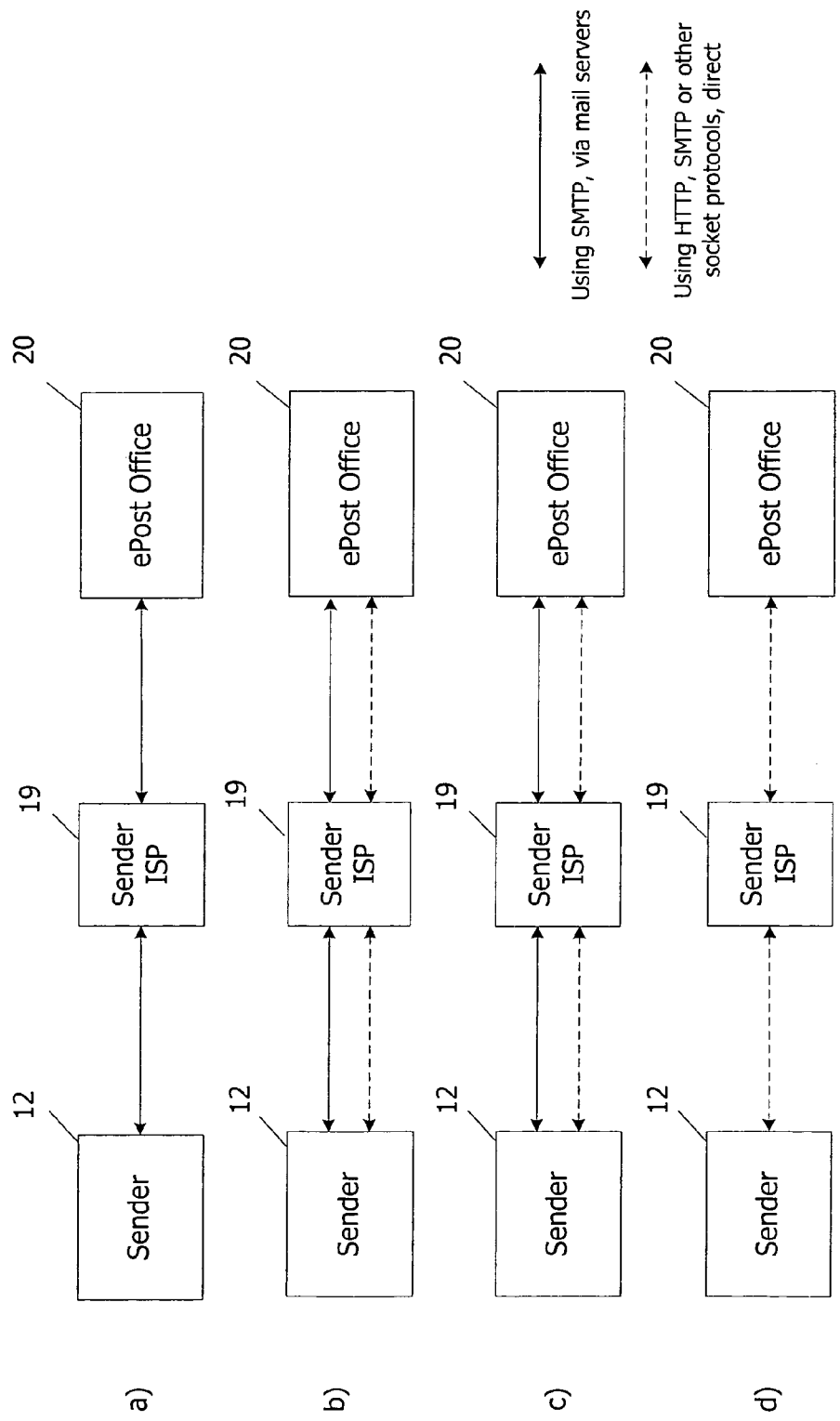
Figure 12:
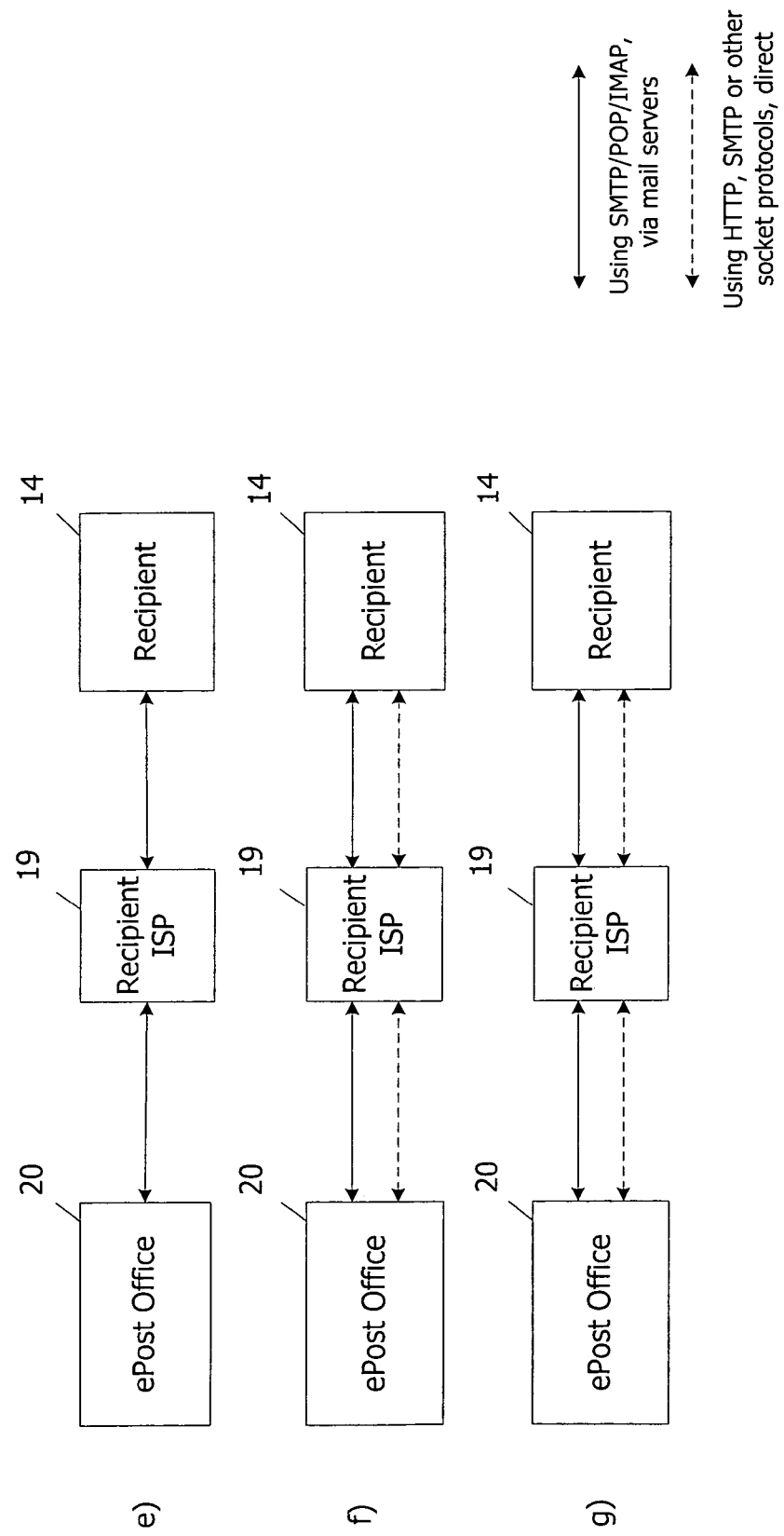
Figure 13:
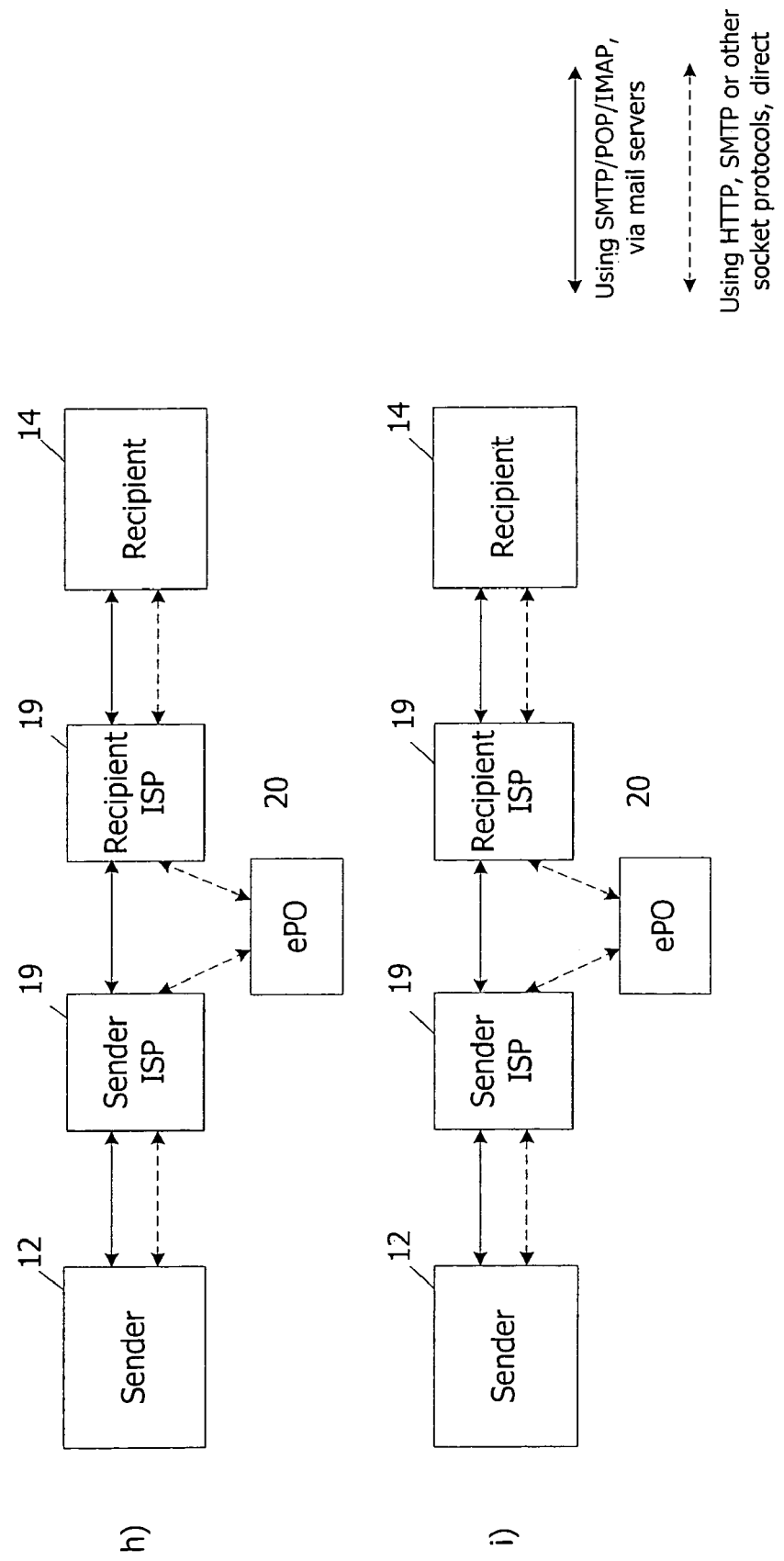
Figure 14B:
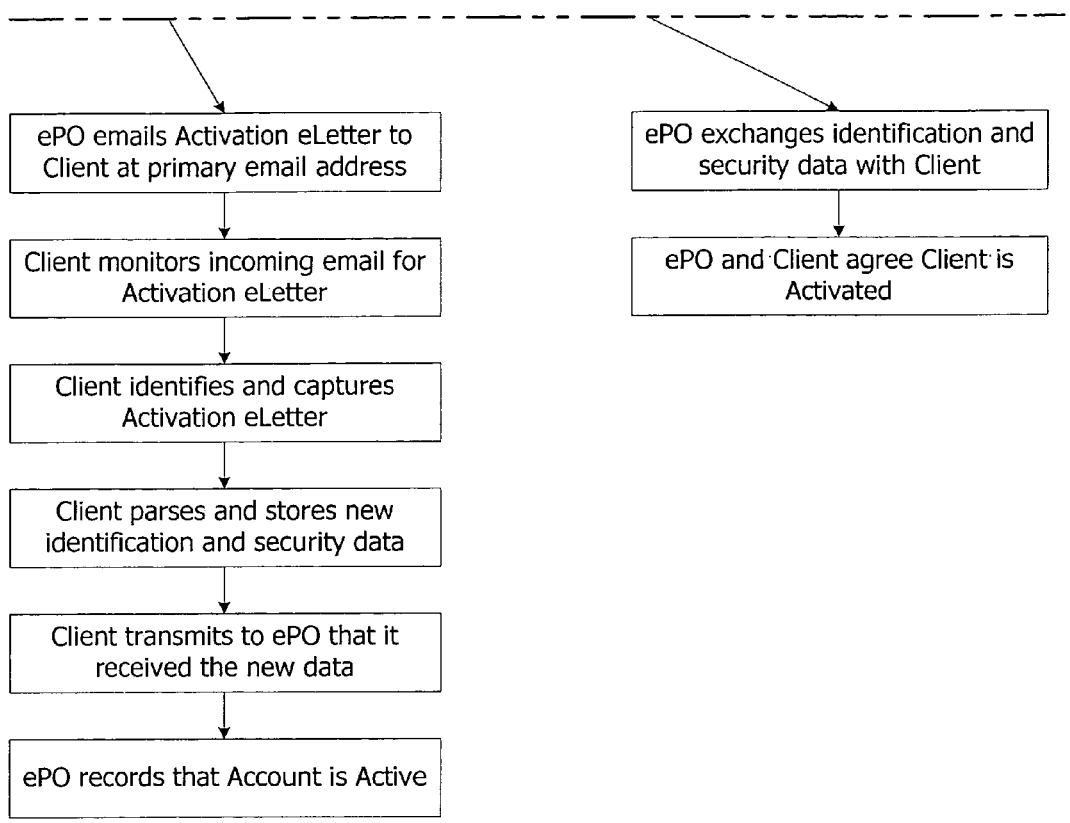
Figure 15:
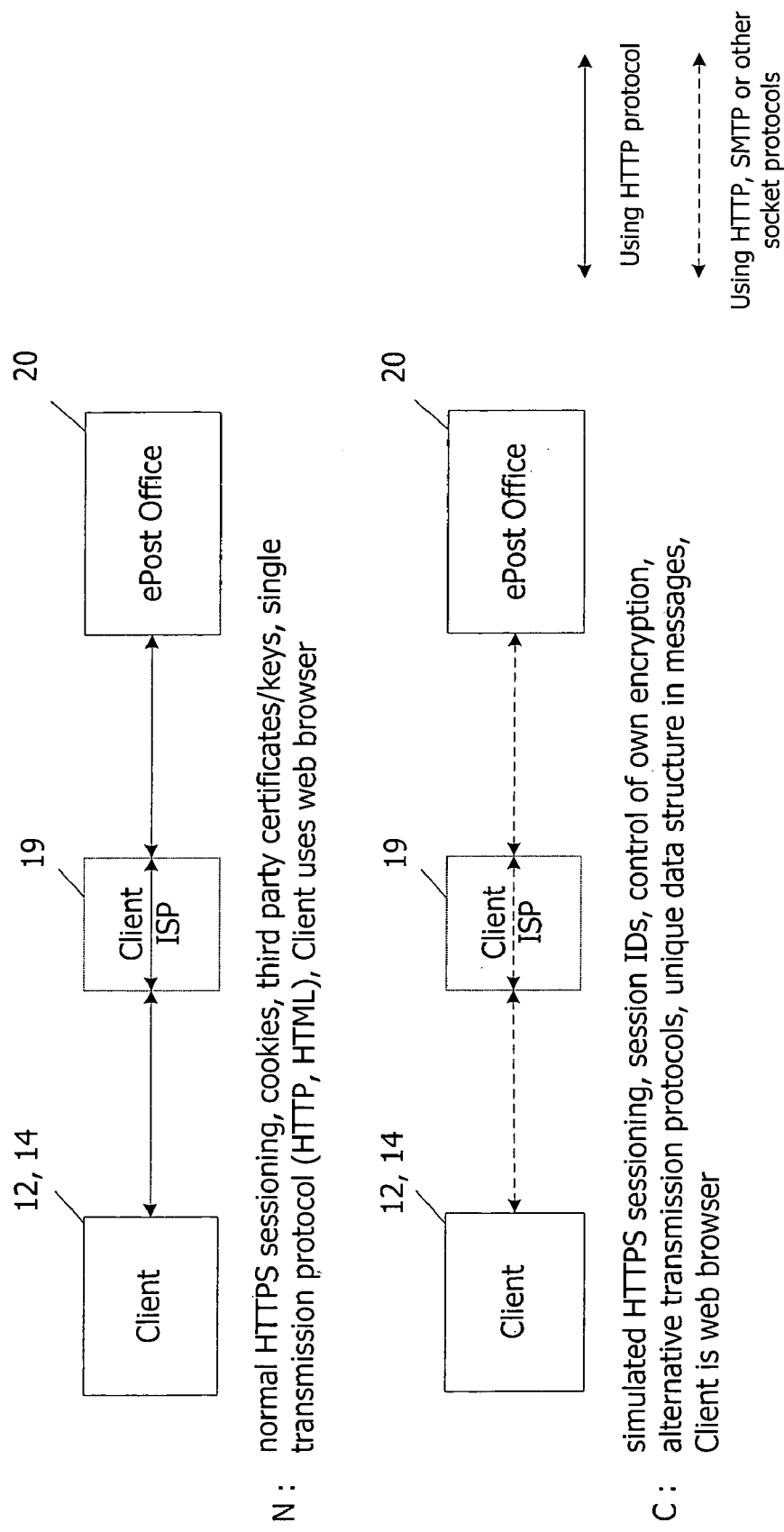
Figure 16B:
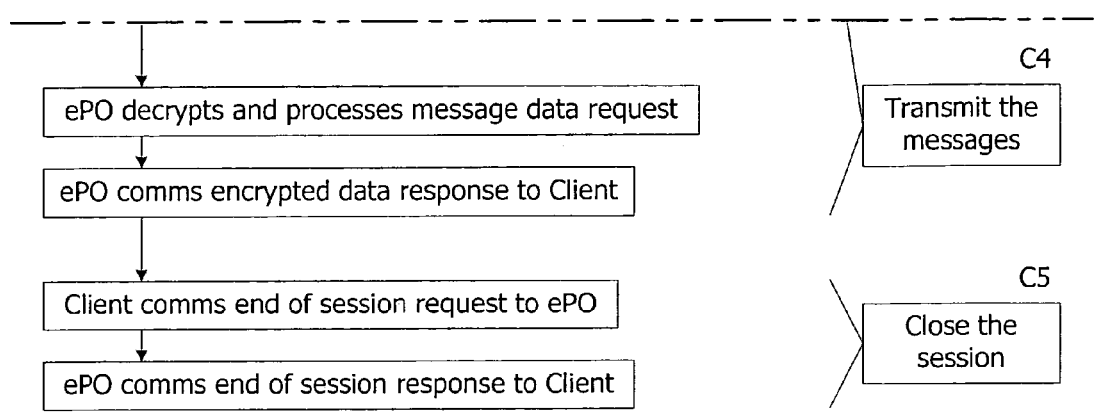
Figure 17:
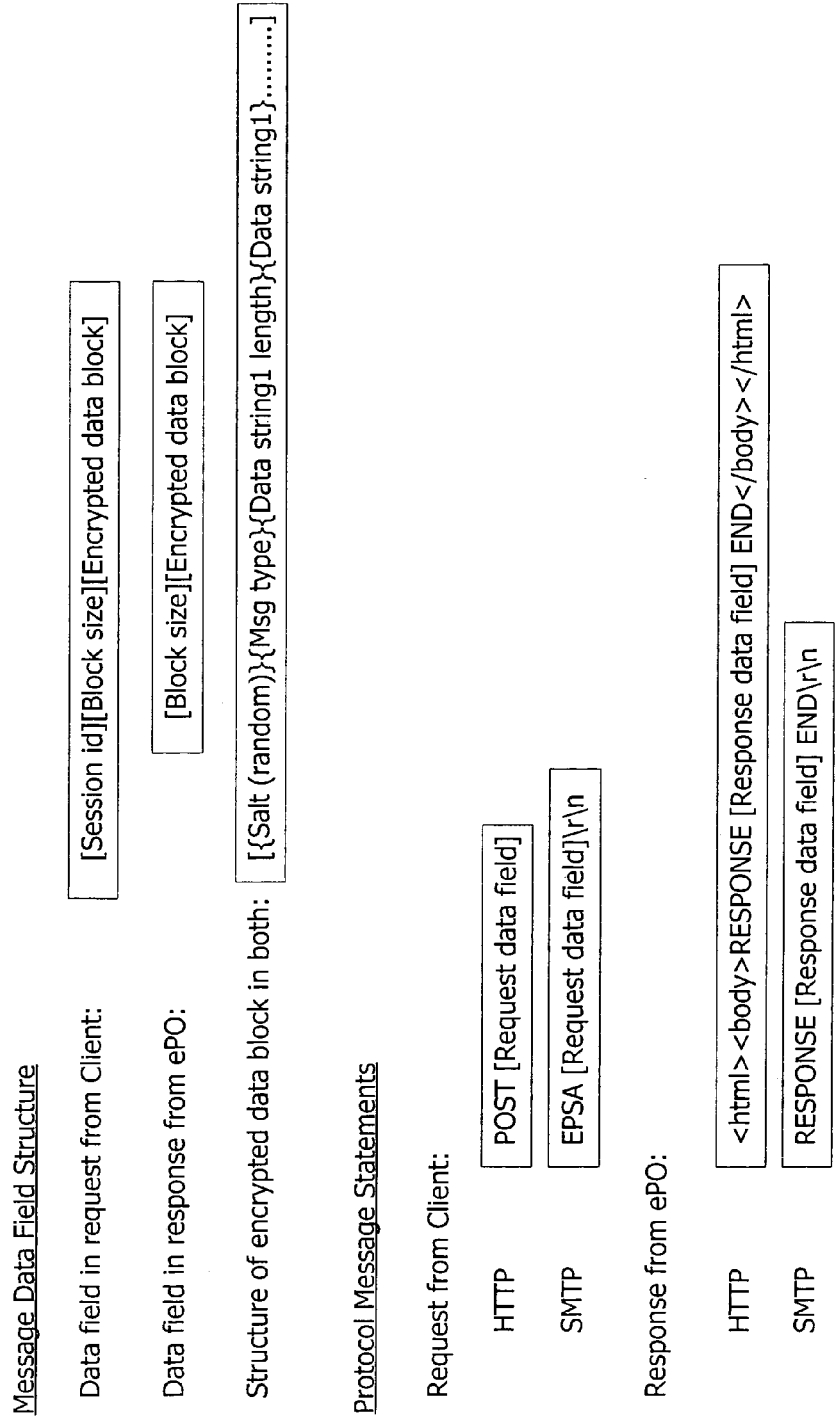
Figures 18, 18A:
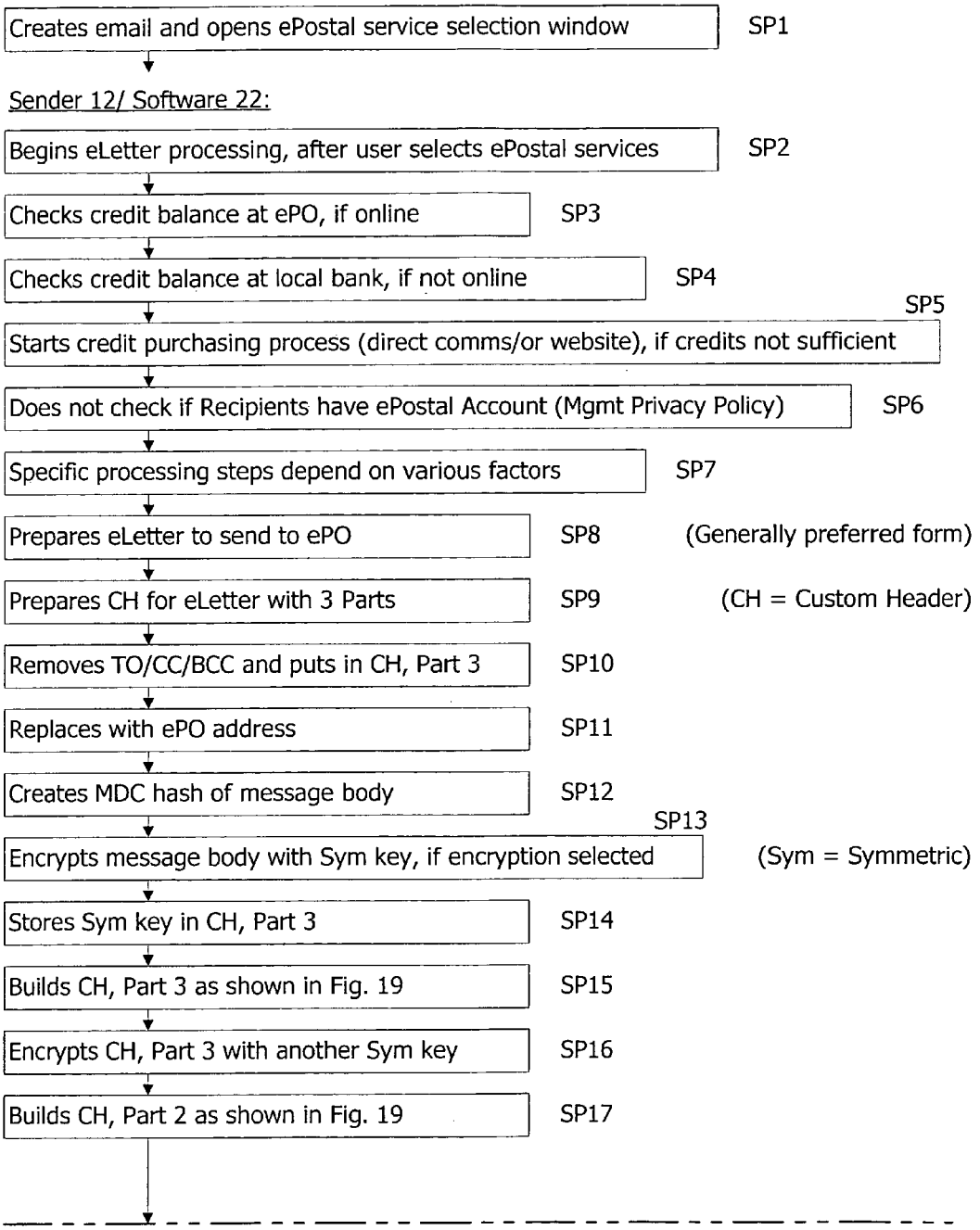
Figure 18B:
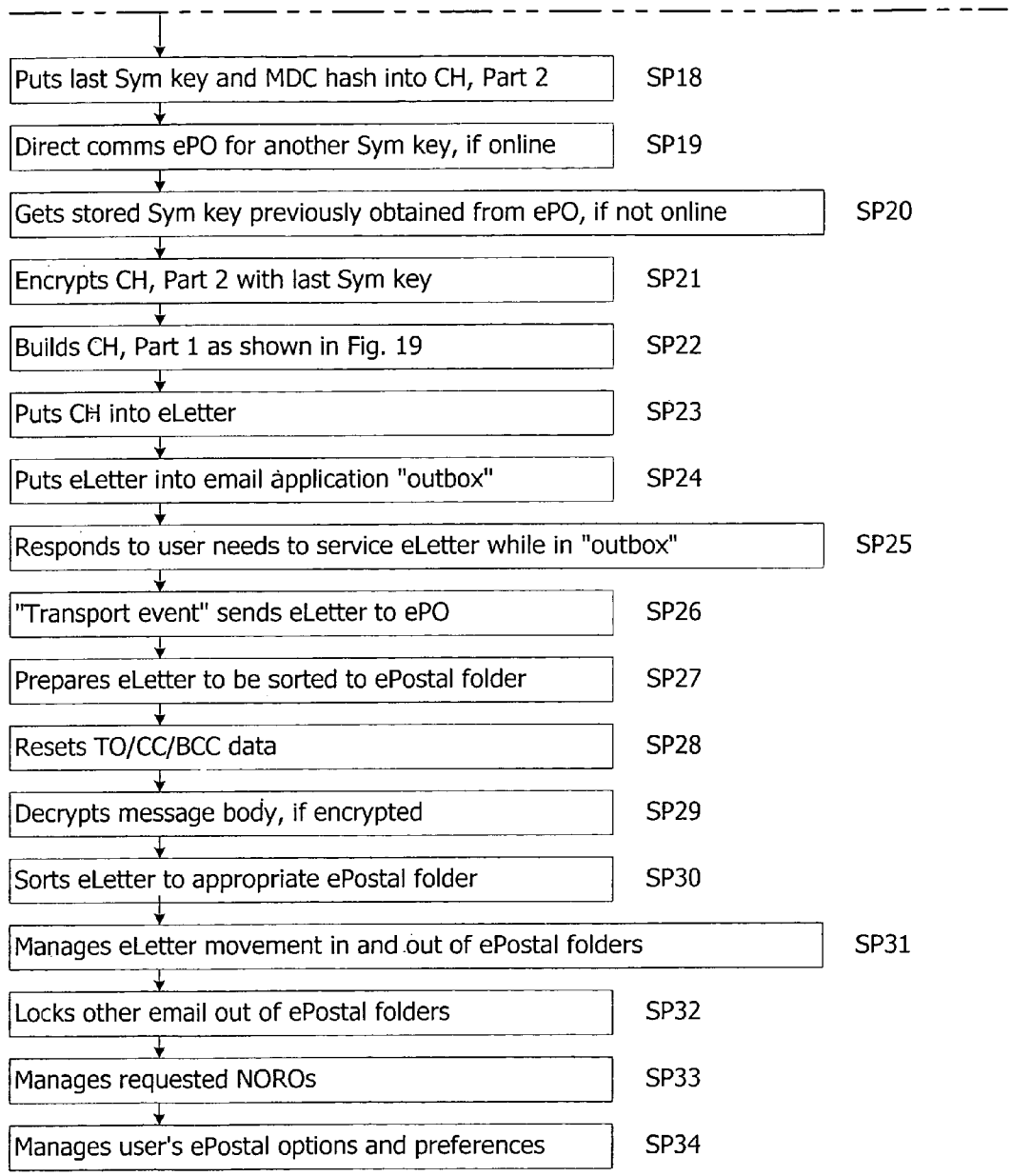
Figure 20B:
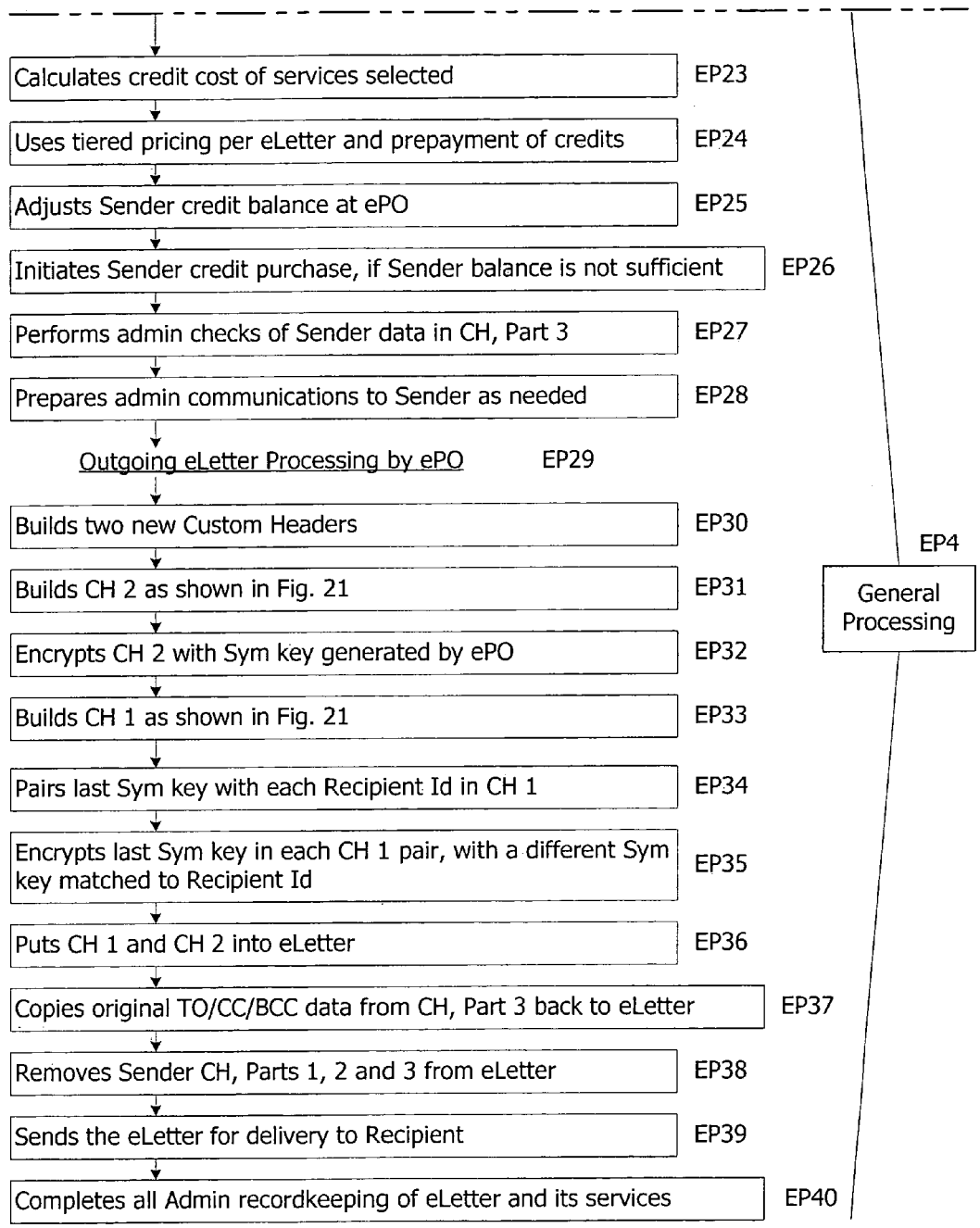

or ePostal website, according to the present invention for use in the embodiment shown in FIG. 5;

FIG. 7 is an operational block diagram of the Recipient ePostal operational interactions at the ePost Office "window," or ePostal website, according to the present invention for use in the embodiment shown in FIG. 5;

FIG. 8 is a view corresponding to FIGS. 1 and 9 of another embodiment of the invention where, within a network, elements of ePostal operations according to the invention are shared between both the Sender/Recipient level and the network server level;

FIG. 9 is a view corresponding to FIG. 1 of another embodiment of the invention using various modes of connection to the Internet;

FIG. 10 is a view corresponding to FIG. 1 of another embodiment of the invention showing an option of physical delivery to the Recipient;

FIG. 11 is a view corresponding to FIG. 1 showing alternative embodiments of the invention for sending ePostal email and related ePostal data from the Sender to the ePost Office;

FIG. 12 is a view corresponding to FIG. 1 showing alternative embodiments of the invention for sending ePostal email and related ePostal data from the ePost Office to the Recipient;

FIG. 13 is a view corresponding to FIG. 1 showing alternative embodiments of the invention for sending ePostal email and related ePostal data from the Sender directly to the Recipient;

FIGS. 14A and 14B are an operational block diagram of an exemplary embodiment of steps for the user download, installation and activation of the ePostal software;

FIG. 15 is a view of an exemplary embodiment for the direct communications between the ePostal Client (Sender and Recipient) software and the ePost Office;

FIGS. 16A and 16B are an operational block diagram of an exemplary embodiment of direct communications between the Client software and the ePost Office;

FIG. 17 is a table showing an exemplary embodiment of the message data structures according to the present invention for direct communications between the ePostal Client software and the ePost Office;

FIGS. 18A and 18B are an operational flow diagram of an exemplary embodiment of the Sender sequence of steps for processing an eLetter and sending it to the ePost Office;

FIG. 19 is a table showing an exemplary embodiment of building a custom header of an eLetter according to the present invention for transmission from the Sender to the ePost Office;

FIGS. 20A and 20B are an operational flow diagram of an exemplary embodiment of the ePost Office sequence of steps for processing an eLetter and sending it to the Recipient;

FIG. 21 is a table showing an exemplary embodiment of building the custom headers of an eLetter according to the present invention for transmission from the Sender to the ePost Office; and FIGS. 22A and 22B are an operational flow diagram of an exemplary embodiment of the Recipient sequence of steps for the final processing of an eLetter.

DETAILED DESCRIPTION OF THE INVENTION

FIG. 1 shows a communication system 10 according to the present invention that connects many system users (although only two are shown) who are, with respect to any given transaction, either a Sender 12 of electronic mail ("email") and attached documents or files, or a Recipient 14 of that email and attached documents or files. The communication system 10 is described herein as an "epostal Service" and the email carried on the system 10 and handled according to the present invention is also referred to herein as an "eLetter", "document", or simply, "mail". (The term "eLetter" is used only when an email will be or has been processed by this invention. The terms "ePostal," "ePost Office," and "eLetter" used herein are service marks of ePostal Services, Inc. of Stamford, Conn.) A given Sender 12 can send the same email to one designated Recipient 14, or multiple Recipients 14. A given Recipient, with access to the ePostal system, can also be a Sender of eLetters. The illustrated Sender 12 can be a Recipient 14, and vice versa. The system 10 includes known telecommunication links 16 between each Sender or Senders 12 and the Internet 18 via a Sender ISP 19 and between the Internet and each Recipient or Recipients 14 via a Recipient ISP 19.

The Sender and Recipient users may typically use computing and processing devices known as p.c.'s (personal computers), as shown in FIG. 1 as connected to Internet email and access through an ISP 19, but they can use other computing and processing devices such as servers and hand-helds as well as p.c.'s. These user interface devices are termed herein generally as "terminals". It will be understood that the terminals can have varying degrees of intelligence, from what are essentially I/O devices to devices that provide substantial information processing using resident and/or downloaded software. In particular, the terminals can operate as a component of a network with a server and/or in conjunction with other linked computers and software, to provide the operating functions described below characteristic of this invention. The terms "Sender" and "Recipient" as used herein therefore mean the terminal and software operable on or through that terminal.

In addition, as shown in FIG. 9, although this description in FIG. 1 refers to an ISP 19 as an intermediary between the Sender/Recipient and the Internet, the actual type of email and Internet access server connection can be any existing alternative which provides such services to the Sender/Recipient, such as the email and Internet access servers of corporate intranets or other networks such as extranets, LANs or the like. Conventional firewalls and filters are typically present in this system. Also as shown in FIGS. 9 and 10, the specific type of physical telecommunications connection can also use a number of alternatives, such as telephone, cell, DSL, cable, satellite or other form of wireless communications, and even physical delivery (FIG. 10).

The present invention uses, complements and augments the basic, known SMTP Internet email and Web messaging HTTP systems. As used herein, "Internet" is intended to include both. The present invention features what is termed herein an ePost Office 20 (FIG. 1). In its presently preferred form, the ePost Office 20 is a server, or set of servers, running the exemplary software 24, 24' shown in FIGS. 3A-C, 4B, 6 and 7, and connected into the Internet by telecom links 16. While the ePost Office 20 will be described as a server running postal software 24, 24', it will be understood that the server can be plural servers or equivalent hardware and software. As used herein, the terms "ePost Office", "ePO", "postal server," "electronic postal service," and "postal server and software" encompass all these variations and other known equivalents.

In practice, all of the servers or sets of servers of the ePO 20 can be located at one physical site. Alternatively, however, the individual sets of servers can be located at multiple sites at which each such set of servers, running the exemplary software 24, 24', is capable of performing the ePO 20 functions for certain assigned Senders 12 and Recipients 14, which assignments can be changed. As presently preferred, the entire group or network of geographically separate sets of servers, running the exemplary software 24, 24' and connected with each other by the Internet and telecommunication links, are coordinated for operational efficiency, availability and redundancy, scalability, improved user services, and security advantages. When so networked, the entire group or network of separate sets of ePost Office 20 servers is the ePost Office 20 of FIG. 1.

The ePost Office 20 communicates and coordinates with and between the Sender 12 and Recipient 14 p.c.'s, servers or the like (the Sender and Recipient Terminals) that run exemplary software 22, 26 of FIGS. 2A, 2B, 4A-1 and 4A-2, which is, in a preferred form, installed on the Sender 12 and Recipient 14 p.c.'s or servers, respectively. The operation of the ePost Office 20, in interaction with the ePostal software 22, 26 at the Sender 12 and Recipient 14 terminals, utilizes both the basic Internet email SMTP system and the standard Web messaging HTTP system. The ePostal component software 22, 26 installed and/or operable on the Sender and Recipient p.c.'s or servers is compatible with the operating system and the application (email and browser) software on those p.c.'s or servers.

There are various alternatives for how the ePost Office 20 in FIG. 1 communicates and coordinates with and between Sender 12 and Recipient 14 in order for the communication system shown in FIG. 1 to operate. The alternatives involve different ways for an eLetter to be initially processed and sent by the Sender 12, and/or processed by the ePost Office 20, and/or delivered to and finally processed by the Recipient 14. One variable in these alternatives is whether or not the eLetter message itself (its content, as opposed to information for processing the message) passes through the ePost Office 20. The second variable is alternative transmission protocols (and how are they used) to send and deliver the eLetter message and the accompanying eLetter ePostal data, which are needed by the ePost Office 20 and the Recipient 14 to process the eLetter from the Sender 12 to the Recipient 14. Herein, "eLetter ePostal data" may be referred to also as "ePostal data," "ePostal processing data," "eLetter message data," "eLetter data," "message data," "message data component," or the like.

FIG. 11 shows four basic alternatives a)-d) for sending an eLetter from a Sender 12 to the ePost Office 20, each with a certain set of advantages and disadvantages discussed below. The links between the Sender 12, Sender ISP 19, and the ePO 20 are shown in a simplified version of FIG. 1, without the telecom links 16. While the general flow of information of and about an eLetter is from Sender 12 to the ePO 20, it is understood as shown in FIG. 11 that there can be transmissions of data in both directions including to facilitate the Internet connections that transmit the eLetter information and to exchange security and message data.

In Alternative a), the eLetter message and all the ePostal data needed to send, process and deliver the eLetter message as an eLetter are sent together by the Sender 12 using a standard Internet mail protocol such as SMTP through the Sender ISP 19 mail server to the ePO 20 mail server. Hereinafter, this group of possible mail protocols is referred to simply as SMTP. The advantages of this alternative include: all the information is in one package; there is a minimum of transmissions and therefore fewer associated uncertainties; and, since this is the most normal procedure for sending Internet mail, there is therefore less chance that some problem might arise along the transmission path to the ePO 20.

In Alternative b), the eLetter message and most of the ePostal processing data is sent as in Alternative a). However, a limited amount of ePostal processing-data such as identification and security numbers for the Sender 12 and eLetter would also be exchanged by the Sender 12 with the ePO 20 using some standard TCP application protocol such as HTTP via the Sender ISP 19. The advantages of this Alternative include the security benefits which would accrue from the eLetter message, which might contain encrypted information, being sent separately from the second communication having the ePostal processing data which contains the eLetter identification numbers and the decryption key for encrypted information. However, the disadvantages include: more than the minimal communications are required, and the user might need to be on-line when the Sender 12 processes the eLetter.

In Alternative c), only the eLetter message and limited ePostal processing data such as identification and security numbers are sent by the Sender 12 via SMTP protocols and the Sender ISP 19 mail server to the ePO 20. All the other ePostal data for processing the eLetter is sent directly to the ePO 20 via HTTP or some other such protocol. This example is similar to Alternative b), except there is more ePostal processing data sent directly to the ePO 20 via HTTP, and it illustrates that with Alternative b) there are many alternatives for the amount of data which can be sent separately, depending on programming and processing functions, all with nearly the same results.

In Alternative d), all the information, including the eLetter message and all the ePostal processing data, is sent direct to the ePO 20 using a HTTP type protocol. This Alternative does not have the advantages of the eLetter being sent in two separate packages. Its disadvantages include the possible need for the Sender 12 to be online when processing the eLetter, depending on the Sender 12 terminal systems, and the uncertain Internet mail problems which could be experienced with emails being sent in this fashion.

If sending an eLetter through the ePO 20, using any of, or a combination of, these methods, selecting dynamically the one which is best, depending on the Sender situation. If a user is online or will go online, the preferred form is likely to be Alternative b). This is where the Sender 12 communicates with the ePO 20 via HTTP or some other such protocol, provides the ePO 20 with ePostal data including the identification number of the eLetter, and gives to or gets from the ePO a one-time-use encryption key. The key is then used to encrypt the eLetter and the other ePostal processing data that is sent to the ePO 20 via SMTP and the ISP mail server. However, if the user is not online, or will not go online, Alternative a) is likely used, because no communication is required with the ePO 20 prior to the processing of the eLetter by Sender 12. The encryption of the eLetter and/or ePostal processing data is accomplished with an encryption key that is stored and reserved for such purposes at the Sender 12. Alternative d), however, can be used in a situation where a Sender 12 is always online, and/or the conditions or requirements at the Sender 12, ePO 20 or Recipient 14 warrant it.

After an eLetter has been processed at the ePost Office 20, if sending through the ePO 20, the eLetter will be sent from the ePO 20 to the Recipient 14. FIG. 12 shows three basic alternatives e)-g) for sending an eLetter from the ePost Office 20 to the Recipient 14, each with a certain set of advantages and disadvantages. In FIG. 12, the links between the ePO 20, Recipient ISP 19, and the Recipient 14 are shown in a simplified version of FIG. 1, without the telecom links. While the general flow of information of and about an eLetter is from the ePO 20 to the Recipient 14, it is understood as shown in FIG. 12 that there can be transmissions of data in both directions including to facilitate the Internet connections that transmit the eLetter information and to exchange security and message data.

In Alternative e), the eLetter message and all the ePostal data required to send, process and deliver the message as an eLetter to the Recipient 14 are sent together by the ePO 20 using SMTP and POP, IMAP or other such mail protocols to the Recipient ISP 19 mail server, and then to the Recipient 14. The advantages of this alternative include:
   All the information is in one package.
   There is a minimum of transmissions which means fewer associated communications uncertainties.
   There are no other communications required than receiving the eLetter from the Recipient ISP 19.

Therefore the Recipient 14 does not need to be or go on line to finish the eLetter processing, and, since this is the most normal procedure for sending Internet mail, there is less chance that some problem might arise along the transmission path from the ePO 20 to the Recipient 14.

In addition, Alternative e), as well as Alternatives f) and g), recognizes that the Recipient 14's most likely and simplest, and perhaps even only, means for receiving such eLetter messages is from the Recipient ISP 19 mail server.

In Alternative f), the eLetter message and some ePostal processing data such as identification and security numbers for the eLetter are sent to the Recipient 14 via the Recipient ISP 19 mail server. The amount of ePostal data sent with the eLetter can vary depending on the combination of Recipient 14 and Recipient ISP 19 systems functions. When the eLetter arrives at the Recipient 14, the Recipient 14 then communicates directly with the ePO 20 via HTTP or some other such protocol, and the ePO 20 gives to the Recipient 14 all the remaining ePostal data required to finish processing the eLetter at the Recipient 14. The advantages of this Alternative include the security benefits which would accrue because the eLetter message, which might contain encrypted information, is sent via HTTP separately from the second communication having the ePostal data which contains identification and security numbers for the eLetter. However, the disadvantages include: the requirement for a more complex set of communications with the ePO 20 than in Alternative e), and the Recipient 14 must be able to go online to finish processing the eLetter. If the Recipient 14 is not online or is not allowed to go online, then the Recipient 14 cannot finish processing the eLetter and must wait until the Recipient 14 is on-line.

In Alternative g), the ePO 20 first sends the Recipient 14 an ePO eLetter which does not have any part of Sender's eLetter message in it. This ePO eLetter sent by the ePO 20 has only limited identification and security numbers for the Sender 12 eLetter and informs the Recipient 14 that an eLetter is being held for the Recipient 14 at the ePO 20. The Recipient 14 then communicates with the ePO 20 using HTTP or some other such protocol, and the ePO 20 gives to the Recipient 14 the Sender 12 eLetter and all the ePostal data required to finish processing the Sender 12 eLetter at the Recipient 14. Alternative g) has the same disadvantage as Alternative f) in that the Recipient 14 might not be, or go, online to obtain from the ePO 20 the eLetter and ePostal data needed for final processing. Alternative g) does have however some advantage in security over Alternative f) because no part of the Sender 12 eLetter message is transmitted from the ePO 20 to the Recipient 14 until the Recipient 14 has the ePostal data required to finish processing the eLetter.

In many instances, the preferred form of the ePostal system 10 among these three alternatives is Alternative e). It is the simplest with the fewest communications, has the flexibility of not needing to go online for more information, and provides good security. However, there are combinations of Recipient 14 and Recipient ISP 19 system functions where either Alternative f) or Alternative g) is preferred. Such a situation is where the Recipient 14 is always or usually online, or would most probably go online if required for ePostal data communications with the ePO 20. As mentioned earlier, separate communications of the eLetter message and the ePostal processing data would add some security benefits. As another example, a form of Alternative g) is used when an eLetter is sent to a Recipient which does not have the Recipient software 26.

In FIG. 13, there are two basic alternatives h) and i) shown for sending an eLetter message from a Sender 12 to the Recipient 14, but not through the ePost Office 20. Each alternative has its advantages and disadvantages. The links between the Sender 12, Sender ISP 19, the Recipient ISP 19, and the Recipient 14 are shown in a simplified version of FIG. 1, without the telecom links. While the general flow of information of and about an eLetter is from the Sender 12 to the Recipient 14 (and some information to and from the ePO 20), it is understood as shown in FIG. 13 that there can be transmissions of data in both and/or all directions among the Sender 12, Recipient 14 and ePO 20 including to facilitate the Internet connections which transmit the eLetter information and to exchange security and message data.

In Alternative h), the eLetter message and most of the ePostal data needed to send, process and deliver the message as an eLetter are sent together by the Sender 12 using standard Internet mail protocols such as SMTP and POP/IMAP to the Recipient ISP 19 and Recipient 14, without going through the ePost Office 20. However, a limited amount of ePostal processing data such as identification and security numbers for the Sender 12 and the eLetter, which are essential for processing the eLetter, would also be exchanged by the Sender 12 directly with the ePO 20 using some standard TCP application protocol such as HTTP via the Sender ISP 19. After the Recipient 14 receives the eLetter message and the ePostal data, Recipient 14 then communicates directly with the ePO 20 using some standard TCP application protocol such as HTTP via the Recipient ISP 19, in order to receive from the ePO 20 the remaining and limited amount of ePostal processing data which was not with the eLetter message. The Recipient 14 then finishes processing the eLetter. The advantages and disadvantages of this Alternative h) are discussed below, along with those of Alternative i).

In Alternative i), the eLetter message and only a limited amount of ePostal processing data such as identification and security numbers for the eLetter are sent together by the Sender 12 using standard Internet mail protocols such as SMTP and POP/IMAP to the Recipient ISP 19 and Recipient 14, without going through the ePost Office 20. However, most of the ePostal data needed to send, process and deliver the eLetter message as an eLetter would be exchanged by the Sender 12 directly with the ePO 20 using some standard TCP application protocol such as HTTP via the Sender ISP 19. After the Recipient 14 receives the eLetter message and the limited ePostal data, the Recipient then communicates directly with the ePO 20 using some standard TCP application protocol such as HTTP via the Recipient ISP 19, in order to receive from the ePO 20 the ePostal processing data which was not with the eLetter message. The Recipient 14 then finishes processing the eLetter. The advantages and disadvantages of this Alternative i) are discussed below, with those of Alternative h).

Alternatives h) and i) are similar and vary only in the amount of ePostal processing data that is sent together with the eLetter message by the Sender 12 using standard Internet mail protocols such as SMTP and POP/IMAP to the Recipient ISP 19 and Recipient 14, without going through the ePost Office 20.

The only advantage, which these Alternatives might have, is where the Sender 12 and Recipient 14 for whatever reason would not prefer the eLetter message to go through the ePost Office 20. Alternative i) would have some security advantage over Alternative h) in that most of the ePostal processing data is not in the same communication transmission with the eLetter message.

However, the disadvantages of alternatives h) and i) are numerous. First, the number of communications necessary would make these methods more complex with greater chance of communications problems. Second, and far more important, is the fact that the eLetter message does not go through the ePO 20 resulting in numerous disadvantages, including:

- The ePO 20 cannot screen the eLetter on behalf of the Sender 12 and Recipient 14 for technical and content risks.
- The ePO 20 cannot authenticate the Sender 12, verify the certification of the individual Sender, and evaluate the integrity of the eLetter message as reliably at the Recipient 14 as it can at the ePO 20. This makes the authentication of the Sender 12, the certification of the individual Sender, and the evaluation of the integrity of the eLetter in general circumstances less reliable and therefore less secure.
- The ePO 20 cannot manage return-to-Sender 12 functions as well. Therefore there is loss of an opportunity to provide additional value to Sender 12 and to monitor the overall security of the ePostal system.
- The ePO 20 could not provide Sender 12 and Recipient 14 with time stamps or tracked records of the eLetter message processing times at the ePO 20.
- The ePO 20 cannot provide Sender 12 with the most authoritative confirmation of the ePostal fee for the eLetter.
- The ePO 20 cannot provide the same degree of non-repudiation for an eLetter which is selected by Sender 12 to be put into the ePostal official eLetter repository. Standards for such official repositories require a copy of the original eLetter that passes through the ePO 20 rather than being given a copy by the Sender 12 or Recipient 14.
- Sending an encrypted eLetter direct from a Sender 12 to multiple Recipients 14, and not through the ePO 20, is far more complex and less secure, as will be shown later in details about how the ePO 20 processes and delivers encrypted eLetters to multiple Recipients 14.

From above, it is clear that sending an eLetter message through the ePost Office 20 as shown in FIGS. 11 and 12 has many advantages over sending the eLetter message to the Recipient 14 while bypassing the ePO 20 as shown in FIG. 13. Sending through the ePO 20 is generally the preferred and most flexible form of the present invention. However, in certain combinations of Sender 12 and Recipient 14 situations sending an eLetter direct to a Recipient 14 might be preferred. For example, a Recipient 14 can be a client workstation residing inside a corporate network, where the Recipient ISP 19 is essentially the network mail and Internet access servers, and where ePostal network software as shown in FIG. 8 operates with the network mail, Internet access, and other corporate servers.

This software 22, 26 is installed, e.g. in conjunction with the user opening an account with the ePostal Service, e.g. at least in part by downloading.

Regarding the installation and opening of an Account with the ePost Office 20, there are alternatives to the procedures for the download, installation and activation of the software 22, 26 at the Sender 12 and Recipient 14 (the combination of which can also be referred to as the "Client software" or "Client") before it can be used. The download, installation and activation process and major alternatives are shown in FIGS. 14A and 14B. It would be understood by one skilled in the art that the specific steps in the process depend upon the Client terminal technical environment including the operating system and email application.

The representative process as shown in FIG. 14A begins with a set of steps included in a Download and Install phase D1. The user initiates the process by deciding to download the software and describes to the ePO important software components on the user's terminal such as the operating system, email application and web browser. This download can be made either from the ePost Office 20 website, from an ePostal software CD or from any other ePostal medium containing the required software which is compatible with the operating system and email application of the user's terminal. The user's terminal downloads and saves a Client software 22, 26 setup file which the user's terminal runs.

At this time, the user is presented with an end user licensing and service agreement (EULSA) which the user must accept before the download can continue. The EULSA could be presented later in the process, but the alternative of presenting it at this time is best in order to discontinue the download process if the user does not accept the EULSA so that there is no further software downloaded to the user's computer. If the EULSA is accepted, the Client setup file downloads and installs the rest of the software.

The Client software 22, 26 then communicates directly with the ePO 20 using HTTP or some other such TCP application protocol checking for the online status of the ePO 20. This ends the Download and Install phase D1 of setting up the Client software 22, 26.

A Registration phase D2 begins. The Client software 22, 26, after identifying the ePost Office 20 is ready to communicate, asks the user to create an Account at the ePO 20 and gives the user an Account Creation screen into which the user inputs the requested information. The Client then transmits this user data to the ePO 20 using HTTP or some other such TCP protocol. The ePO 20 stores and processes the user data, registers this new Account for the user, and transmits the Account registration information back to the Client using the same protocol such as HTTP which the Client used to communicate with the ePO 20. This completes the Registration phase D2 of setting up the Client software 22, 26.

A Verification phase D3 begins. The Client software 22, 26 then presents the user with a Credit Card (CC) screen into which the user inputs the requested CC information. The Client then transmits this user data to the ePost Office 20 using HTTP or some other such TCP protocol. The ePO 20 receives the CC data and verifies that it is a valid CC to which the user could charge the costs for using the ePostal communication system. The ePO 20 then transmits to the Client using the same protocol such as HTTP which the Client used to communicate with the ePO 20 that the Account has been verified along with temporary Sender 12 and Recipient 14 identification and security data. An alternative to the above is to provide the Client with the temporary Sender 12 and Recipient 14 identification and security information before verifying the user's CC data. However, the above is the preferred form of the ePostal system 10, so that the CC data is used as an added means of insuring that the user is a legitimate person to have an ePO 20 Account, before the Client receives the identification and security data, even though this data has a temporary status. This finishes the Verification phase D3 of setting up the Client software 22, 26.

Next, an Activation phase D4 begins. At this stage, the Client software 22, 26 is not considered Active by the ePost Office 20. The Client is fully installed on the user's terminal, but not activated to be used yet with the user's email application for sending and receiving eLetters. It is in a stand-by mode. At this time, the ePO 20 emails an Activation eLetter D5 to the primary email address of the user on the terminal where the Client software 22, 26 is installed, registered and verified. The Client monitors incoming email looking for the Activation eLetter. When the Activation eLetter arrives, the Client identifies it, parses the data in it, and stores the new identification and security data. The Client then transmits to the ePO 20 using HTTP or some other such TCP application protocol that it has received the Activation eLetter and the new data. The ePO 20 responds to the Client using the same protocol such as HTTP which the Client used to communicate with the ePO 20 that the ePO 20 has recorded that the new Account is Active. This completes the Activation phase D4 of setting up the Client software 22, 26. The user can now use the Client for accessing all ePostal system features and benefits.

An alternative to this way of activating the Client software is to not use an Activation eLetter, but to use direct communications D6 between the Client and the ePO 20 via HTTP or some other such TCP protocol. This can be done after or in lieu of the step where the ePO 20 transmitted to the Client that the Account had been verified along with temporary Sender 12 and Recipient 14 identification and security information. The ePO 20 transmitted to the Client using the same protocol such as HTTP which the Client used to communicate with the ePO 20 the non-temporary identification and security data to activate the Account.

Use of the Activation eLetter D5 is the preferred form of the ePostal system 10 because it confirms that the primary email address provided by the user during the Registration phase D2 of software installation and setup is valid, providing further confirmation of the legitimacy of the user and therefore the Account.

In the two major sections above which describe 1) different alternatives for sending and receiving eLetters either through or not through the ePost Office 20, and 2) the installation, registration, verification and activation of the Client software 22, 26, there was considerable mention of the use of direct communications. These direct communications or transmissions of data are between the Sender 12 and Recipient 14 Client software 22, 26 and the ePO 20. There are two major alternative methods for structuring and performing these communications. These alternatives are shown in FIG. 15.

The first alternative, "N" (for Normal), outlines what is the normal process and components of client computers communicating securely with $2^{nd}$ party Internet web servers. The client computer's web browser creates a TCP/IP connection with a user-specified URL and uses HTTP (and HTML) as the TCP application protocol by which to communicate with the web server. This usually takes place over port 25 at the server, aided by the use of cookies, especially to identify to the web server with whom it is communicating. For secured transmissions using HTTPS, encryption is controlled by the server and makes use of an outside third party for encryption keys and digital certificates.

While this same normal kind of process can be used for the ePostal communications system 10 of FIG. 1, it is not preferred. Rather, the ePostal system 10 process is custom-made and is shown as Alternative "C" (for Custom) in FIG. 15. Security is improved with independence from any third party for encryption keys and digital certificates and by having a controlled, proprietary process for encryption. The system is also more flexible if identification of the Client is not dependent on the use of cookies which can be deleted, if communications are not dependent on just one TCP application protocol which might not be available, and if a particular web browser is not required. The ePostal communication system 10 is able to provide the preferred form for structuring and performing these communications because of the design of the communication system 10.

The preferred custom form of communication for use in the present invention, shown as "C" in FIG. 15, takes advantage of the invention design, specifically, the fact that the Sender 12 and Recipient 14 using the Client software 22, 26 can communicate with and transmit data directly to the ePost Office 20 using software 24, 24', and vice versa. In effect, the ePostal system 10 can communicate within itself, that is, creating a communications network between the ePostal Client software 22, 26 operating on the Sender 12 and Recipient 14 terminals and the ePost Office 20 software 24, 24' operating on the ePostal servers. The ePostal system 10 during these direct communications between the ePO 20 and the Client (which acts as its own web browser) simulates HTTPS sessions, uses its own one-time session id's, establishes its own one-time session encryption/decryption keys, and is able to use multiple TCP application protocols by capitalizing on a unique message data structure described in more detail below with reference to FIG. 17, useable by these protocols. This system in effect creates virtual intranet-like qualities for its users, despite its use of the Internet and its public availability.

These direct communications (which will be referred to as "direct comms," "ePO comms," or "comms,") are important to performing the many administrative, help and support, maintenance of Account, and eLetter processing functions between the Sender 12, ePost Office 20 and Recipient 14, including:

Creating a new account, during software registration
Installing and activating the Client software 22, 26 on a different computer under an already existing account
Auto-updating the Sender 12 and Recipient 14 Client software 22, 26
Viewing and editing basic account information stored at the ePO 20
Buying eLetter credits (eLetter credits are used to pay for sending eLetters)
Checking available eLetter credits and updating the local Client record
Reviewing the eLetter credits balance and history of credit transactions
Reviewing a recipient record of credit incentives earned by opening eLetters
Reporting the receipt of an eLetter to the ePO 20
Notifying a sender of the receipt of an eLetter
Reporting the opening of an eLetter to the ePO 20
Notifying a sender of the opening of an eLetter
Reviewing a history of sent eLetters
Reviewing all details pertaining to a single sent eLetter
Reviewing a history of received eLetters
Reviewing all details pertaining to a single received eLetter
Updating the local Client cost list for ePostal services
Checking and updating passwords and passphrases
Reporting the receipt of an eLetter from an alias address, which the Client cannot process Reporting the receipt of an eLetter not from an alias address, which the Client cannot process As shown in FIGS. 16A and 16B, there are five basic steps the Client and the ePO 20 use for all of these direct comms: open a communications connection C1, establish a secure channel C2, authenticate the Client C3, transmit the messages C4, and close the session C5. Each step is comprised of various substeps.

Open a communications connection C1

The Client has stored URL and port information for its direct comms with the ePO 20. Not all Senders 12 and Recipients 14 need to use the same IP address for the ePO 20. As mentioned earlier, typically there are multiple sets of servers operating at different physical locations, communicating with Clients and with each other. In addition, the IP addresses for the ePO 20 servers might change from time to time (e.g., for security reasons), and the Client would receive the changed information from the ePO 20 via direct comms. While any standard TCP application protocol can work, it is presently preferred that the Client first attempts connecting using standard HTTP behavior over port 80, since it is most likely to be open. If communications are established, the Client continues to use HTTP for the remainder of the direct comms session. If for some reason HTTP fails, the Client connects using SMTP directly to the ePO 20 over port 25 with standard and custom SMTP command tags. For example, with SMTP, when the ePO 20 accepts the connection, the Client verifies the connection and sends the ePO a standard SMTP EHLO command by which the Client identifies itself, which the ePO 20 understands and accepts, and then the Client verifies. If these SMTP communications are established, the Client continues to use SMTP for the remainder of the direct comms session.

Establish a secure channel C2

The Client begins by generating a public/private key pair for this session. The Client sends a request to the ePO 20, including the public key of the key pair. Although no key has been established yet to encrypt this first request message, rather than the alternative of leaving the message in plain text, the ePostal system 10 preferably uses a character randomization and substitution to make the message more difficult to read. The ePO 20 catches the request and stores the public key. The ePO 20 generates and stores both a unique one-time-use session id and symmetric key. Then the ePO 20, using the public key from the Client's first request, encrypts the session id and symmetric key, rewrites them as hex characters, and sends them back to the Client in a response. (In this instance and hereinafter, references to rewriting encrypted data with hex characters will mean rewriting the encrypted data with hex characters or with some other similar encoding such as UUEncode in order to enable transmission of the encrypted data.) The Client receives the response from the ePO 20 and stores the session id and symmetric key. The symmetric key generated by these steps will be used to encrypt and decrypt all data transmissions for the remainder of the communication session. The session id is needed to be sent by the Client to the ePO 20 in later requests in this session so that the ePostal servers can identify the session, and therefore also the symmetric key to use. An alternative for encrypting the direct comms is the use of fixed public/private key pairs between the ePO 20 and the Client. The ePostal preference, however, uses symmetric encryption which is faster than asymmetric encryption, and because the one-time-use session-based key is more secure than reusing keys.

Authenticate the Client C3

The Client builds a request message with the session id and a data block including a Client id number, unknown even to the Client user, and hash of a user password. The hash of the password can either be stored on the Client, or the user can be asked for the password and a hash created. The data block is then encrypted using the session symmetric key and rewritten as hex characters. The Client comms the message to the ePO 20 which reads the session id, retrieves the associated symmetric key, and decrypts the data block. The ePO 20 authenticates both the Client id number and password hash to its records and stores that this session is authenticated (or not). The ePO 20 then builds and sends a response to the Client that the authentication is accepted (or not). This ePO 20 response message to the Client does not contain the session id because the Client, unlike the ePO 20 which sees these direct comms as asynchronous, sends a message to the ePO 20 and then waits on a reply. Authentication alternatives include authentication of only one or more than two parameters. The preference for the ePostal system in most cases, as explained above, efficiently provides a double authentication of the Sender 12. The ePO 20 can also change Client ids periodically to improve security.

Transmit the messages C4

To this point the direct comms have only established the means to keep later communications of this session secure and to authenticate the Client to the ePO 20. The transmitted messages that follow are those that assist in the actual performance of some operating or administrative function which results in the performance of ePostal premium services characteristic of the ePostal system 10. These messages are prepared and transmitted in the same manner as the two messages in step C3 above, Authenticate the Client. The Client builds and sends to the ePO 20 a request message. The message contains the session id, a data field indicating the size of the encrypted data block, and the encrypted data block, encrypted with the session symmetric key and rewritten in hex characters. The message data has a unique structure for the ePostal communication system 10, fitting its particular data requirements, communication needs and capabilities, and the ePostal communication system 10 of this invention. After the ePO 20 receives the Client's request message, the ePO 20 decrypts and processes the data according to the instructions contained within the data block. The ePO 20 then prepares a response message to the Client which, like the Client's request message, has a unique structure for the ePostal communication system 10. The ePO 20 response message to the Client in this step C4, as in step C3 and as mentioned above in the step C3 description, does not contain the session id because the Client, unlike the ePO 20 which sees these direct comms as asynchronous, sends a message to the ePO and then waits on a reply. The ePO 20 response contains a data field indicating the size of the encrypted data block and then the encrypted data block, encrypted with the session symmetric key and rewritten in hex characters. From this point in this description of the invention, when data is mentioned as being encrypted for any transmission, it will mean that the encrypted data block is rewritten in hex characters or the like to transform encrypted data so that it can be transmitted in the direct comms as discussed above. Then, the ePO 20 comms its response message to the Client which decrypts the data block and processes the data according to the instructions contained within the data block.

Close the connection C5

When the Client has fulfilled its communication needs from this session, the Client direct comms the ePO 20 a request message to end the session. The ePO 20 responds with acceptance. It should be understood throughout this application that where an acceptance is mentioned as the content of a response from either the ePO or the Client, that instead a message with a declination to accept, an error message or a similar type message could also result. In those other situations, ad hoc measures not pertaining to the described general process would be subsequently taken to resolve the problem.

In addition, for some direct communications the set of steps will vary from those discussed above. In many cases, ePostal system 10 will operate best when it combines, in various ways, step C3 with step C4 and/or step C4 with step C5. The particular combination depends on the purposes of the direct communications used and how the combinations of data and the instructions for their use in the data blocks can best be constructed for the most efficient and assured performance of the ePostal functions. For example, it may be preferred to authenticate, process data from, and respond to the Client all in one set of request and response communications between the Client and ePO 20.

In the foregoing discussion of the steps used by the Client and the ePO 20 in their direct communications, a unique message structure is used, and the message contains instructions for the recipient of the direct comms, either the ePO 20 or the Client, on how to process the data in the messages. The unique message structure is disclosed in and described with reference to FIG. 17.

The data fields in the direct comms messages are very similar for request messages from the Client and response messages from the ePO 20. Both are comprised of an encrypted data block with the data block size just before it. The only structural difference between request messages from the Client and response messages from the ePO 20, as mentioned above, is that request messages from the Client also contain a session id which is needed so that the ePostal servers can identify the session, and therefore also the symmetric key to use. On the other hand, the response messages from the ePO 20 do not contain the session id because the Client, unlike the ePO 20 which sees these direct comms as asynchronous, sends a message to the ePO 20 and then waits on a reply.

The structure of the data block which is encrypted is also unique for the ePostal communications system 10 and is shown in FIG. 17. First in the data block 40 is a block of random noise 42 whose size is also known; this data aids in the security performance of the encryption. Then, there is a message type 44 that specifies to the recipient the type or purpose of the request or response message; the recipient by this message type knows what data to expect in the rest of the data block and what to do with it. Then, there are pairs of data string lengths 46 and related data strings 48; these strings 46, 48 are the data which is processed to assist in performing operational and admin functions which result in the performance of ePostal features; depending on the message type, there could be any number of pairs of data strings and their lengths. These data fields as described above provide the same structure for request and response messages. With the same messaging structures inside standard TCP protocol wrappers, processing is similar whether they are transmitted by HTTP, SMTP or any other TCP application protocol. Using HTTP, most of the requests from the Client to the ePO will use a GET or POST command with the data field, and the responses from the ePO will use the RESPONSE command with the data field wrapped in the standard HTML and body tags to indicate they are HTML messages. Using SMTP, most of the requests to the ePO will use an EPSA command (a customized SMTP command created for the communications system 10 and known to the ePO 20) with the data field ending with a space, the string END and \r\n, and the responses from the ePO will use the RESPONSE command with the data field ending with a space, the string END and \r\n. There are many possible alternative combinations of how to structure and process the data within these request and response messages. There can be different content or data in the data field and different sequences for the data in the data field; there can be alternative ways to communicate what data the recipient should expect in the message and what to do with it; and there can be other ways to encrypt these messages. However, because the method explained above is the simplest, most efficient and most flexible in using multiple TCP protocols, it is the presently preferred structure for operation of the ePostal system 10.

In the above discussion of direct communications, step C3 of FIG. 16A is Authenticate the Client. This means that Sender 12 as defined above as the terminal and its ePostal Client software is authenticated. The individual person or user who opened the Account with the ePostal software at Sender 12 can also certify himself as the person actually sending the eLetter from the Client. The individual user can also have an Account on more than one terminal with the ePostal Client software, such as on a desktop at the office and on a laptop for travel. The individual user can also have multiple Accounts across multiple terminals, facilitating an individual to work with the ePost Office 20 on personal and business Accounts on any of his terminals. In addition, the individual user can use multiple email addresses with any of his ePostal Accounts and on any of his terminals. For the ePostal system 10 to do this, all the id numbers for the individual user's Accounts, the terminals with the Client software, and the email addresses must be related to each other at the ePost Office 20, so all the direct communications and other ePostal communications systems methods can also accommodate and track these id numbers and relationships. The alternative to this above multiple-capability service is to limit the number of Accounts, terminals with the Client software, and email addresses which an individual user can have with the ePostal system 10. While this limiting alternative would be simpler to manage and track, the presently preferred structure for operation of the ePostal system 10 is the multiple Account, terminal, and email address method because it provides the individual user a far more robust, comprehensive service.

The Sender 12 in FIG. 1 can choose to send his email over the Internet either in the conventional manner, or using the ePost Office 20. To utilize the ePost Office 20 of this invention, the users need to do little more in the form of the invention shown in FIG. 1 than what they do in sending or receiving a conventional email. For example, with reference to FIG. 2A and 2B, the Sender 12 user opens the email application S1 and creates an email, Step S2, as usual (with or without attachment) within the email application. The Sender 12 user needs only to click (Step S3) on an icon and proceed through (Step S4) an easy to follow set of selections of services he or she wants applied to the email by the ePostal system, clicking to continue, confirm and send the eLetter from the Sender's own p.c., all electronically and apparently the same to the Sender user, via the Sender's own ISP 19, the Internet 18, and the Recipient's ISP 19, to the Recipient 14 user, as shown in FIG. 1.

Figure 2B:
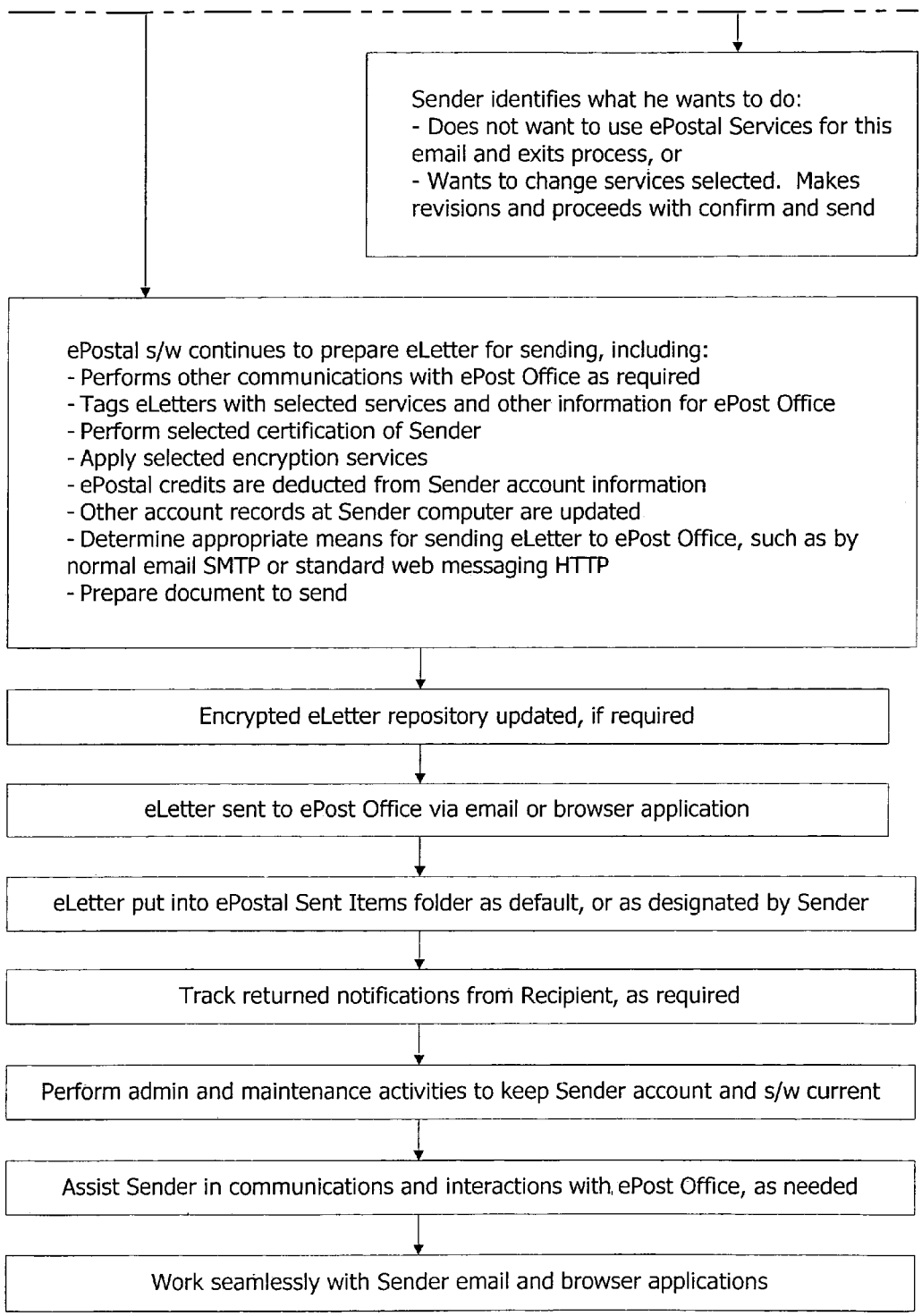

An exemplary Sender software 22 according to the present invention as installed or operable on a Sender p.c., or the like, is shown and described in FIGS. 2A and 2B. The Sender software 22 reflects that the Sender 12 user has subscribed to the ePostal Service and has an account with it. Exemplary software 24, 24' according to the present invention that implements the ePost Office 20 in a manner according to the present invention are shown and described in FIGS. 2A, 2B, 3A-C, 4B, 6, and 7, respectively. An exemplary Recipient software 26 according to the present invention as installed on the Recipient p.c. 14, or the like, is shown and described in FIGS. 4A-1 and 4A-2. The Recipient software 26 reflects that the Recipient 14 user has subscribed to the ePostal Service and has an account with it. It will be understood by those skilled in the art that the specific code implementations of this software 22, 24, 24' and 26 will depend on the operating environment, e.g., the nature of the hardware, system and application software, the nature of the communications system and its operating protocol, interfaces, and the use of features such as encryption, filters, and firewalls. Users of the ePostal System can have different combinations of operating systems and email and browser software. This invention uses interfaces, add-ins, or various sets of procedures and programming each for interfacing with different combinations of sender or recipient operating systems and application (email and browser) software, which also function to interface through the links with the postal server 20.

As disclosed in, or with reference to, FIGS. 1, 2A, 2B, 3A-3C, 4A-1, 4A-2, 4B, 6 and 7, the ePost Office 20 and its software 24, 24', in cooperation with the software 22 and 26, accomplishes the mail processing functions of the traditional postal services in a completely electronic process. More specifically, the present invention, as delineated in detail in FIGS. 2A, 2B, 3A-3C, 4A-1, 4A-2, 4B, 6 and 7, operates to provide:

Assistance to the Sender 12 users in selecting services to be provided

Collection of eLetters from Senders 12 and delivery to ePost Office 20

Receipt and acceptance of eLetters by the ePost Office 20

Screening of eLetters for security purposes

Authentication of Sender 12 and certification of Sender 12 user

Collection of fees for processing eLetters through the system

Application of services and processing eLetters

Inherent reduction or filtering of the number of potential eLetters

Identification, marking and prioritization of eLetters

Indication and stamping of date and time of ePost Office 20 processing

Securing of the process of receipt, transmission and delivery of eLetters

Delivery of eLetters to Recipients 14

Certification of opening by the Recipient 14 user

Collection of responses/receipts from Recipients 14, as required

Notification to Sender 12 of Recipient 14 responses, as required

Other special services such as:
  Holding eLetters while the Recipient 14 user is away for an extended time from his mail box/computer and email application
  Providing options for accessing the ePost Office 20, such as going to the ePost Office 20 "window," or website, rather than working through one's own mail box/email application
  Allowing businesses at their own sites to meter, bundle and manage aspects of the ePostal process.

More specifically, the functions of Sender 12 exemplary software 22 as disclosed in or with reference to FIGS. 2A and 2B include:

Assisting the Sender 12 user at S4 within his own email application in selecting which ePostal services are applied to his email such as:
  Special ePostal industry marking, value and priority indicators which differentiate eLetters from all other email
  Encryption
  Certification of the Sender 12 user, as opposed to just Sender. (Authentication of Sender 12 is standard with all eLetters)
  Notifications to Sender 12 of Recipient's 14 receipt and opening of eLetters
  Certification of opening by the Recipient 14 user
  Pre-paid replies for the Recipient 14 user to respond to Sender's 12 eLetter back through the ePostal system
  Hard copy delivery to the Recipient 14 user.

Preparing and processing for eLetters to be sent to ePost Office 20
  Perform needed and appropriate communications with ePost Office 20
  Determine if email Recipient has an account with the ePostal system, and if not, identifying Sender's 12 choices
  Check if Sender 12 has sufficient credits to use the ePostal system, and if not, obtaining more credits
  Tag eLetters with selected services and other information for ePost Office 20
  Encrypt eLetters if required
  Perform certification of the Sender 12 user if required
  Determine appropriate process for sending eLetters and/or eLetter data to ePost Office 20, such as based on normal email SMTP or standard web messaging HTTP.

Maintaining repository of encrypted eLetters for proof of content, if designated by Sender 12

Sending eLetters to ePost Office 20

Sorting sent eLetters into special ePostal folders

Tracking returned notifications to associated sent eLetters

Performing various administrative and maintenance account activities to keep Sender 12 current in such areas as: ePostal services offered, credits required, and security features Assisting Sender 12 in managing ePostal communications and interactions with ePost Office 20

Working seamlessly with Sender's 12 email and browser applications

Regarding the exemplary Sender software 22, described above and shown in FIGS. 2A and 2B, a further exemplary sequence of processing steps and presently preferred system structure for operation are described below with reference to FIGS. 18A and 18B.

Alternatives for how to initiate use of ePostal services at step SP1 FIG. 18A from within an email application and for how to select specific services include:
  A user can choose to use the services before or after creating a new email. In either case, the user indicates in some way that he has finished creating his new email, and is ready to send it via the ePostal system 10. Therefore, while both possibilities for when to choose to use the ePostal system 10 need to be addressed for the ease of use of the services, both also require that the new message window contain a means to select the ePostal process.
  Also from within the new message window, there are alternatives for how to select the use of ePostal services by clicking on an icon button on a tool bar or on a line item in a dropdown menu list. Preferably, the ePostal system 10 accommodates both alternatives to provide the most flexible and easy to use services for the user.

As to selecting the specific ePostal services to be applied to the new eLetter, an alternative process is to give the user one or more continuing screens of ePostal service selections to choose from, and then a second screen to allow the user to review which services he has selected and to confirm his selection. The ePostal system preferably presents to the user as few screens as possible, e.g. using only one screen by which the user selects the services, reviews, and confirms them for sending. However, in situations such as where the range of services offered to a user is too extensive, or where the user's email application requires an additional screen, then the ePostal system 10 preferably uses the two-screen approach.

It is noted that, as just mentioned above, a selection from among the alternatives available for performing the ePostal functions depends on the specific operating system, email application, and web browser combination which exists at Sender 12 and Recipient 14. The specific version of ePostal software 22 and 24 which is present will be that which works with the existing combination of operating system, email application and web browser software. As mentioned previously, the correct ePostal software version is determined at the time of installation of software 22 and 24, after the ePost Office 20 analyzes the information provided by the user about his operating system, email application and web browser and after the ePO 20 performs any possible verification check on that data.

Regarding the exemplary Sender software 22 (described above and shown in FIGS. 2A and 2B) and the Sender processing sequence and preferred forms (shown in FIGS. 18A and 18B), the Sender 12 begins to process at step SP2 a new eLetter after the user selects the services to be applied and clicks to send the email through the ePostal system. Again there are alternatives and choices for how the Sender 12 does this processing.

Figure 3B:
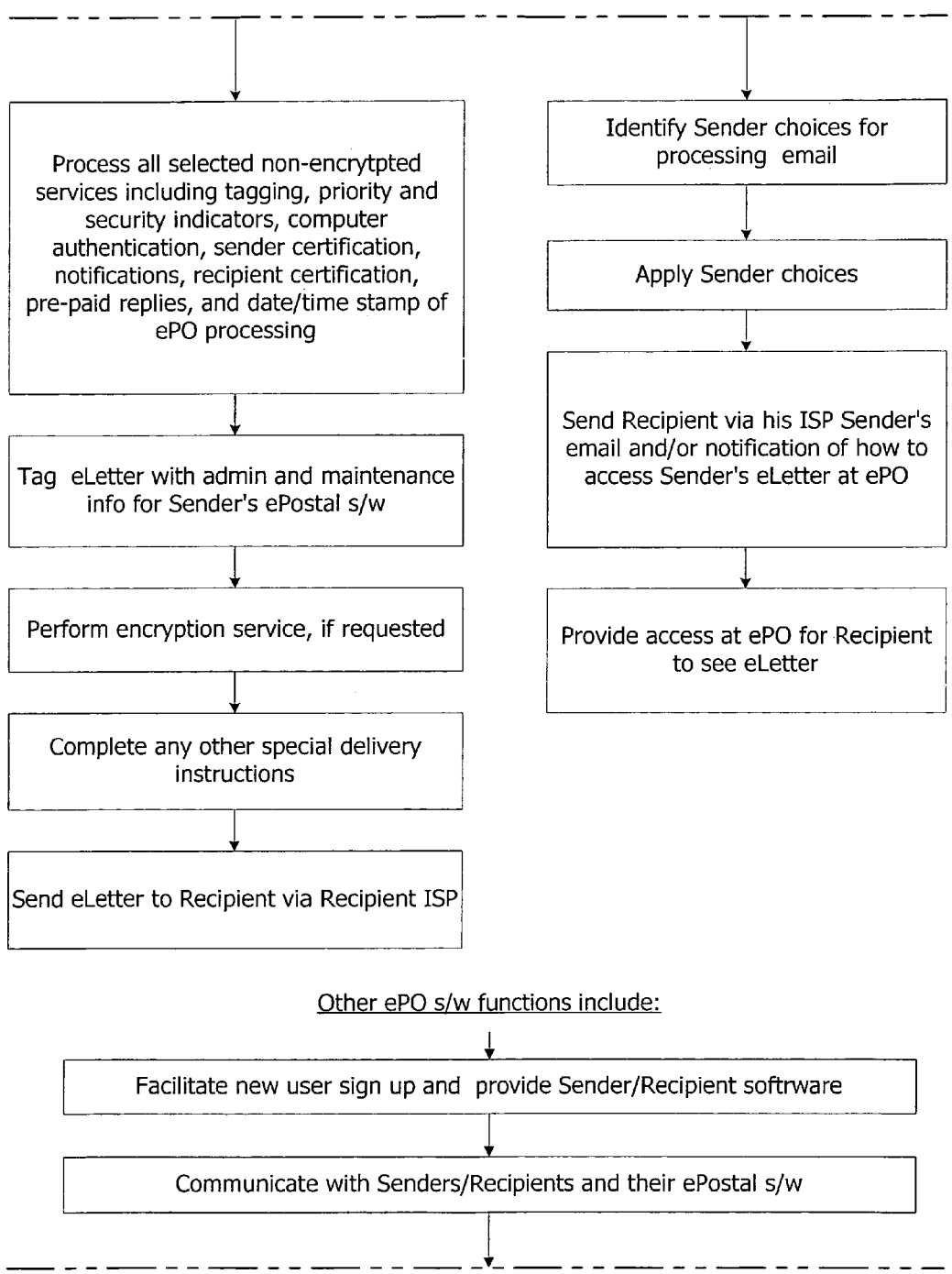
Figure 3C:
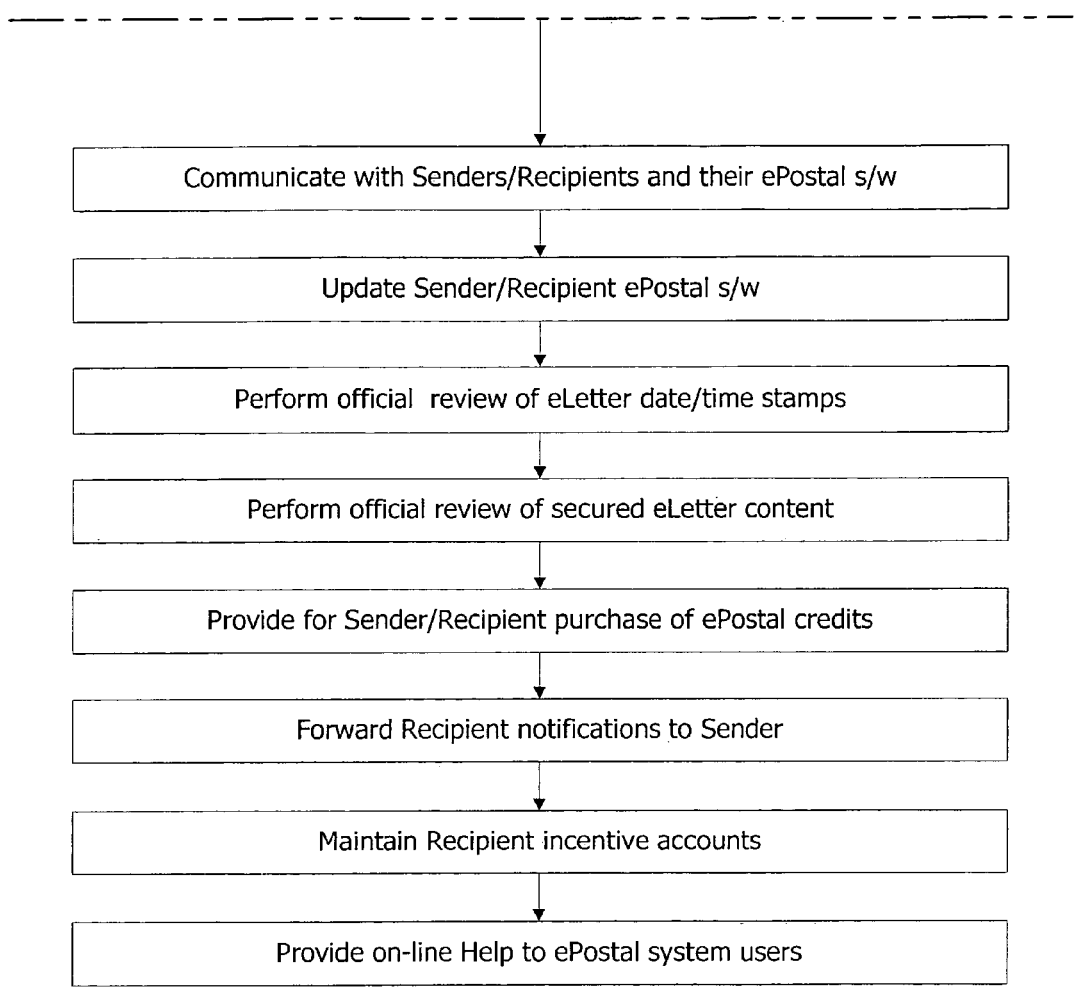

Alternatives in the implementation of the Sender 12 processing include how Sender 12 determines the cost of the selected services and the number of ePostal credits required. At the ePO 20, there is an official record bank of the balance and history of ePostal credits for each Sender 12 Account. The Sender 12 can use direct comms at the time of Sender 12 processing to verify at the ePO 20 credit bank that the Sender 12 has sufficient ePostal credits to cover the new eLetter at step SP3. As an alternative, the Sender 12 has a local ePostal credit bank at Sender 12 which tracks the balance and history of ePostal credit use for each Account on Sender 12 at step SP4. Preferably the ePostal system 10 has both the local bank at Sender 12 and the official credit bank at the ePO 20 because Sender 12 may not be online, or capable of going online, to use direct comms to check the Sender 12 Account credit balances at the ePO 20. With the local bank at Sender 12, there is then a capability for estimating the official Account credit balances which are maintained at the ePO 20 without going online. Preferably, the Sender 12 checks the credit balance at the ePO 20 using direct comms, and if the Sender 12 cannot be online, Sender 12 has the local credit bank to estimate Account credit balances for the new eLetter. If the balance of credits is not sufficient for a new eLetter at step SP5, Sender 12 software 22 informs the user of the need to purchase new credits and initiates the process of purchasing ePostal credits using direct comms with the ePO 20. Another alternative is that the user purchases ePostal credits by going to the ePO 20 website using his web browser and then uses the ePost Office 20 software 24 as shown in FIGS. 3A-C. Preferably, both of the alternatives for purchasing credits are available to the user, via direct comms and at the website.

As another alternative implementation of the Sender 12 processing of a new eLetter, the Sender 12 determines if each of the eLetter recipient email addresses is associated with some user Account at the ePost Office 20, e.g. by the Sender 12 using direct comms with the ePO 20. An alternative to checking on each recipient's status at the ePO 20 is not to check the recipient email address status at step; SP6. The selected alternative for operation of the ePostal system 10 depends upon the privacy policy of the management of the ePostal system 10 regarding the disclosure of user information to others.

Another alternative implementation of the present invention is to reverse the order, that is checking recipient email addresses and then ePostal credits. In many cases, the order in which the specific steps of processing an eLetter are actually carried out is not important. In fact, as will be appreciated by those skilled in the art, there are many alternatives for doing so. On the other hand, there some processing steps that have an inherent order to them or else they cannot be done. The importance of sequencing depends upon the specific processing step which can depend upon the software 22 version which has been installed on the Sender 12, the ePostal services selected by the user, and other variables which would be understood by those skilled in the art as indicated at step SP7.

Regarding the exemplary Sender software 22 (described above and shown in FIGS. 2A and 2B) and the Sender processing and preferred methods (shown in FIGS. 18A and 18B), the Sender 12 processing of an eLetter is also dependent at step SP7 upon the selected steps for sending, processing and delivering an eLetter from the Sender 12 to the Recipient 14 as described earlier. Briefly recapping, the two major alternatives are sending the eLetter message itself either through the ePost Office 20, or bypassing the ePO 20 and sending the eLetter message directly to the Recipient 14. The other alternatives, which are sub-alternatives to these two major ones, involve how much of the ePostal data which is necessary for the required processing of the eLetter after being sent from Sender 12 and for delivery to Recipient 14, is sent with the eLetter message itself. In most cases, the ePostal system 10 is preferably implemented, for the reasons discussed below, as follows:

Sender 12 sends the eLetter message and most if not all of the ePostal processing data through the Sender ISP 19 mail server to the ePO 20, with the remainder sent to the ePO 20 via ePostal direct comms Then the ePO 20 sends the eLetter message and most if not all of the ePostal processing data through the Recipient ISP 19 mail server to the Recipient 14, with the remainder sent to the Recipient 14 via ePostal direct comms Typical steps in processing an eLetter at Sender 12 at step SP8 are discussed below and shown in FIGS. 18A and 18B. They pertain generally to all possible alternatives for sending the eLetter from Sender 12 to Recipient 14, including the generally preferred implementation, which is sending the eLetter message itself and most, if not all, of the ePostal processing data from Sender 12 through the ePO 20 to Recipient 14.

It should be noted that all of the sending and delivery exemplary alternatives (including going through or not through the ePO) can be implemented using some or all of:

system structure for operation described hereinabove and below for processing the eLetter at Sender 12;

the system structure for operation described hereinabove and below for processing at the ePO 20;

the system structure for operation described hereinabove and below for eLetter receipt and processing by the Recipient 14;

the implementation of operations for direct communications which were discussed hereinabove; and information communicated by the ePO 20 to Sender 12 and Recipient 14 via direct comms, an ePostal eLetter, or other ePostal communications regarding which particular implementation of sending an eLetter to Recipient 14 should the Sender 12 use Sender 12 processes an eLetter so that the eLetter is prepared with sufficient ePostal data and instructions so that ePost Office 20 and the ePostal system 10 generally (including the Recipient 14) will know how to continue the processing and delivery of the eLetter to Recipient 14. This data can be added to the eLetter at various alternative locations in the eLetter such as: within the subject, or the body, or as an attachment (which can be thought of as part of the body), or as a custom header. Preferably, the ePostal system 10 uses a custom header or multiple custom headers at step SP9. If a particular email application at Sender 12 does not allow custom headers or requires that the data be at some other location, then another location would be used.

Sender 12 prepares the custom header at step SP9 to include not only data to process the eLetter at the ePO 20, but also data to verify and authenticate the eLetter. Verification indicates that the eLetter message was not changed during transmission from Sender 12 to ePO 20, and authentication indicates the eLetter did actually originate from Sender 12. There are numerous sequences in which the incoming eLetter at the ePO 20 can be processed which therefore means there are many different ways the data in the custom header could be arranged. The preferred arrangement of this invention is that the sequence at the ePO 20 first identify, verify and authenticate the eLetter and then perform the rest of the processing. This is because there is no reason to process fully an email at ePO 20 if the email is not from a bona fide ePostal user Account; such an email would not be an eLetter. Therefore the data in the custom header for identification, verification and authentication needs to be available from the custom header before, or at least at the same time as, the data for processing.

The structure of an exemplary custom header is shown and described in FIG. 19 as parts 1-3. There are three parts, 19-1, 19-2 and 19-3. Alternatively, these three parts can be treated as all forming one custom header, or they can be three custom headers, or more headers. Preferably, there is one custom header with three parts. The physical sequence of the three parts in the custom header is ordinarily not that important. However, preferably they are ordered in the logical sequence in which they are used.

Part 1, FIG. 19-1 contains identification numbers for Sender 12. These numbers identify Sender 12 to the ePO 20 upon arrival of the eLetter at the ePO 20. These numbers tell the ePO 20 which encryption key should be used to decrypt Part 2 of the custom header.

Figures 2, 4A:
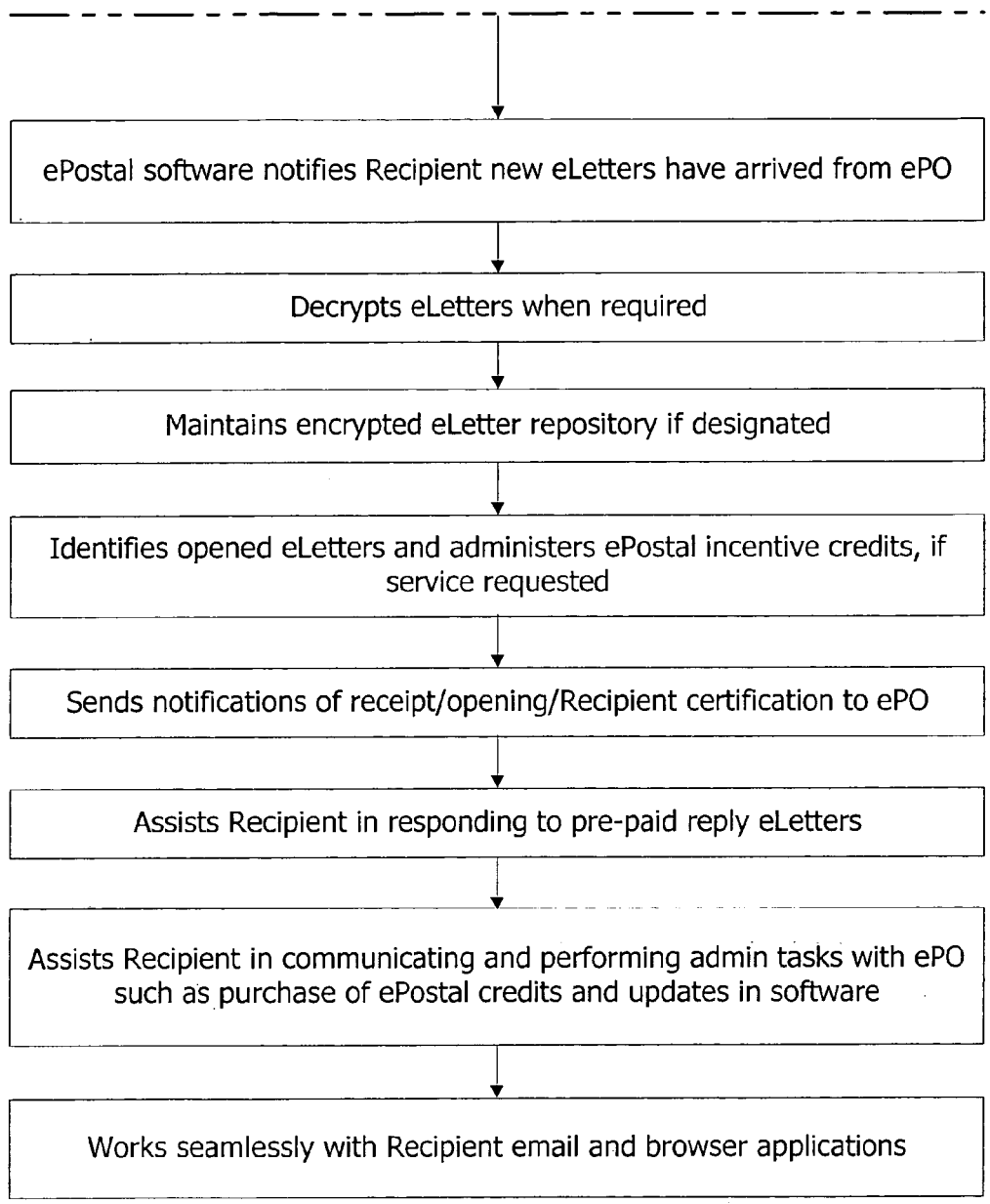

Part 2, FIG. 19-2 contains the MDC (Message Digest Code) value and the encryption key for decrypting Part 3 of the custom header. The MDC is used for verifying the eLetter when it arrives at the ePO. It is also one of a number of ways to authenticate that the eLetter is from Sender 12.

Part 3, FIG. 19-3 contains ePostal processing data, including:

A unique set of data, e.g., numbers, which identify the eLetter and which is used for processing and tracking future transactions regarding the eLetter Data that identifies which ePostal services were selected by Sender 12.

Data about Sender 12 and Recipient 14, such as identification numbers and email addresses. The "To", "cc" and "bcc" information is removed from the eLetter headers and put in Part 3, along with its hash value. The "From" and "Reply-To" information is also put into Part 3, along with its hash value. The SMTP email address of the ePost Office 20 for this Sender 12 replaces the original recipient email addresses in the "To" header allowing the eLetter to be redirected to the ePost Office 20. The hashes of this data allow for additional ways to check the security of the eLetter and to authenticate the Sender 12.

The encryption key for decrypting the eLetter message body, if encryption was a selected service Although not shown in FIG. 19, it should be understood that any data in Parts 1, 2, and 3 will include the data size unless the ePO 20 knows that information some other way. Also, although not shown in FIG. 19, random noise can be added to the data in Parts 2 and 3 before they are encrypted for security purposes. As mentioned in the description of direct communications, because there will be encrypted data in the custom header, the custom header will be rewritten in hex code for transmission.

Alternatively, the header can have only two parts rather than three, or more than three parts. Two parts is a minimum since one part is required to be in plain text so that the ePO 20 can read the Sender 12 identification numbers to know which encryption key is required to decrypt the rest of the custom header. However, three parts provides added security in that it allows for another encryption of data in Part 3 with another encryption key which adds security and which when decrypted can provide further evidence of verification and authentication, other than just using the data in Part 2. Having more than three parts and more encryption steps can add greater security, but this structure should not be necessary except in unusual situations. The preferred header structure and method of operating the ePostal system 10 is using a custom header with three parts as shown in FIG. 19, at step SP9 FIG. 18A, and described above.

The exemplary Sender software 22 (described above with reference to FIGS. 2A and 2B) and the Sender exemplary processing (described above with reference to FIGS. 18A and 18B) use a custom header as part of eLetter processing, with the original "To/cc/bcc" information removed from their headers and placed in Part 3 of the custom header at step SP10 in FIG. 18A. An ePO 20 email address at step SP11 is then placed in the "To" header, directing the eLetter to the ePO 20. An SMTP alternative for sending the eLetter is to use SMTP relay routing which would keep the original Recipient 14 addresses in the "To", "cc" and "bcc" headers. In this alternative, an eLetter for each Recipient 14 is received separately at the ePO 20, and the ePO 20 then processes and forwards each of them to the Recipients 14. This alternative, as will be explained more fully later, can simplify some processing of eLetters with multiple recipients at the ePO 20, but delivery of the eLetters to the ePO 20 is greatly more uncertain because there is no guarantee that the Sender ISP 19 will relay each, or any, of the different recipient address eLetters to the ePO 20. Therefore, the ePostal system 10 preferably sends, as mentioned above, by removing the Recipient 14 addresses from the "To", "cc" and "bcc" headers, placing them into Part 3 of the custom header at step SP10, and replacing them with the specified ePO 20 address at step SP11 for this Sender 12 in the "To" header which sends the eLetter directly to the ePO 20. By using this preferred arrangement, the ePostal system maintains simple addressing information that matches the actual transmission route. This avoids other potential problems that relaying can cause.

The foregoing discussion of exemplary Sender software 22 (FIGS. 2A and 2B) the Sender processing and preferred arrangements (FIGS. 18A and 18B), and the above discussion of the Sender 12 preparing a custom header as part of processing an eLetter describes the use of encryption and decryption keys. In fact, encryption is needed many places within the ePostal communications system 10 such as in the:

eLetter message body when the ePostal encryption service is selected (everywhere herein when the encryption or hash of the eLetter message "body" is mentioned, one is to understand that "body" means "attachments" as well)

eLetter custom headers which contain ePostal processing data direct communications ePostal system data stored at the Client, network level, and ePost Office 20

As will be understood by those skilled in the art, there are many alternatives for performing the encryption. For example, significant variables include the encryption algorithm and the length of the encryption key. The algorithm can be asymmetric or symmetric, and within those two categories there are a number of specific alternatives. Alternative algorithms can be publicly and commercially available and/or those that are proprietary to the ePostal system 10. Further, the algorithms used can be included in Sender software 22 or in the software cryptographic libraries of the Sender 12's terminal operating systems, which libraries are called by the Sender software 22 to be used.

The arrangement for any of the encryption and decryption processes performed by the ePostal system 10 software, whether at a Client, network level or the ePost Office 20, depends upon the Client software, the ePostal network software operating environment (in FIG. 8), and the ePostal system 10 needs and resources for a cryptographic systems compatibility. The preferred form also depends upon the relative security and speed of the encryption/decryption algorithm that is selected. Most commonly, the preferred form of the ePostal system 10 for encrypting an eLetter message body is the use of a symmetric algorithm and a key selected to be long enough to provide the desired level of security. The ePostal system 10 uses an algorithm that can be called from the Sender 12 operating system. If such an algorithm or library is not available, a sufficient symmetric algorithm is provided in the Sender software 22. These same alternatives and preferences can be applied to all cryptographic functions performed by the ePostal system 10 such as encryption, decryption, and hashing functions. There are also situations where specific ePostal system 10 needs require some other preferred alternative. An example is when direct communications begin between the Client and the ePO 20—an asymmetric public/private key pair is used. Also, as stated previously, will be understood that whenever the ePostal communications system 10 has encrypted data to be transmitted on the Internet, the encrypted data is rewritten in hex characters or some other similar form such as UUEncode to allow for the transmission.

Sender 12 processing includes encryption of the eLetter message body at step SP13 if the user selected this ePostal service. When the user selects encryption, there are the alternatives of requiring or not requiring the user to input his passphrase for security purposes. Preferably the ePostal system 10 default for this selection does not require the user to input his or her passphrase, but also allows the user to change this default using the ePostal options and preferences screens, which can only be done using his or her passphrase.

As explained above, to encrypt, the Sender 12 performs the encryption with a one-time-use, sufficiently strong, symmetric key and algorithm using the Sender 12 operating system cryptographic library as the resource. Such library and algorithm is known to the ePO 20. After encrypting the message at step SP13, the Sender 12 puts the symmetric key into Part 3 of the custom header of the eLetter at step SP14. It is noted that before encrypting the eLetter message body, the Sender 12 also creates the MDC hash of the message body at step SP12.

The Sender 12 finishes building Part 3 of the custom header at step SP15 including all the exemplary data shown in FIG. 19. The Sender 12 preferably encrypts the entire Part 3 with a one-time-use, sufficiently strong, symmetric key and algorithm using the Sender 12 operating system cryptographic library as the resource at step SP16.

After encrypting Part 3, Sender 12 builds Part 2 of the custom header at step SP17 by putting the symmetric key used to encrypt Part 3 into Part 2 at step SP18. The Sender 12 fills out Part 2, as shown in FIG. 19 and described above, with the MDC data at step SP18. Sender 12 then encrypts Part 2 of the custom header at step SP21.

There are two alternatives for encrypting Part 2 of the custom header at step SP21, which differ depending on the type and source of the encryption key used.

In the first alternative, at the time of activation of the Client software at Sender 12 the Client stores at Sender 12 an encryption key which can be used for encrypting Part 2. Either it can be an asymmetric public/private key pair type where it encrypts Part 2 with a Sender 12 public key that matches to the ePO 20 private key for decrypting, or it can be a symmetric type where the ePO 20 also has the symmetric key. The preference of the ePostal system 10, between the asymmetric and symmetric alternatives, is to use a symmetric key because symmetric algorithms are faster and relatively stronger.

In the second alternative, Sender 12, if online, uses direct comms with the ePO 20 to obtain from the ePO 20 a one-time-use symmetric key to be used for encrypting Part 2 of the custom header for just this eLetter.

Preferably, the ePostal system 10 can use both alternatives. If Sender 12 is online, Sender 12 uses direct comms at step SP19 to the ePO 20 for obtaining a one-time-use symmetric key and leaves with the ePO 20 certain Sender 12 identification numbers tied to the specific one-time key and eLetter. If Sender 12 cannot go online, Sender 12 uses the stored symmetric key at step SP20 for encrypting Part 2 of the custom header. In both cases, the Sender 12 identification numbers in Part 1 of the custom header identify for the ePO 20 what encryption key it should use to decrypt Part 2 when the eLetter and its ePostal processing data in the custom header arrives at the ePO 20. The symmetric key stored at the Client and at the ePO 20 for encrypting and decrypting Part 2 can also be changed regularly for security purposes.

Sender 12 completes the eLetter processing by putting the Sender 12 identification numbers into Part 1 of the custom header at step SP22. Sender 12 puts the custom header into the eLetter at step SP23 and sends the newly processed eLetter to the Sender 12 email application "outbox" or outgoing email holding folder at step SP24. The email application waits for an email "transport" send/receive event at step SP26 at which time the email application communicates with the Sender ISP 19 mail server to perform the actual "transport" send of the eLetter from the "outbox." An alternative to this process is that, if possible, Sender 12 puts the eLetter into the email application "outbox" before the Sender 12 processes it. Then, when the actual "transport" send/receive event occurs, Sender 12 processes the eLetter and the eLetter is transported to the Sender ISP 19.

The alternative of waiting for the actual "transport" send/receive event to process the eLetter is preferred because:

the eLetter then does not reside for a time, and cannot be observed, in the email application "outbox" in a processed state the Sender 12 terminal is online at the actual "transport" event, and Sender 12 may be able to take advantage of eLetter processing that requires the Sender 12 terminal to be online Although the preference to wait, some operating system, email application and web browser combinations may not allow the Client to process the eLetter at the "transport" event. Therefore the first alternative of processing before the "transport" event is the option selected. When it is required that the processing occurs before the "transport" event, the processed eLetter will sit for a while in the email application "outbox." During this time, the Sender 12 is able to retrieve, upon the request of the user, the processed eLetter from the email application "outbox" and allow the user to make changes to the eLetter recipients, subject, body, and to the ePostal services selected for the eLetter, including cancellation of ePostal services for the eLetter at step SP25.

After the eLetter is sent to the Sender ISP 19, Sender 12 identifies the eLetter was sent at step SP27, resets all the original data for "To", "cc" and "bcc" email addresses at step SP28, decrypts the eLetter message body if it was encrypted at step SP29, and sorts the eLetter into the appropriate ePostal sent items folder at step SP30. It also performs any special sorting which might be offered to the user by the user options and preferences menu items. Sender 12 also updates the local credit bank for the ePostal credits used for the just sent eLetter.

With respect to the exemplary Sender software 22 (FIGS. 2A and 2B) and the Sender preferred processing steps (FIGS. 18A and 18B), the following describes exemplary and preferred system structures and arrangements for the sorting, movement, and storage of eLetters in special ePostal folders at step SP31. These ePostal folders are where a copy of a sent eLetter is placed at Sender 12 after it is sent, and where a received eLetter is placed after it is processed at Recipient 14. The basic special folders are therefore ePostal Sent Items and Inbox folders. Other special folders can be created either by Sender 12 using ePostal option and preference screens or by the ePO 20 during Client installation, or via direct comms and ePO eLetters. After an eLetter is placed for the first time into an ePostal folder, there are alternatives for moving the eLetter to other folders. One alternative is allowing the eLetter to be moved out of its folder to any other folder (including non-eLetter folders) and back again. Another alternative is allowing no movement of the eLetter out of its original folder. The preferred arrangement of the ePostal system 10, to assure security of the ePostal folders and to allow optimum flexibility for eLetter movement and sorting by the ePostal user, is to:

Allow eLetters to be moved to any other ePostal folder

Allow eLetters to be moved out of ePostal folders into other email folders

Allow eLetters which have been moved out of an ePostal folder to be moved back into any ePostal folder, if unchanged Do not allow any non-ePostal email to be moved into any ePostal folder at step SP32

These preferences secure ePostal folders from any non-ePostal email which is a security risk to ePostal folders. Each eLetter is verified and authenticated as an eLetter before being moved back into an ePostal folder.

With respect to the exemplary Sender software 22 (FIGS. 2A and 2B) and the Sender preferred processing steps (FIGS. 18A and 18B), when the selection of services at Sender 12 includes the Notification to Sender 12 Of the Receipt and Opening (NORO) of his eLetter at Recipient 14 and the certification of the Recipient 14 user as the one who opened the eLetter at step SP33, the following describes exemplary alternative system structures and arrangements for delivering those notifications. Alternatives include how many notifications to Sender 12 will occur for a single eLetter, such as notifications at both instances, when the eLetter is received and when the eLetter is opened, or only one notification, when the eLetter is opened. Alternatives also include how the notifications are made to Sender 12. They are made either by eLetter back to the Sender 12 and/or by the Sender 12 checking the Sender's Sent eLetter History using either the ePostal menu item in the email application, or by going to the ePO 20 website, logging in, and requesting the information. The preferred arrangement of the ePostal system 10 is to present the range of options to the user in the ePostal options and preferences section of the ePostal menu item in the email application, and allow the user to choose at step SP34.

With respect to the exemplary Sender software 22 (FIGS. 2A and 2B) and the Sender preferred processing steps (FIGS. 18A and 18B) the following describes exemplary alternative system structures and arrangements for providing Recipient 14 with incentives of ePostal credits for opening eLetters from Sender 12. Some of the many alternatives include: giving no incentives at all to anyone, giving every Recipient 14 the same incentive for opening an eLetter, varying incentives by individual and group as the ePostal system 10 management decides, and allowing Sender 12 to decide how much incentive Sender 12 will give to Recipient 14 to open the eLetter. Ideally, the ePostal system 10 provides the capability to operate all of these alternative modes, and others, in order that the ePostal system 10 and the Sender 12 have the greatest flexibility in using the "incentives to open eLetter" ePostal feature.

Regarding the exemplary Sender software 22 (FIGS. 2A and 2B) and the Sender preferred processing steps (FIGS. 18A and 18B) the following describes exemplary alternative system structures and methods for the ePostal encryption services. Prior to the encryption of an eLetter, Sender 12 can require the user to enter his passphrase, or not. Also upon receipt of an encrypted eLetter, Recipient 14 can require the user to enter his passphrase before the incoming eLetter is decrypted, or not. Preferably, the ePostal system 10 installs the Client software so that the ePostal default is not requiring the passphrase on encryption, but requiring it on decryption. In addition, the user will be allowed to select the other mentioned alternatives in the ePostal user options and preferences menu at step SP34.

More specifically, the functions of ePost Office 20 ("ePO" is an abbreviation for ePost Office) exemplary software 24,24' as disclosed in or with reference to FIGS. 3A-C, 4B, 6 and 7 involve managing all processing and administrative operations at ePost Office 20 including:

Receiving Senders 12 email

Screening email for technical risk

Performing verification of Sender 12

Reviewing Sender's 12 account for approval to handle Sender's email

Debiting Sender's 12 account for the necessary postage

Performing content screening

Officially receiving and sorting Sender's 12 email

Identifying whether Recipient 14 has ePostal Services account

Preparing Sender's 12 eLetter for delivery to Recipient 14

Processing Sender's 12 email for all requested services, such as tagging, prioritization, authentication of Sender's terminal, certification of individual Sender, encryption, notifications, certification of individual Recipient, pre-paid replies, hard copy delivery, etc. Tagging, prioritization and other security coding prevent fraudulent use of ePostal markings and indicators.

Performing other special delivery instructions

Creating a date/time stamp of ePost Office 20 processing

Sending Sender's 12 eLetter to Recipient 14

Administering Sender 12 and Recipient 14 accounts concerning processed eLetters Obtaining/recording confirmation from Recipient 14 about eLetter receipt and opening and about certification of individual Recipient, if required Crediting Recipient's 14 incentive account for opening eLetters Forwarding notifications from Recipient 14 to Sender 12

Performing ongoing Sender 12 and Recipient 14 account maintenance

Communicating with the Senders 12 and Recipients 14 users and their ePostal software 22,26, respectively, as required and appropriate Updating ePostal software 22,26 at Sender 12/Recipient 14

Assisting new users in opening accounts with the ePostal system and in obtaining and installing Sender/Recipient software Assisting Senders 12 in delivering eLetters to recipients without ePostal accounts and software Assisting recipients without ePostal accounts and software to access eLetters at the ePO window, or website Making official analytical determinations of eLetter processing times/dates, when requested Performing analytical verifications of secured eLetter content, when requested These services and those described below in conjunction with the Recipient software, and not provided in the manner of this invention (as an automatic or selectable service provided as a part of an integrated system and service that operates seamlessly with existing email and web messaging and browser applications) by conventional basic Internet and web messaging systems and methods, are termed herein "premium services".

Also, as cited above and shown in FIG. 10, this invention can offer the Sender 12 users the option to have his eLetter, after being processed by the ePost Office 20 in any of the ways mentioned herein, printed to hard copy, sealed in an envelope and physically delivered to Recipient 14.

The exemplary ePost Office software 24, 24', described above and disclosed in or with reference to FIGS. 3A-C, 4B, 6 and 7, can be implemented in alternative forms in the operation of the ePost Office software 24, 24'. For the ePO software 24, 24', an exemplary sequence of processing steps and presently preferred system structures for operation are described below and shown in FIGS. 20A and 20B.

The particular implementation is ePO 20 dependent on the manner chosen for sending, processing and delivering an eLetter from the Sender 12 to the Recipient 14 as described for sending, processing and delivering an eLetter.

Alternative exemplary system structures and steps of operation for processing an eLetter at the ePost Office 20 are discussed below with reference to and shown in FIGS. 20A and 20B. They pertain generally to a wide variety of alternatives for sending the eLetter from Sender 12 to Recipient 14. In addition, they pertain particularly to what is a typically preferred arrangement, which is, sending the eLetter message itself and most, if not all, of the ePostal processing data from Sender 12 through the ePO 20 to Recipient 14.

It should be noted that all of the sending and delivery alternatives (including going through or not through the ePO) can be implemented using some or all of:

the various alternative arrangements described above for processing the eLetter at Sender 12 the various alternative arrangements described below for processing at the ePO 20 the various alternative arrangements described below for eLetter receipt and processing by the Recipient 14 the various alternative arrangements described above for direct communications and information communicated by the ePO 20 to Sender 12 and Recipient 14 via direct comms, an ePostal eLetter, or other ePostal communications regarding which alternative for sending an eLetter to Recipient 14 should be used by Sender 12

In those alternatives where the eLetter does not go through the ePO 20, most if not all of the operations of the exemplary ePost Office software 24, 24', described above and disclosed in or with reference to FIGS. 3A-C, 4B, 6 and 7, are still performed. However in those alternatives, the ePost Office 20, rather than managing and performing all of the ePO 20 processing when an eLetter goes through the ePO 20, continues to manage all of processing, but delegates some processing to the Sender 12, Recipient 14 and/or the ePostal network software 28 shown in FIG. 8. The ePO 20 manages the delegated processing of, and shares the results of, ePO 20 processing with the Sender 12, Recipient 14 and ePostal network software 28 via the ePostal system direct comms which were discussed earlier.

The ePost Office 20 processes an eLetter using the exemplary ePost Office software 24, 24'. The sequence of the steps described below and referred to and/or shown in FIGS. 20A and 20B is exemplary and can vary depending on factors such as the method used to send and deliver an eLetter from Sender 12 to Recipient 14, the amount of processing done by the ePO 20 on an eLetter, and the services selected by Sender 12.

The ePO 20 begins processing an incoming eLetter at step EP1 by first identifying if the incoming email is an eLetter. It is understood that if, at any stage in the ePO 20 processing, the expected processing data is not present or is wrong, the email is rejected from processing and dealt with as appropriate to the specific situation. The ePO 20, operating with the usually preferred arrangements explained in the Sender software 22 described above, looks for the ePostal processing data in the eLetter, namely in the SMTP custom header (FIG. 19). The ePO then begins the preferred sequence of processing steps of identification at step EP2, verification and authentication at step EP3, and then general processing at step EP4.

The ePO 20 parses Part 1 of the custom header at step EP5. Reference is again made to FIG. 19. In Part 1, the ePO 20 finds the Sender 12 identification numbers at step EP6 which indicate to the ePO 20 the symmetric encryption key to use to decrypt Part 2 of the custom header at step EP7. Creating and communicating the encryption keys used by Sender 12 in processing an eLetter were discussed in connection with the Sender software 22.

The ePostal system 10 above preferably uses the ePO 20 to decrypt Part 2 with the symmetric key at step EP8 described above, store the message body MDC hash at step EP9, and obtain the symmetric key used to decrypt Part 3 at step EP10.

The above steps, in essence, identify the email as an eLetter as reflected in the portion of the FIG. 20 operational diagram denoted "Identification." First, there is the custom header with at least 2 parts which act like an ePostal eLetter custom header. Second, there is a Sender Id number that is recognized as a Sender 12 with an ePostal Account. Third, the symmetric key at the ePO that matches the Sender Id number works to decrypt Part 2.

The ePostal system 10 preferably uses the ePO 20 to decrypt Part 3 with the symmetric key from Part 2 at step EP11.

The ePO identifies the ePostal services selected by Sender 12 at step EP12. Even though the processing of some ePostal services are not specifically mentioned below, it is understood that those skilled in the art can modify the ePO 20 to perform those services if and when needed.

The ePO 20 decrypts the eLetter message body at step EP13 using the symmetric key stored in Part 3 of the custom header, if encryption is an ePostal service selected by Sender 12.

This invention contemplates an alternative to the decryption of an encrypted eLetter message body during processing at the ePO 20, namely, that the encrypted eLetter is not decrypted. A possibly perceived advantage of this alternative, that the eLetter has greater security and privacy during ePO 20 processing if it is not decrypted, is a false perception. The decryption, the processing while in plain text, and the re-encryption are all done in a "black box" environment where there is no possible access by anyone at the ePostal system during processing to the eLetter while it is in plain text. In addition, there are important disadvantages to not decrypting an encrypted eLetter while it is being processed at the ePO. These include that the eLetter must be decrypted in order to be screened for technical and content risk, and that a better validation of the MDC hash of the message body can be made if it is decrypted which effects both the verification of the message and the authentication of the Sender 12 by the ePO 20. Therefore, it is preferred that the ePostal system 10 decrypt all encrypted incoming eLetters so that they can be properly screened for technical and content risk and so that a proper validation of the MDC hash of the message body can be made.

The ePO 20 screens the eLetter for technical and content risk at step EP14.

The ePO 20 creates the MDC hash of the message body at step EP15 and compares that MDC hash to the MDC hash stored in Part 2 of the custom header at step EP16. If the result is the same, this verifies the content of the eLetter at step EP17 is what was sent by the Sender 12.

The ePO 20 authenticates the Sender 12 at step EP18. There are many techniques for doing this. In one form, various data can be stored at the ePO 20 which is tied only to the Sender 12, and when that data is transmitted by Sender 12 to the ePO 20 and is protected by encryption during transmission, that data authenticates the Sender 12 at the ePO 20. In a presently preferred form, the ePostal system 10 uses the MDC not only for message verification, but also for Sender 12 authentication. The MDC authenticates the Sender 12 because only Sender 12 can know the Sender 12 identification numbers in Part 1 of the custom header which (1) point the ePO 20 to the symmetric key which, other than Sender 12, only the ePO 20 would have and (2) verifies the MDC hash of the message body. In addition, there are at least two other different sets of Sender 12 identification numbers in Part 3 of the custom header which when decrypted or hashed match to corresponding Sender 12 identification numbers stored at the ePO 20. These two analyses provide two other ways to authenticate the Sender 12 at step EP19. As noted above, it is also contemplated that the ePostal system 10 improves security of the ePostal processing data by periodically changing not only the symmetric keys which are used with Parts 2 and 3, but also the sequences of data in Parts 2 and 3.

The ePO 20 places into the eLetter any administrative messages for the Recipient at step EP20 including processing information and messages for recipients without the Recipient software 26.

The ePO 20 creates a new MDC hash of the message body at step EP21 if it has changed because of the addition of any administrative messages.

The ePO 20 re-encrypts the eLetter message body at step EP22, if encryption was an ePostal service selected by Sender 12. In one form, re-encryption of the message body uses the same symmetric key as used to originally encrypt it, the key which was stored in Part 3 of the custom header of the eLetter from the Sender 12. In another form, re-encryption uses a new symmetric key. Preferably, the ePO 20 reuses the original symmetric key because the security of the encryption is not diminished in doing so, and less time is spent if generating a new key is not required.

The ePO identifies the ePostal services selected by Sender 12, calculates the ePostal credits required for the eLetter at step EP23, and adjusts the Sender 12 Account credit balance accordingly at step EP25. As discussed above with reference to the Sender software 22, the ePO 20 preferably maintains the official credit bank records for all ePostal Accounts. If sufficient credits are not available, the ePO 20 initiates procedures at step EP26 to request the user at Sender 12 to buy more ePostal credits while the eLetter is processed. Business policy determines extending unpurchased credits to Sender 12 in such a situation.

The present invention contemplates alternatives for pricing of ePostal services, and for how payment for services is made. The major pricing alternatives include: a periodic subscription rate, one fee per eLetter regardless of the selected services as used, and tiered pricing per eLetter depending on the selected services as used. Presently, tiered pricing at step EP24 is preferred for the ePostal services selected for each eLetter as used. This preference can, of course, vary according to the type of customer and the business environment. Alternatives for the payment of services include: periodic billing of users for services provided, payment for services as used, and prepayment by various means for a given amount of ePostal credits which are then used up as the services are used. The ePostal system 10 preferably uses prepayment for a given amount of ePostal credits which are used up as the services are used. Economic models for this approach which are widely accepted include buying a book of postage stamps and replenishing the credits in a mailroom postage meter.

The ePO performs administrative checks at step EP27 using data stored in Part 3, such as of the Client version at Sender 12, and prepares communications as necessary at step EP28 to the Sender 12 Client.

The ePO 20 then begins the processing of the outgoing eLetter at step EP29 with the exemplary ePO sequence of processing steps and preferred methods as described below and as shown in FIGS. 20A and 20B. The ePO 20 processes an outgoing eLetter so that the eLetter is prepared with sufficient ePostal data and instructions and in a way so that the eLetter will be delivered through the Recipient ISP 19 to the Recipient 14 and so that the Recipient 14 will know how to receive and finish the processing of the eLetter. Various alternative implementations exist for a number of the outgoing processing steps.

As in the Sender 12 processing, and for similar reasons, the ePostal system 10 preferably uses custom headers at step EP30. Again, the number of specific headers is not significant. However, for eLetters sent from the ePO 20 to Recipient 14, the preferred form of the ePostal system 10 is two headers, or two parts to one header. For the rest of this exemplary discussion, reference is made to two-headers. The preference for two headers can change if the content or processing at the Recipient 14 requires more. As with Sender 12, if a particular email application at Recipient 14 does not allow custom headers, requires that the data be at some other location in the eLetter, or does not allow for the ePostal processing data to be delivered this way, then another location or delivery arrangement is used. The ePO 20 has knowledge of the Recipient 14 operating system and email application, and therefore knows of such constraints.

The ePO 20 prepares the custom headers to include not only data to process the eLetter at the Recipient 14, but also data to verify and authenticate the eLetter. Verification, as with the Sender 12, indicates that the eLetter message was not changed during transmission from the ePO 20 to the Recipient 14. Authentication indicates the eLetter to the Recipient 14 did actually come from the ePO 20 and therefore originally, before the ePO 20, from Sender 12. As in the case of the Sender 12 processing, the Recipient 14 can process the incoming eLetter in numerous alternative sequences. This means the data in the custom headers can be arranged in many different ways. However, unlike the Sender 12 processing, the incoming eLetter to the Recipient 14 could have multiple recipient email addresses, whereas the incoming eLetter from the Sender 12 to the ePO 20 had only one, the ePO 20. Therefore, for the processing sequence at Recipient 14, the Recipient 14 preferably first identifies itself within the eLetter. Second, it verifies and authenticates the eLetter. Then it performs the rest of the processing. This is because, if any of the identification, verification or authentication cannot be done, it is desirable that the Recipient 14 not process the email. Such an email might not be an eLetter. Therefore the data in the custom header that allows the Recipient to identify itself in the eLetter is preferably available before any other data. Then the data for verification and authentication is preferably available from the custom headers before, or at least at the same time as, the data for processing.

The structures of exemplary custom headers are shown and described in FIG. 21. There are two custom headers 1, 2. Note, as alternatives, these two headers can be treated as both in one custom header with two parts, or they could be parsed into three or more custom headers. Preferably, the ePostal system 10 uses two custom headers. In addition, the physical sequence of the two headers is not key. However, they should be ordered in the logical sequence in which they are used.

Custom Header 1 is structured so as best to accommodate multiple recipients of the eLetter (including both the Recipient 14 with an email address associated with a user Account at the ePO 20 and the recipient with an email address that is not associated with a user Account). Alternative arrangements accommodate multiple recipients such as using other types of data structures in a custom header and in the eLetter, and sending from the ePO 20 a separate eLetter for each recipient.

A presently preferred ePostal system 10 arrangement is shown in FIG. 21. It enables the ePO 20 to receive and send one eLetter for each eLetter sent by Sender 12, which provides for operational and security advantages.

Custom Header 2 is constructed at step EP31 as shown in FIG. 21, with ePostal processing data, including:

The unique set of numbers, originally generated by Sender 12, identify the eLetter, and is used for processing and tracking future transactions regarding the eLetter The MDC for verifying the eLetter is not changed during transmission to Recipient. It is also one of a number of ways for the Recipient to authenticate that the eLetter is from the ePO 20 and therefore from the Sender 12.

Data about the Sender 12, ePO 20 and Recipients, such as identification numbers and email addresses. The "To", "cc", and "bcc" information is removed from Part 2 of the custom header in the eLetter from Sender 12 and put into this Custom Header 2, along with its hash value. The "From" and "Reply-To" information is also put into Custom Header 2, along with its hash value. The hashes of this data allow for additional ways to check the security of the eLetter and to authenticate the ePO 20 and Sender 12.

Data that identifies the ePostal services selected by Sender 12.

The decryption key for decrypting the eLetter message body, if encryption was a selected service. Preferably, the ePostal system 10 the ePO 20 reuses the symmetric key which was stored in Part 3 of the custom header of the eLetter sent by Sender 12.

Custom Header 2 is then encrypted at step EP32 with an encryption key generated at the ePO 20. Preferably, the ePostal system 10 uses a symmetric key.

Custom Header 1 is constructed at step EP33 with the ePostal processing data, as shown in FIG. 21. This Header is comprised of a series of number pairs, one pair for each recipient email address, regardless whether the email address is associated with an ePostal Account or not. The pair of numbers is comprised of a Recipient identification number and a decryption key at step EP34.

For a recipient email address which is not associated with an ePostal Account, the ePO 20 creates a record for that recipient address and gives it a Recipient identification number to be used in Custom Header 1. This record enables the ePO 20 to track the eLetter to this recipient email address and any future eLetters and other ePostal system 10 actions regarding this recipient.

The decryption key which is stored in Custom Header 1 is used by the Recipient 14 to decrypt Custom Header 2. Preferably, this decryption key is the same symmetric key which the ePO 20 generated (as discussed above) and is used to encrypt Custom Header 2. This decryption key is the same for each Recipient, because the encrypted Custom Header 2 is the same for each Recipient.

The Recipient identification number is one which Recipient 14 recognizes as belonging to Recipient 14 because the Recipient identification number is also stored at Recipient 14. A recipient without an Account at the ePO will not recognize the identification number; in fact, such a recipient will not know what to do with the Custom Header or eLetter because the recipient does not have the Recipient software 26. This situation is discussed in more detail below in connection with the Recipient software 26.

The ePO 20 then, for each pair of numbers, encrypts the symmetric key at step EP35 in Custom Header 1. Preferably, for each pair in Custom Header 1, the symmetric key is mixed with different random noise to improve encryption security. Also, the ePO 20 preferably uses a different symmetric encryption key to encrypt the symmetric key in each Recipient number pair. The encryption key used for each Recipient identification number is the one which matches to that Recipient identification number in the records of the ePO 20. (Note that when the eLetter arrives at Recipient 14 and the Recipient 14 finds a Recipient identification number in Custom Header 1 which matches a Recipient identification number in Recipient 14's own record list of such numbers, the Recipient 14 uses the decryption key stored with that Recipient identification number to decrypt the symmetric key in Custom Header 1.)

The ePO 20 then puts Custom Headers 1 and 2 into the eLetter EP36. Although not shown in FIG. 21, it should be understood that any data in Custom Headers 1 and 2 will include the data size unless the ePO 20 knows that information some other way. Also, although not shown in FIG. 21, with reference to earlier descriptions about alternatives and preferred encryption techniques, the ePostal system 10 preferably uses random noise added to the data in Custom Header 2 (as mentioned earlier about Custom Header 1) before it is encrypted for improved security purposes. In addition, although not shown in FIG. 21, the structure of the data in Custom Header 2 is varied to strengthen further encryption security. As mentioned above in the description of direct communications, and because there will be encrypted data in the custom headers, the custom headers are rewritten in hex code, or some other similarly performing code, so that they can be transmitted.

At this point, if it has not already been done, the ePO 20 copies the original "To", "cc", and "bcc" information from Part 3 of the custom header in the eLetter from Sender 12 into the eLetter "To", "cc", and "bcc" headers at step EP37. The ePO, if it has not done so already, removes the custom header from the eLetter which was put into the eLetter by Sender 12 at step EP38.

Then, in the presently preferred form of the invention, the ePO 20 sends the outgoing eLetter message at step EP39 with its Custom Headers 1 and 2, to send and deliver an eLetter from Sender 12 to Recipient 14 with all of the necessary ePostal processing data for the Recipient 14 to receive, identify, verify, authenticate, and finish processing of the eLetter.

Finally, the ePO 20 completes all required data base record-keeping at step EP40 regarding the eLetter at this stage of its processing and delivery.

More specifically, the functions of Recipient 14 exemplary software 26 as disclosed in or with reference to FIGS. 4A-1 and 4A-2 include:

- Identifying all eLetters as they are received by Recipient 14
- Sorting and separating eLetters apart from all other email either by default or by other Recipient 14 customized instructions, such as into special ePostal Inboxes
- Applying to all received eLetters ePostal special markings and priority indicators so as to differentiate them visually from all other email
- Performing special customized sorting of non-ePostal email such as into known and unknown senders, if designated by Recipient 14
- Performing other email management and eliminations such as deleting all "non-ePostal and unknown sender" email, if designated by the Recipient 14
- Assisting Recipient 14 in seeing all ePostal services selected at Sender 12
- Decrypting eLetters when required
- Maintaining repository of encrypted eLetters for proof of content, if designated by Recipient 14
- Identifying Senders 12 users who have certified themselves
- Identifying eLetters which have been opened
- Administering Recipient 14 credits for opening eLetters
- Sending to ePost Office 20 notifications of receipt and opening of eLetters
- Performing and sending to ePost Office 20 certification of the Recipient user
- Assisting Recipient 14 in responding to Sender's 12 pre-paid reply eLetters
- Assisting Recipient 14 in communicating and performing various administrative tasks in conjunction with ePost Office 20 which keeps Recipient's account current
- Working seamlessly with Recipient's 14 email and browser applications.

Recipients 14 that do not have ePostal accounts and the exemplary software 26 as disclosed in or with reference to FIGS. 4A-1 and 4A-2 can also receive email and access eLetters processed through the ePost Office 20, as shown in FIGS. 3 and 4B. The email from Sender 12 received by a recipient without ePostal account and software has limited benefits from the ePostal system beyond screening for technical and content risk. For example, such non-account recipient cannot verify the email was actually processed by the ePost Office, or is from the Sender 12. Therefore the email lacks the related security benefits of the ePostal system 10, much like regular email. However, this email can offer such non-account recipients an option for verifying that the email was from Sender 12 and processed by the ePost Office 20. The email can provide the non-account recipient a code which enables that recipient to see Sender's 12 eLetter at the ePost Office window, or website 20. These eLetters have many of the features and benefits of the ePostal system such as technical and content screening, value and priority indicators, authentication of Sender's 12 terminal, certification of the Sender 12 user, encryption and pre-paid replies to Sender 12, but also the significant limitations associated with not being received by and residing in recipient's own email application.

The present invention includes various alternative software and arrangements of operation with respect to the exemplary Recipient software 26 (described above and disclosed in or with reference to FIGS. 4A-1 and 4A-2) and the sequence of Recipient preferred processing steps (described below and shown in FIGS. 22A and 22B).

These Recipient 14 alternatives depend on the arrangements chosen for sending, processing and delivering an eLetter from the Sender 12 to the Recipient 14 as described above regarding alternatives for sending, processing and delivering an eLetter. The alternative arrangements for processing an eLetter at the Recipient 14 which are discussed below and shown in FIGS. 22A and 22B, pertain generally to all possible alternatives for sending the eLetter from Sender 12 to Recipient 14. In addition, there is described the usually preferred arrangement when the eLetter message itself, and most if not all of the ePostal processing data from Sender 12, is sent through the ePO 20 to Recipient 14.

The Recipient 14 receives and processes an eLetter using the Recipient software 26. The Recipient 14 sequence of steps RP1 (described below and shown in FIGS. 22A and 22B) is exemplary. It could vary, e.g., in by the form used to send and deliver an eLetter from Sender 12 to Recipient 14, the amount of processing done by the ePO 20 on an eLetter, the services selected by Sender 12, and the nature of the operating system and email application at Recipient 14.

In a presently preferred form of the ePostal system 10, the three major steps of processing at the Recipient 14 is identification RP2, verification and authentication RP3, and then other general processing RP4. It is understood that if, at any stage of processing, the expected processing data is not present or is wrong, the email is rejected from further processing and is dealt with as appropriate to the specific situation step RP10.

The identification step RP2 at the Recipient 14 begins with the arrival of an email to the email application at the Recipient 14 via some TCP protocol such as POP3. However, if the Recipient 14 does not use such an email application, but rather uses another software application such as a web browser for email, the ePostal Recipient software 26 works with it, albeit with a somewhat different process than described below (as mentioned with respect to the ePostal software installation and activation preferred arrangement.) Specifically how, where and when the Recipient 14 learns that a new email has arrived is dependent upon the nature of the Recipient 14 operating system and email application. An exemplary time could be before or after the email is put into the email application's mail folders. If in an exemplary fashion the Recipient 14 learns of the new email after it is put into an email application mail folder, the Recipient 14 screens the email application mail folders for any newly arriving email.

In a preferred form, when Recipient 14 finds a new email, the Recipient 14 first checks at step RP5 whether the incoming email is an eLetter by determining if the "From" address of the email is an address known to it as an authorized "From" address for the ePost Office 20. Second, the Recipient 14, as an outcome of the preferred methods explained in the section about outgoing eLetters being processed by the ePost Office software 24, 24', looks for whether there is ePostal processing data in the eLetter, namely whether there is a SMTP Custom Header 1 at step RP6. If there is such a header, the email is considered an eLetter for further processing.

With reference to FIG. 21, the verification and authentication step RP3 starts with the Recipient 14 parsing the headers and Custom Headers in the eLetter.

The Recipient 14 checks for a match of the "Delivered-To" address in the email among the "Original-To" and the "To/cc/bcc" data fields of the email at step RP7. If there is not a match, there is a possibility of an alias address at step RP8. Preferably, the ePostal system 10, in the case of a possible alias address the Recipient 14 via direct comms, gives the ePO 20 the data indicating an alias. The ePO 20 responds by direct comms back to the Recipient with further instructions such as the correct Recipient identification numbers and decryption key to continue processing the eLetter.

The Recipient 14 then finds the Recipient identification number at step RP11 in the Recipient 14 data records which is paired with the Delivered-To address in the email. The Recipient 14 compares that Recipient identification number to each of the Recipient identification numbers in Custom Header 1 to find the associated encrypted symmetric key at step RP12. As discussed above, the Recipient 14 finds in the Recipient 14 data records at step RP13 the decryption symmetric key at step RP14 associated with the matched Recipient identification number in Custom Header 1. Using this decryption symmetric key, the Recipient 14 decrypts the encrypted symmetric key at step RP15 which is stored in Custom Header 1 and is paired with the matching Recipient identification number. The Recipient 14 also removes the random noise from the symmetric key which was added for improved security as a preferred step of the ePostal system 10 before it was encrypted at the ePO 20.

Paralleling the foregoing descriptions regarding encryption, the Recipient 14 using the decrypted symmetric key from Custom Header 1 decrypts at step RP16 Custom Header 2, making all the data in Custom Header 2 available for use, such the list of ePostal services that the Sender 12 selected.

The Recipient 14 identifies the ePostal services at step RP17 selected by Sender 12. Even though the processing of some ePostal services are not specifically mentioned below, the ePO 20 performs those services if and when needed in the Recipient 14 processing using techniques known to those skilled in the art.

If ePostal encryption services had been selected by Sender 12, the Recipient decrypts the eLetter message body at step RP18 using the symmetric key which is stored in Custom Header 2.

The Recipient 14 creates a MDC hash of the eLetter message body at step RP19 and compares that to the MDC hash at step RP20 of the message body that is stored in Custom Header 2. A match of the two MDC hashes verifies that the message at step RP21 has not been changed during transmission from the ePO 20 to the Recipient 14.

At this point, the Recipient 14 can also authenticate the ePO 20 as the sender of the eLetter which has arrived at Recipient 14. As with the authentication of the Sender 12 eLetter at the ePO 20, there are many alternatives for performing this function. Various data can be stored at the Recipient 14 which is tied only to the ePO 20, and when that data is transmitted by the ePO 20 to the Recipient 14 and is protected by encryption during transmission, that data authenticates the ePO 20 at the Recipient 14. The presently preferred arrangement includes using the MDC not only for message verification but also for ePO 20 authentication at step RP21. The match of the MDC hash that the Recipient 14 creates of the message body to the decrypted MDC hash stored in Custom Header 2 authenticates the ePO 20, as well as verifies the message. This is because only the ePO 20 can know the Recipient identification number in Custom Header 1 which points the Recipient 14 to the symmetric key which only the Recipient 14 would have (other than the ePO 20). In addition, in a preferred form of the ePostal system 10, there can be any other number of ePO identification numbers in the Custom Header 2 which when decrypted or hashed match to corresponding ePO 20 identification numbers stored at the Recipient 14. The preference of the ePostal system 10 is to use two identification numbers. These two analyses provide two additional ways to authenticate at step RP22 the Sender 12. It is also preferable to improve security of the ePostal processing data by periodically changing not only the symmetric keys which are used with Custom Headers 1 and 2, but also the sequences of data in the Custom Headers.

With further reference to FIG. 22, the general processing step now begins at Recipient 14.

The Recipient 14 prepares the eLetter for display to the ePostal Account user by updating the "From" and "Reply-To" information in the eLetter at step RP23 with the original "From" data which was stored in Custom Header 2.

The Recipient 14 prepares the eLetter for display by processing the Administrative content at step RP24 which was added to the message body at the ePO 20. Preferably an ePostal Administrative message is placed at the beginning of all eLetter message bodies which are delivered to recipients at step RP38 who do not have the Recipient software 26. Because without the Recipient 14 software the recipient's email application places the eLetter in its regular email inbox folder at step RP39 and does not differentiate the eLetter from other email, the reasons for the ePostal Administrative message are significant and include:

explaining to the recipient without software 26 that the eLetter was sent to him by the ePO 20 on behalf of the Sender 12 user at step RP40 providing the recipient with information about an ePostal eLetter at step RP41 giving the recipient without software 26 information about how to obtain the unique codes to read the eLetter if it is encrypted at step RP42 supplying the recipient 14 with important information to insure that the ePostal services are in legal compliance at step RP43

Exemplary alternatives for Recipient processing include: sending separate eLetters to Recipients 14 without this Administrative content and to recipients (without the Recipient software 26) with the Administrative content; sending the same Administrative content to all Recipients whether or not they have the Recipient software 26, and allowing both kinds of Recipients to see the Administrative content; and the preferably adding the Administrative content to all eLetters while they are being processed at the ePO 20, and then having Recipient 14 (with software 26) remove the content before the Recipient 14 user sees the eLetter displayed. The recipient without software 26 has no way of removing the Administrative content; that recipient user will see the Administrative message when the eLetter is displayed.

For displaying to the Recipient 14 user, the Recipient 14 adds other Administrative content to the eLetter message body at step RP25 as defined by the data in Custom Header 2. This content would include information for the Recipient 14 user such as:

- the time and date of processing the eLetter at the ePO
- the ePostal services which were applied to the eLetter as requested by the Sender 12 (including the ePostal priority class indicator, notification of receipt and opening of the eLetter, any custom incentive given to the Recipient 14 user to open the eLetter, encryption, certification of the Sender 12 user, and pre-paid replies)
- how the Recipient 14 can use the prepaid reply service or other ePostal features applied to the eLetter at step RP37

In one form, to provide this information, the ePostal system 10 enables the Recipient 14 using option and preference screens to choose how to receive this information. It can be provided in a number of ways, such as explained above, including as content on the eLetter itself or shown in a special pop up epostal screen, as requested by the Recipient 14 user.

Continuing to prepare the eLetter for display, the Recipient 14, using the information in Custom Header 2, sets the class of the mail message for this eLetter at step RP26 so that the ePostal priority class indicator which was selected by Sender 12 is displayed. The steps in doing this will depend on the email application at Recipient 14.

At this point, sufficient processing has been completed for the Recipient 14 to display the eLetter in its ePostal folder.

Recipient 14 sorts the eLetter into its ePostal folder at step RP27. As similarly mentioned earlier in the section about Sender 12 processing, regarding the exemplary Recipient software 26, described above and shown in FIGS. 4A-1 and 4A-2, there are alternative arrangements for sorting, movement, and storage of eLetters between ePostal folders. These ePostal incoming folders receive a copy of a received eLetter at the Recipient 14 after it is processed by the Recipient 14. The basic ePostal incoming folder is the ePostal Inbox folder. Other special ePostal folders can be created either by the Recipient 14 using ePostal option and preference screens or by the ePO 20 during Client installation, or via direct comms and ePO eLetters. In addition and as mentioned elsewhere, Recipient 14, besides sorting all eLetters into ePostal folders, can also sort at the option of the Recipient 14 user all other email, whose sender's email address did not have a match in the Recipient 14 user's email address book, into a single separate folder, making all such email easy to discard.

As discussed earlier with respect to Sender 12 processing, after an eLetter is placed for the first time into an ePostal folder, there are alternatives regarding moving the eLetter to other folders at step RP30. One alternative is allowing the eLetter to be moved out of its folder to any other folder (including non-eLetter folders) and back again. Another alternative is allowing no movement of the eLetter out of its original folder. Preferably, to assure security of the ePostal folders and to allow optimum flexibility for eLetter movement and sorting by the ePostal user, the eLetter movement:

- Allows eLetters to be moved to any other ePostal folder
- Allows eLetters to be moved out of ePostal folders into other email folders
- Allows eLetters which have been moved out of an ePostal folder to be moved back into any ePostal folder, if unchanged
- Does not allow any non-ePostal email to be moved into any ePostal folder at step RP31
- These preferred methods secure ePostal folders from any non-epostal email which is a security risk to ePostal eLetters and folders. Each eLetter would be verified and authenticated as an eLetter before being moved back into an ePostal folder.
- When the eLetter has been placed in its ePostal folder, communicates to the Recipient 14 user that a new eLetter has arrived at step RP28, e.g., using a pop up message or chime, or no communication. While the ePostal default is a pop up message, preferably the ePostal system 10 allows the Recipient 14 user to choose the alternative using the ePostal option and preference screens.

If the Sender 12 selected the ePostal encryption service, the Recipient 14 places the eLetter in its ePostal folder so that the message body cannot be read. Only the "To/cc/bcc", "From" and "Subject" information is visible. When the Recipient 14 user selects the eLetter at step RP32, before Recipient 14 displays the eLetter in readable plain text, the Recipient 14 requests the Recipient 14 user to input his passphrase for identification and security purposes. When the user inputs his passphrase, the Recipient 14 displays the eLetter, which had been encrypted, in readable plain text at step RP33. The Recipient 14 as well as the Sender 12 can request the ePO 20 to retain in its eLetter repository at the ePO 20 this eLetter at step RP34 as well as any other eLetter. Preferably, although the default is to require a user to input his passphrase before seeing an incoming encrypted eLetter in a readable state, the ePostal system 10 allows the user to choose using the ePostal option and preference screens, whether or not the passphrase entry is required. Besides the alternative of displaying a decrypted eLetter in its ePostal folder, preferably the ePostal system 10 allows the Recipient 14 (and the Sender 12) using ePostal option and preference screens to save an encrypted version of the eLetter in ePostal folders designated for such encrypted eLetters. These stored encrypted eLetters can be opened later by the Recipient 14 when the Recipient 14 user enters his Passphrase.

With completion of the identification, verification and authentication, and the general processing of the eLetter, the Recipient 14, if online or as soon as it can be online, preferably uses ePostal direct comms, as described above, to let the ePO 20 know that the eLetter has arrived at Recipient 14 at step RP29. This direct comms confirms to the ePO 20 that the eLetter was delivered to, and has been processed successfully by, Recipient 14. The ePO 20 records this information.

When the Recipient 14 user opens this eLetter, the Recipient 14, if online or as soon as it can be online, preferably uses ePostal direct comms as discussed earlier to confirm to the ePO 20 that the eLetter has been opened at step RP36. If the Sender 12 user had requested the certification of the Recipient 14 user as the one who opens the eLetter, Recipient 14 performs the certification when the eLetter is opened and reports that to the ePO 20 by direct comms as well at step RP36. The ePO 20 records this information.

As to communications regarding the receipt and opening of the eLetter, the Recipient 14 uses direct comms to notify the ePO 20 of receipt and opening regardless of whether the Sender 12 selected to receive the same notifications. If the Sender 12 did select the notification of receipt and opening (NORO) services, there are alternatives for how these notifications are provided to the Sender 12. Those alternatives include the notifications being given to Sender 12 by either the ePO 20 or the Recipient 14. Preferably the NORO communications are made to the Sender 12 by the ePO 20 which is the far simpler and secure alternative. In other forms, the Sender 12 receives both a notification of receipt and of opening when they individually occur, or only one notification of both after the eLetter is opened. In a preferred form the ePostal system 20 allows the Sender 12 to make this choice at the time he selects this ePostal service.

Also, when the Recipient 14 user opens the eLetter, the Recipient 14, preferably at the time of opening, estimates the ePostal incentive to open (ITO) credit that will be added to the Recipient 14 user's Account at the ePO 20 (after Recipient 14 using direct comms notifies the ePO 20 of eLetter opening) and adds that estimated credit to the Recipient 14 local bank of ePostal credits at step RP35. The Recipient 14 also adds to the local bank of credits any Sender 12 ITO which the Sender 12 selected for this eLetter.

This ends the description of the exemplary sequence of steps of the Recipient 14 in the receipt and processing of an eLetter, and the description of the alternatives and certain preferred arrangements for those processing steps.

Figure 6:
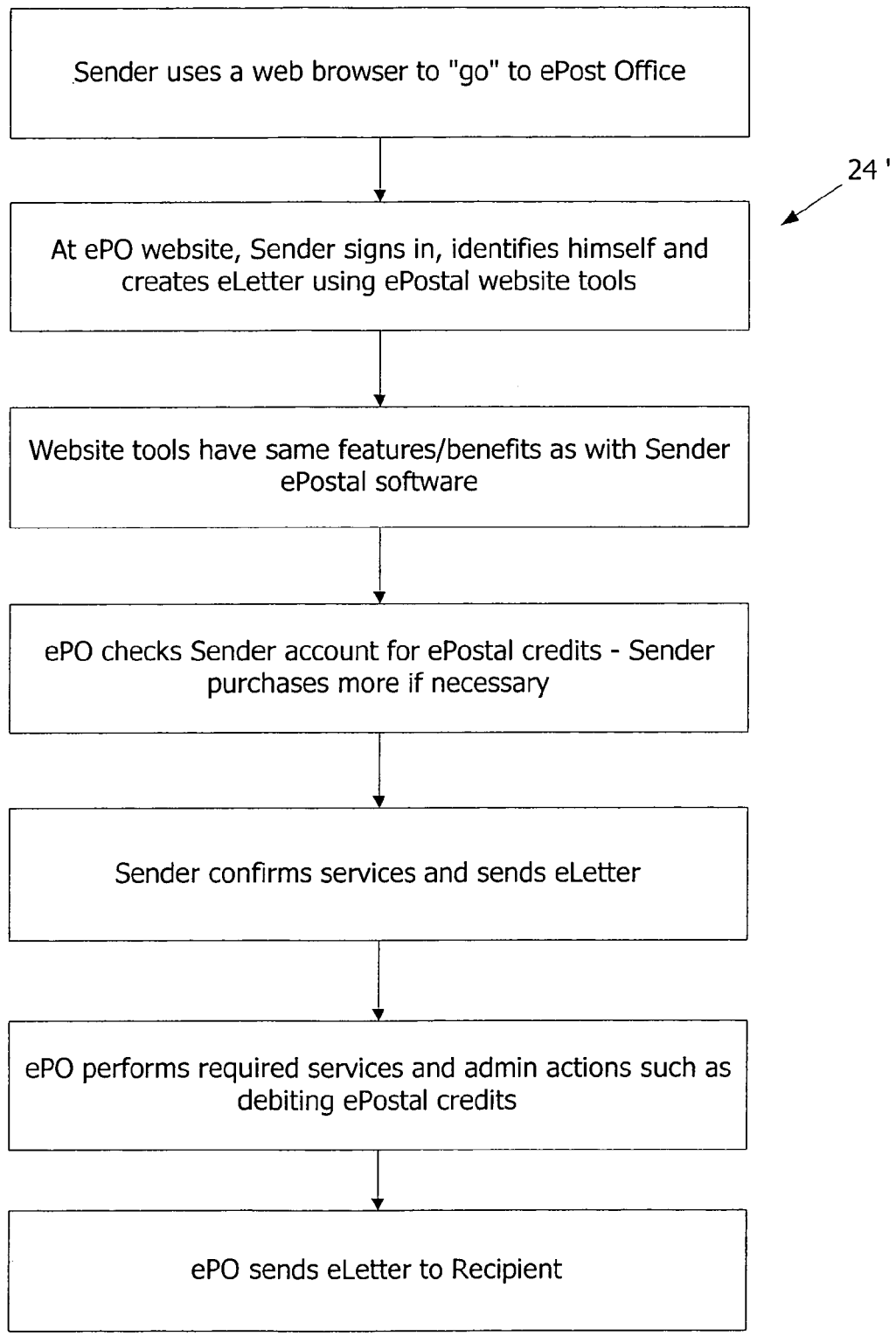
FIG. 6 is an operational block diagram of the Sender ePostal operational interactions at the ePost Office "window,"

Another feature of this invention as shown in FIG. 5, like traditional postal services, is that the Sender 12 user can "go" to the ePost Office 20 to mail/send eLetters, and Recipient 14 user can "go" to the ePost Office 20 to pick up eLetters from an ePO "box." An example of where this would be valuable is when the Sender 12 and Recipient 14 users are away from their terminals that have the ePostal software 22, 26. Using any terminal with a web browser, as shown in FIGS. 6 and 7, they can go to the ePO website, log in, and access their account information and tools for sending eLetters and for reading, forwarding, or otherwise handling the eLetters that are held at the ePO for them, just as if they were using their own terminals with their email, browser and ePostal software.

A variant of the feature described in the above paragraph and also shown in FIG. 5 is where users can "go" to the ePost Office 20 to mail/send eLetters and pick up eLetters from an ePO "box" even though they do not have ePostal software installed on any terminal but as long as they have opened ePostal accounts at the ePO website. In this situation as well, as described above, the user, using any terminal with a web browser, as shown in FIGS. 6 and 7, can go to the ePO website, log in, and access their account information and tools for sending eLetters and for reading, forwarding, or otherwise handling the eLetters that are held at the ePO for them.

As mentioned earlier and shown in FIG. 9, Senders 12 and Recipients 14 can have connection to email and Internet access services other than through an ISP, such as from within a corporate intranet or some other organizational network. FIG. 8 shows the corporate intranet example of this non-ISP connection, wherein ePostal software can operate not only at individual Senders' 12 terminals, but also at corporate servers. While corporations are a typical environment for such networks and servers, as is well known, networks of varying size and capabilities operating with varying protocols are used by many entities. For convenience, they are included herein by the terms "corporate", "corporate network", "corporate intranet", and "corporate server".

FIG. 8 Senders 12, as shown in FIGS. 2A and 2B, can send their email either with or without using ePostal services. However, with a network of Senders using ePostal services, the ePostal operations for the whole organization are much better managed if the Network ePostal software 28 works with both the Sender ePostal software at Senders 12 and the Corporate eMail Servers 13, rather than if ePostal software is only at the individual Senders 12 computers. Such a system configuration would include: management of available ePostal features, administration of the company's total ePostal credits, communications with the ePost Office 20, and various related data collection and retention activities.

Corporate Sender 12 users are not only individuals but also business information systems groups such as accounting and billing. For example, Network ePostal software 28 would assist those Information Systems 17 and the Corporate eMail Servers 13 to prepare, send and provide ePostal services (including ePost Office "postage metering") for business documents sent in the form of eLetters such as customer bills and announcements.

Of course, a business and its employees can also be Recipient 14 users, as well as Senders 12, residing within the same corporate network. As with Sending operations, when the Network ePostal software 28 works with both the Recipient ePostal software at Recipients 14 and with the Corporate eMail Servers 13, both the corporate network and the ePostal operations can be more effective and efficient. An example of a resulting benefit is the exclusion of many more low value, low priority emails from ever entering the corporate network.

Therefore, companies which include elements of this invention not only on their employee work stations but also at their corporate servers will enjoy in a highly manageable fashion not only the differentiated, secure, encrypted and tracked benefits as ePostal Sender users, but also the benefits as ePostal Recipient users of regaining significant rational control over their networks by having a way to filter, categorize, distribute and eliminate (where appropriate) incoming emails to reduce unnecessary corporate IT processing, technical risk and bandwidth use while improving the email productivity of its employees.

As discussed above with reference to FIGS. 1 and 9, this invention can work with Senders and Recipients within an ISP network or within some other network such as a business intranet. Network ePostal software 28 referred to in FIG. 8 and discussed above can assist at the network server level not only with business intranets but also with other organizational and ISP networks, where exact features and programming of Network ePostal software for a specific network would vary depending on the network technical configurations and the organizational needs.

Another significant aspect of the present invention is that sender pay to use the ePostal services, just as with conventional postal services, and can obtain different levels of services for different fees. This in itself has the advantage of prioritizing the email, not only in contrast with all conventional email, but also between eLetters of the ePostal system itself. Also, the payment aspect limits the usage of the system, which provides an automatic market solution to the problem of the increasing volume of "free" email traffic; as discussed earlier, this traffic noise has two components: 1) the overload of legitimate and wanted email, and 2) the unwanted, nuisance email. In addition, senders are interested in solving problems pertaining not only to email volumes, but also email quality. Senders seek the greater options of security that are inherent and optional with the ePostal system; they also can enjoy the benefits of differentiated, secure/encrypted and tracked emails, more productive email management, ease of use, general accessibility, and support in business intranets and other networks.

Certain senders will pay to process their most important email through the ePostal system because of "value"—value not only to senders but also to Recipients 14 users.

Recipients are far more likely to open eLetters than other regular email. First, only the ePostal system offers its unique set of premium email services. Second, recipients will expect to receive more value and suffer less risk in opening eLetters from the ePostal system than in opening regular email. In general, the ePostal system successfully addresses for the recipient the Internet mail problems and opportunities of general security, legitimate overload, priority management, encryption, tracking, ease of use, and nuisance email. Some of the many reasons include the following:

- The recipient 14 knows that the sender considers the eLetter important enough to pay to send to the recipient, unlike all of recipient's other regular, free email. That is, the sender is willing to give up something of value in order to have the recipient open his eLetter, where as senders of other regular "free" email are not.
- The recipient knows eLetters are screened for technological risk (viruses and worms) and content risk (offensive material) during processing at the ePost Office. Therefore, the recipient does not have the anxiety and pain in opening eLetters that he or she does with regular email.
- Also from a general security standpoint, recipients knows each eLetter has an authentication of the sender's terminal and email address. More specifically, the recipient will know that his own terminal has verified that the eLetter came from the ePost Office, which earlier verified the original email was from the sender's terminal and can even certify the individual sender. The ePost Office also gives each eLetter a date and time stamp of processing which can be verified. Recipients could also request the sender to have the ePostal system deliver a hard copy of the eLetter to the recipient.
- Recipients also find it easier and quicker to scan, review, read and manage eLetters, due to features such as:
  - In an email application's general inbox, eLetters will be more clearly and quickly seen because they are marked with ePostal identification and priority markings.
  - eLetters can be collected upon receipt and placed in a special ePostal folder (or various ePostal folders organized by ePostal priority, sender address, industry, etc.) in the recipient's email application. A specified ePostal folder can even open by default.
  - When new eLetters arrive, special notices are given to the recipient, avoiding delays due to not knowing those important eLetters are available.
  - If the recipient is away from his own terminal for an extended time, he or she can rent an ePostal mail box at the ePost Office website in which his incoming eLetters can be held during that time. Using another terminal with a web browser, the recipient can access his account and ePostal website tools to read (and send) his eLetters.
- As to encrypted eLetters, recipients know it is quick and easy without special computer knowledge to receive, decrypt and read encrypted eLetters processed through the ePostal system. The system will also help Recipient archive encrypted eLetters for content verification purposes. This is of significant value where encrypted email is required in highly dispersed, regulated situations such as the health care industry due to HIPAA, and where ease of use is important.
- As to dealing with unwanted, nuisance email, the ePostal system does not interfere with the recipients receiving all their regular email and will not delete any of the Recipient's non-ePostal email, unless the recipients choose otherwise. It will not interfere with their other email security measures. However, the ePostal system can, if recipients choose, sort out and place all non-ePostal and non-Address Book (unknown Senders) email into a separate folder. This "third category" folder of unsolicited, unknown, unwanted, nuisance email could then be easily deleted in mass.
- As mentioned earlier, recipients with an ePostal account, besides having the full range of ePostal features available for receiving and managing eLetters, can be credited an economic incentive to open eLetters. This credit can be used by recipients to send their own eLetters through the ePostal system, or after a certain credit balance is reached, it can be given to the recipients periodically.
- All these features work easily and seamlessly from within the recipient's own email application.
- When the ePostal system works together with business or other organizational network email and Internet access servers, IT departments can regain significant control over their networks by having the means at the network level to filter, categorize, distribute and eliminate incoming emails where appropriate. This reduces the otherwise unnecessary IT processing, technical risk to their network and systems, and bandwidth requirements, all of which saves money and downtime. It also improves the email productivity of the business' employees.

Therefore, given that recipients ascribe greater value to eLetters than to other email and that recipients are far more likely to open eLetters than other email, the value to senders in using the ePostal system will far exceed their costs. However, in addition to recipients greatly valuing eLetters, senders have even more reasons to value processing their most important email through the ePostal system.

- Differentiated eLetters. The ePostal system marks the eLetter with distinguishing priority and service indicators. Senders know, when a recipient scans his email log, the recipient will see not only that the eLetter has been processed by the ePostal system (and therefore known by the recipient to be secure, credible, and important enough for the sender to pay for its delivery) but also these priority and service indicators differentiate it from all the other regular "free" email that the recipient has in his Inbox, and from other lesser priority (and lesser cost) eLetters that have come through the ePostal system. The sender knows the recipient understands the eLetter has minimal risk from viruses and offensive material, and the eLetter's sender is verified. The sender also realizes that the recipient can sort eLetters to make them more easily viewable and accessible. Therefore, the sender knows the recipient is far more likely to open and read ePostal eLetters than regular email. Essentially, the effect of all these features (priority indicators, sorting and security) is to put the sender's eLetter "on top" of the recipient's pile of regular email. An appropriate analogy is choosing overnight delivery rather than conventional mail, but not because of faster delivery—but because the recipients are more apt to look at and open premium delivered "mail containers" before they open regular mail.
- Easy encryption. eLetters can be securely encrypted by senders in an extremely quick, easy, and generally available way. Senders do not need to obtain and distribute special digital keys to whomever they might need to dash off an important, encrypted email. This presents a new, very valuable option to senders who require secure, encrypted communications such as mentioned earlier about HIPAA and the health care industry. Senders, as well as recipients, can archive encrypted eLetters for content verification purposes.

eLetter tracking. The sender can request notification of eLetter receipt/opening by the recipient. It serves as a valuable record for Sender which can be linked to the sender's original eLetter. The sender can even request the certification of the recipient user as the one who opened it. This is enormously important in facilitating arrangements between businesses and their customers and clients concerning the exchange of information by the Internet. With such records, businesses can finally link their electronic systems to reliable electronic delivery and tracking systems, creating enormous cost savings, especially with ePostal system's generally available security measures.

Special treatment of recipients. Recipients not only perceive value but also can receive incentives for receiving/opening eLetters, which gives senders even greater assurance recipients will open their eLetters. Senders can also pre-pay for responses from recipients to their eLetters back through the ePostal system which should appeal to recipients and increase such responses (and value) for senders.

Ease and flexibility of use ePostal services are easy to use for senders. Selections for services are all made from within and work seamlessly with the sender's email application. The sender's sent eLetters can be automatically managed into special folders by priority, recipient, etc., separating them from his regular sent email. And when the sender is not at his or her own terminal, he or she can access at the ePO website his ePostal account and tools for sending (and receiving) eLetters.

While all senders will appreciate ePostal features, businesses and other organizations especially will value not only the differentiated, secure, encrypted, and tracked email capabilities, but also the enhanced overall communications management effectiveness of the services when ePostal network-level software is working directly with their network level email and Internet access servers and other business information systems.

The subsequent result is that this invention offers very significant benefits for email users, both senders and recipients, and individuals and businesses. Companies, for example, will be able, by including the features of this invention on their employee work stations and at their corporate servers, to obtain—as senders—the benefits of differentiated, secured and tracked emails. Moreover, as recipients, they will benefit from regaining control over their networks by being able to filter, categorize, distribute and eliminate (where appropriate) incoming emails. The result will be reductions in unnecessary processing, technical risk and bandwidth use, accompanied by improved email productivity for all employees. In addition to businesses, networks for other organizations and ISPs would also benefit by including features of this invention on their network servers.

While the invention has been described with respect to its preferred embodiments, it will be understood that various modifications and alterations will occur to those skilled in the art from the foregoing detailed description and the accompanying drawings. For example, while the invention has been described with certain software running or certain hardware at certain locations, it will be understood that the functions described can be distributed, in hardware, firmware and software, in a manner as is well known in the art. Further, while payment and accounting functions are described as carried out by the ePostal server and software, these functions can, in whole or in part, be carried out through links to conventional on-line credit and banking services from the ePost Office 20 and/or other components of the system 10. These modifications and alterations are intended to fall within the scope of the appended claims.

What is claimed is:

1. A communication system that transmits electronic mail having a message content component and a message data component relating to the message content and/or its transmission, among multiple Sender and Recipient terminals and which both uses and augments the Internet, comprising:
   an ePostal server and ePostal server software,
   links connecting the Sender and Recipient terminals and said ePostal server and ePostal server software to the Internet, and
   Sender ePostal software
   (i) operable on at least the Sender terminal and
   (ii) operable with conventional electronic mail application software also operating on the Sender terminal to
   (iii) selectively provide access by the Sender terminal and said Sender Postal software to said ePostal server and ePostal server software for managing and processing the electronic mail transmitted from the Sender terminal in order to provide the communication system's premium mail services to the electronic mail,
   (iv) begin processing of said premium mail services to the electronic mail, and
   (v) facilitate the Sender terminal and said Sender ePostal software and said Postal server and ePostal server software communicating with one another, at least in part, using direct communications.

2. The communication system according to claim 1 further comprising Recipient ePostal software
   (i) operable at least on the Recipient terminal, and
   (ii) operable with conventional electronic mail application software also operating on the Recipient terminal, to
   (iii) process the electronic mail, transmitted by the Sender terminal, managed and processed by said ePostal server and ePostal server software, and received by the Recipient terminal via the Internet and said Recipient link in order to provide said premium mail services to the electronic mail, and
   (iv) facilitate the Recipient terminal and said ePostal Recipient software communicating with at least one of Sender terminal and Sender ePostal software and said pee Postal Server and ePostal server software to create a virtual intranet for use by the Sender and Recipient and for the communication system itself.

3. The communication system according to claim 2 wherein at least one of said Sender and Recipient ePostal software is software stored at the Sender and Recipient terminals.

4. The communication system according to claim 2 wherein at least one of said Sender and Recipient ePostal software is stored and accessible to the Sender and/or Recipient at said ePostal server.

5. The communication system according to claim 2 wherein said links comprise a network interconnecting the multiple terminals to the Internet, at least one of said Postal Sender, Recipient and server software is stored and/or accessible to the Sender and/or Recipient at said network.

6. The communication system according to claim 2 wherein said Sender ePostal software and ePostal server software include payment software to authorize and account for payment for use of the communication system.

7. The communication system according to claim 6 wherein said Sender and Recipient ePostal software and said ePostal server software include said payment software to account for incentive credits for the opening of the electronic mail at the Recipient terminal.

8. The communication system according to claim 6 wherein said premium services include optional selectable premium services and said payment software accounts for the collection of an additional fee in response to said Sender ePostal software selection of one or more of said optional premium services.

9. The communication system of claim 6 wherein said authorizing and accounting for payment includes a download and installation of a Sender/Recipient ePostal software setup file, installation of said Sender and Recipient ePostal software on the Sender and Recipient terminals, registration of a Sender/Recipient account, verification of the account and credit information for the Sender/Recipient, and activation by an eLetter or direct communications.

10. The communication system according to claim 1 wherein said connecting links between the Internet and any of the Sender terminal, Recipient terminal, and ePostal server includes a telecommunications link.

11. The communication system according to claim 1 wherein said connecting links between the Internet and any of the Sender terminal, Recipient terminal, and Postal server includes a link selected from the group consisting of: ISP, intranet, extranet, LAN, dial up, DSL, cable, satellite, cell, wireless, and combinations thereof.

12. The communication system according to claim 1 wherein said at premium mail services for the electronic mail are selected from the group consisting of: authentication of the Sender; certification of the identity of the entity operating the Sender terminal; certification of the identity of the entity operating the Recipient terminal; prioritization of the sent and received electronic mail; screening of the electronic mail for technical risks; screening of the electronic mail for content risks; encryption of the electronic mail; notification to the Sender of receipt of the electronic mail; notification to the Sender of opening of the electronic mail; pre-paid replies for the Recipient to respond to the Sender through the communication system; customized incentives for the Recipients to open the electronic mail; verifiable date and time stamp of ePostal server processing; verification of content integrity of the electronic mail; secure storage of premium mail from regular mail; accessible histories of sent/received premium mail; creation of a holding of the electronic mail at the Sender, Recipient and ePostal server; and payment and accounting for said premium electronic mail services; and combinations thereof.

13. The communication system according to claim 12 where said prioritization is a differentiation between the electronic mail processed by the communication system and conventional electronic mail carried in the Internet.

14. The communication system according to claim 12 wherein said prioritization comprises a differentiation among the electronic mail processed by the communication system.

15. The communications system according to claim 1 wherein the Sender and Recipient terminals and the Internet can have different combinations of operating systems and electronic mail application software, and wherein said Sender and Recipient ePostal software are adapted to interface across said different combinations with said ePostal server and ePostal server software.

16. The communication system according to any one of claims 1 to 15, wherein said ePostal server and ePostal server software comprises plural servers at least one location.

17. The communication system according to claim 16 wherein said direct communication comprises said Sender ePostal, Recipient ePostal, and Postal server software operating on their associated terminals and server to open a direct communication connection for a transmission session, establish security on said links, authenticate the sender, transmit said message content and/or message data, and close the transmission session.

18. The communication system of claim 17 wherein said direct communications uses HTTP, SMTP or other socket protocols.

19. The communication system of claim 18 wherein said links include ISP's, content messages are transmitted between the Sender and Recipient ISP's by passing said ePostal server and ePostal server software, and said data message is communicated, at least in part, using said direct communications between the Sender terminal and said Sender ePostal software and said ePostal server and ePostal server software and between the Recipient terminal and Recipient ePostal software and said ePostal server and ePostal server software.

20. The communication software of claim 19 wherein said message content communications use SMTP/POP and/or IMAP protocols via mail servers of the Internet, and said at least in part message data communication uses HTTP, SMTP or other socket protocols.

21. The communication system of claim 16 wherein said message data is formatted as an attachment or as a custom header that includes a part that identifies the Sender and/or the Recipient.

22. The communication system of claim 21 wherein said attachment or custom header further comprises a part that authenticates and verifies said message components and a part that directs the processing of said message components.

23. The communication system of claim 16 wherein said direct communications are custom over links using HTTP, SMTP, or other socket protocols simulating HTTPS sessioning with said Sender and Recipient ePostal software using session ID's, control of encryption, alternative transmission protocols, and custom data structure for the transmitted message components.

24. A method of communication for electronic mail, having a message content component and message data component relating to the message and/or its transmission, among multiple Sender and Recipient terminals that both uses and augments the Internet, comprising:
   providing an ePostal server and ePostal server software;
   linking the Sender and Recipient terminals to the Internet and said ePostal server and ePostal server software;
   providing Sender ePostal software
     (i) operating on the Sender terminal, and
     (ii) operating with conventional electronic mail application software also operating on the Sender terminal,
     (iii) to provide selectively access by the Sender terminal and said Sender ePostal software to said ePostal server and ePostal server software for managing and processing the electronic mail transmitted from the Sender terminal in order to provide the communication system's said premium electronic mail services to the electronic mail, and
     (iv) to begin processing of said premium mail services to the electronic mail and
     (v) using said electronic ePostal server and ePostal server software to process at least a part of the message data component of the transmitted electronic mail.

25. The electronic mail communication method of claim 24 further comprising:
   proving no Recipient ePostal software
     (i) operable on the Recipient terminal (ii) operating with conventional electronic mail application software also operating on the Recipient terminal, (iii) for processing the electronic mail, transmitted by the Sender terminal, managed and processed by said ePostal server and ePostal server software, and received by the Recipient terminal via the Internet and said Recipient link, in order to provide said premium mail services to the electronic mail.

26. The electronic mail communication method of claim 25 where said linking includes telecommunicating.

27. The electronic mail communication method of claim 25 wherein said linking includes networking with Network ePostal software multiple ones of the Sender and Recipient terminals.

28. The electronic mail communication method of claim 25 wherein said Sender ePostal software and said ePostal server software processing includes payment and accounting services for at least a portion of said premium mail services.

29. The electronic mail communication method of claim 28 wherein said payment and accounting services account for incentives to a user of the Recipient terminal for opening of the electronic mail at the Recipient terminal.

30. The electronic mail communication method of any one of claims 24-29 wherein at least a part of the message data portion of the electronic mail is communicated to and from the ePostal server and said ePostal server software by said direct communications.

31. The electronic mail communication method of claim 30 wherein said direct and other communications among the Sender terminal, Recipient terminal, and ePostal server form a virtual intranet.

32. The electronic mail communication method of claim 30 wherein the ePostal server and said ePostal server software is distributed over plural servers that communicate among themselves, at least in part, by said direct communications.

33. The electronic mail communication method of claim 30 wherein said direct communication uses HTTP, SMTP, or other socket protocols.

34. The electronic mail communication method of claim 33 wherein said message components are transmitted between the Sender and the Recipient via ISP's by-passing the ePostal server and said ePostal server software, and said message data component is communicated, at least in part, using said direct communications between the Sender and the ePostal server and said ePostal server software and between the Recipient and said ePostal server and said ePostal server software.

35. The electronic mail communication method of claim 34 wherein said message content component communication uses SMTP/POP and/or IMAP protocols via mail servers of the Internet, and said at least in part message data component communication uses HTTP, SMTP or other socket protocols.

36. The electronic mail communication method of claim 30 further comprising formatting said electronic mail message data as an attachment or as a custom header that, in part, identifies the Sender terminal and/or Recipient terminal.

37. The electronic mail communication method of claim 36 wherein said attachment or custom header formatting further includes providing parts that authenticate and verify said message components and that direct their processing.

38. The electronic mail communication method of claim 30 wherein said direct communicating to and from the ePostal server and said ePostal server software is custom with said links using HTTP, SMTP, or other socket protocols simulating HTTPS sessioning with said Sender and Recipient ePostal software using session ID's, control of encryption, alternative transmission protocols, and custom data structure for the transmitted electronic message components.

39. The electronic mail communication method of claim 28 wherein said authorizing and accounting for payment includes a download and installation of a Sender/Recipient ePostal software setup file, installation of said Sender and Recipient ePostal software on the Sender and Recipient terminals, registration of a Sender/Recipient account, verification of the account and credit information for the Sender/Recipient, and activation by an eLetter or direct communications.

* * * * *

UNITED STATES PATENT AND TRADEMARK OFFICE
CERTIFICATE OF CORRECTION

PATENT NO. : 7,627,640 B2
APPLICATION NO. : 11/353763
DATED : December 1, 2009
INVENTOR(S) : Jon S. Gardner et al.

It is certified that error appears in the above-identified patent and that said Letters Patent is hereby corrected as shown below:

Claim 1, Col. 46, line 19, change "Postal" to --ePostal--.
Claim 1, Col. 46, line 27, change "Postal" to --ePostal--.
Claim 2, Col. 46, line 42, insert --the-- after "at least one of."
Claim 2, Col. 46, line 44, change "pee Postal" to --ePostal--.
Claim 5, Col. 46, line 57, change "Postal" to --ePostal--.
Claim 11, Col. 47, line 23, change "Postal" to --ePostal--.
Claim 12, Col. 47, line 28, delete "at."
Claim 17, Col. 47, line 67, change "Postal" to --ePostal--.
Claim 19, Col. 48, line 11, change "passing" to --by-passing--.
Claim 25, Col. 48, line 65, change "proving no" to --providing.--.

Signed and Sealed this

Eighteenth Day of May, 2010

David J. Kappos
*Director of the United States Patent and Trademark Office*